(12) United States Patent
Wu et al.

(10) Patent No.: US 6,860,931 B2
(45) Date of Patent: Mar. 1, 2005

(54) PHASE CHANGE INKS CONTAINING COLORANT COMPOUNDS

(75) Inventors: Bo Wu, Wilsonville, OR (US); Jeffery H. Banning, Hillsboro, OR (US); James M. Duff, Mississauga (CA); Wolfgang G. Wedler, Tualatin, OR (US); Donald R. Titterington, Newberg, OR (US)

(73) Assignee: Xerox Corporation, Stamford, CT (US)

( * ) Notice: Subject to any disclaimer, the term of this patent is extended or adjusted under 35 U.S.C. 154(b) by 119 days.

(21) Appl. No.: 10/606,705

(22) Filed: Jun. 26, 2003

(65) Prior Publication Data

US 2005/0016417 A1 Jan. 27, 2005

(51) Int. Cl.$^7$ .......................... C09D 11/02; C09D 11/12
(52) U.S. Cl. .............................. 106/31.29; 106/31.61; 523/160; 524/590; 524/570; 524/556
(58) Field of Search ........................ 106/31.29, 31.61; 523/160; 524/590, 570, 556

(56) References Cited

U.S. PATENT DOCUMENTS

| | | | |
|---|---|---|---|
| 1,981,515 A | 11/1934 | Kyrides | 260/128 |
| 1,981,516 A | 11/1934 | Kyrides | 260/128 |
| 1,991,482 A | 2/1935 | Allemann | 260/63 |
| 3,653,932 A | 4/1972 | Berry et al. | 106/22 |
| 4,390,369 A | 6/1983 | Merritt et al. | 106/31 |
| 4,484,948 A | 11/1984 | Merritt et al. | 106/31 |
| 4,647,675 A | 3/1987 | Mayer et al. | 549/394 |
| 4,684,956 A | 8/1987 | Ball | 346/1.1 |
| 4,851,045 A | 7/1989 | Taniguchi | 106/31 |
| 4,889,560 A | 12/1989 | Jaeger et al. | 106/27 |
| 4,889,761 A | 12/1989 | Titterington et al. | 428/195 |
| 4,935,059 A | 6/1990 | Mayer et al. | 106/22 |
| 5,006,170 A | 4/1991 | Schwarz et al. | 106/20 |
| 5,084,099 A | 1/1992 | Jaeger et al. | 106/22 |
| 5,151,120 A | 9/1992 | You et al. | 106/27 |
| 5,221,335 A | 6/1993 | Williams et al. | 106/23 |
| 5,372,852 A | 12/1994 | Titterington et al. | 427/288 |
| 5,496,879 A | 3/1996 | Griebel et al. | 524/320 |
| 5,507,864 A | 4/1996 | Jaeger et al. | 106/22 |
| 5,621,022 A | 4/1997 | Jaeger et al. | 523/161 |
| 5,747,554 A | 5/1998 | Sacripante et al. | 523/161 |
| 5,847,162 A | 12/1998 | Lee et al. | 549/227 |
| 5,902,841 A | 5/1999 | Jaeger et al. | 523/161 |

FOREIGN PATENT DOCUMENTS

| | | |
|---|---|---|
| EP | 0187352 | 7/1986 |
| EP | 0206286 | 12/1986 |
| EP | 0 565 798 | 10/1993 |
| GB | 421 737 | 12/1934 |
| GB | 2 311 075 | 9/1997 |
| WO | WO 94/04619 | 3/1994 |

OTHER PUBLICATIONS

Copending Application U.S. Ser. No. 10/260,146, filed Sep. 27, 2002, entitled "Colorant Compounds," by Jeffery H. Banning et al.
Copending Application U.S. Ser. No. 10/260,376, filed Sep. 27, 2002 entitled "Phase Change Inks," by C. Wayne Jaeger et al.
Copending Application U.S. Ser. No. 10/260,379, filed Sep. 27, 2002 entitled "Method for Making Colorant Compounds," by C. Wayne Jaeger et al.
Copending Application U.S. Ser. No. 10/607,373 (Attorney Docket No.: D/A3152), filed concurrently herewith, entitled "Colorant Compounds," by Jeffery H. Banning et al.
Copending Application U.S. Ser. No. 10/606,631 (Attorney Docket No.: D/A3152Q), filed concurrently herewith, entitled "Phase Change Inks Containing Colorant Compounds," by Bo Wu et al.
Copending Application U.S. Ser. No. 10/607,382 (Attorney Docket No.: D/A3153), filed concurrently herewith, entitled "Colorant Compounds," Jeffery H. Banning et al.
English Abstract for German Patent Publication DE 4205636AL, Aug. 1993.
English Abstract for German Patent Publication DE 4205713AL, Mar. 1996.

(List continued on next page.)

Primary Examiner—Mark L. Bell
Assistant Examiner—Veronica F. Faison
(74) Attorney, Agent, or Firm—Judith L. Byorick

(57) ABSTRACT

Phase change inks comprising a carrier and a colorant of the formula

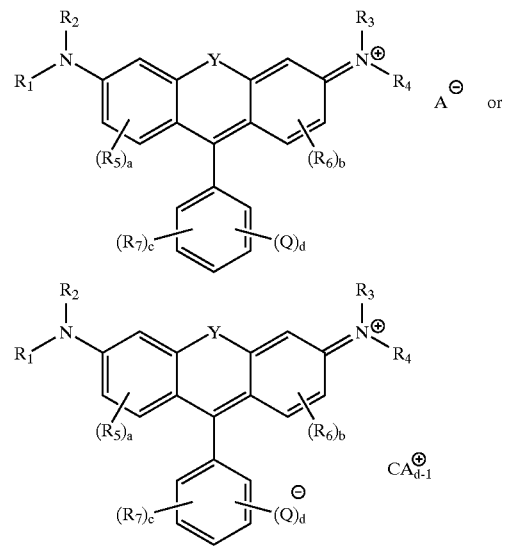

wherein $R_1$, $R_2$, $R_3$, $R_4$, $R_5$, $R_6$, $R_7$, a, b, c, d, Y, Q, Q$^-$, A, and CA are as defined herein.

126 Claims, No Drawings

OTHER PUBLICATIONS

"Rhodamine Dyes and Related Compounds. XV. Rhodamine Dyes with Hydroaromatic and Polymethylene Radicals," I. S. Ioffe et al., *Zh. Organ. Khim.* (1965), 1(3), 584–6, March.

"Rhodamine Dyes and Related Compounds. XI. Aryl– and Alkylrhodamines Containing Carboxyl Groups," I. S. Ioffe et al., *Zh. Obsch. Khim.* (1964), 34(6), 2041–4, no month available.

"Rhodamine Dyes and Related Compounds. X. Fluorescence of Solutions of Alkyl– and Arylalkylrhodamines," I. S. Ioffe et al., *Zh. Obsch. Khim.* (1964), 34(6), 2039–41 Abstract only, no month available.

"Rhodamine Dyes and Related Compounds. IX. Rhodamine B Sulfonic Acids and their Derivatives," I. S. Ioffe et al., *Zh. Obsch. Khim.* (1964), 34(2), 640–44, February.

"Rhodamine Dyes and Related Compounds. VIII. Amides of Sulforhodamide B Containing β–Hydroxyethyl and β–Chloroethyl Groups," I. S. Ioffe et al., *Zh. Obsch. Khim.* (1963), 33(12), 3943–6, December.

"Rhodamine Dyes and Related Compounds. VII. (β–Phenylethyl)rhodamines," I. S. Ioffe et al., *Zh. Obsch. Khim.* (1963), 33(4), 1089–92, April.

"Rhodamine Dyes and Related Compounds. VI. Chloride and Amides of Sulforhodamine B," I. S. Ioffe et al., *Zh. Obsch. Khim.* (1962), 32, 1489–92 Abstract only, no month available.

"Rhodamine Dyes and Related Compounds. V. α–Pyridylrhodamine," I. S. Ioffe et al., *Zh. Obsch. Khim.* (1962), 32, 1485–9, May.

"Rhodamine Dyes and Related Compounds. IV. Aryl– and Benzylrhodamines," I. S. Ioffe et al., *Zh. Obsch. Khim.* (1962), 32, 1480–5, May.

"Rhodamine Dyes and Related Compounds. III. Reaction of m–aminophenol With Phthalic Anhydride in Hot Sulfuric Acid," I. S. Ioffe et al., *Zh. Obsch. Khim.* (1962), 32, 1477–80. Abstract only, no month available.

"Rhodamine Dyes and Related Compounds. XVIII. N,N'–Dialkylrhodamines with Long Chain Hydrocarbon Radicals," I. S. Ioffe et al., *Zh. Organ. Khim.* (1970), 6(2), 369–71, February.

"Rhodamine Dyes and Related Compounds. XIX. Mutual Transformations of Colorless and Colored Forms of N,N'–Substituted Rhodamine," I. S. Ioffe et al., *Zh. Organ. Khim.* (1972), 8(8), 1726–9, August.

"Synthesis of N–Substituted Flaveosines, Acridine Analogs of Rhodamine Dyes," I. S. Ioffe et al., *Zh. Org. Khim.* (1966), 2(9), 1721 (September).

"Rhodamine Dyes and Related Compounds. XVII. Acridine Analogs of Rhodamine and Fluorescein," I. S. Ioffe et al., *Zh. Organ. Khim.* (1966), 2(5), 927–31, September.

"New Lipophilic Rhodamines and Their Application to Optical Potassium Sensing," T. Werner et al., *Journal of Fluorescence*, vol. 2, No. 3, pp. 93–98 (1992), Jul.

English abstract for Japanese Patent Publication JP 61221265, Oct. 1986.

PHASE CHANGE INKS CONTAINING COLORANT COMPOUNDS

Cross-reference is made to the following copending applications:

Copending application U.S. Ser. No. 10/260,146, filed Sep. 27, 2002, entitled "Colorant Compounds," with the named inventors Jeffery H. Banning and C. Wayne Jaeger, the disclosure of which is totally incorporated herein by reference, discloses compounds of the formula

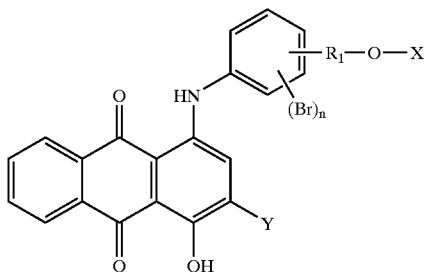

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

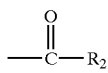

wherein $R_2$ is an alkyl group, an aryl group, an arylalkyl group, or an alkylaryl group; (c) an alkyleneoxy, aryleneoxy, arylalkyleneoxy, or alkylaryleneoxy group, or (d) a group of the formula

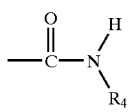

wherein $R_4$ is an alkyl group, an aryl group, an arylalkyl group, or an alkylaryl group.

Copending application U.S. Ser. No. 10/260,376, filed Sep. 27, 2002, entitled "Phase Change Inks," with the named inventors C. Wayne Jaeger and Jeffery H. Banning, the disclosure of which is totally incorporated herein by reference, discloses a phase change ink composition comprising a phase change ink carrier and a colorant compound of the formula

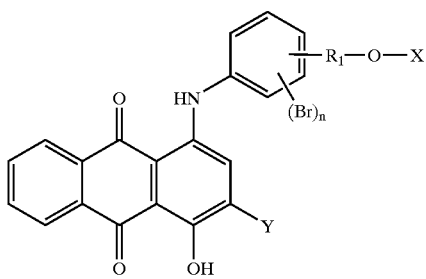

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

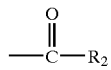

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

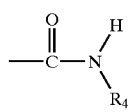

wherein $R_4$ is an alkyl group, an aryl group, an arylalkyl group, or an alkylaryl group.

Copending application U.S. Ser. No. 10/260,379, filed. Sep. 27, 2002, entitled "Methods for Making Colorant Compounds," with the named inventors C. Wayne Jaeger and Jeffery H. Banning, the disclosure of which is totally incorporated herein by reference, discloses a process for preparing a colorant of the formula

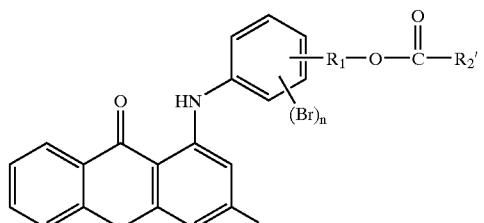

or

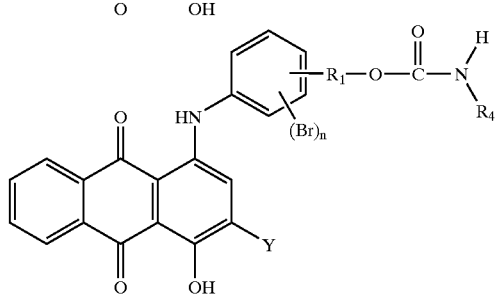

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a) preparing a first reaction mixture by admixing (1) leucoquinizarin and, optionally, quinizarin, (2) an aminobenzene substituted with an alcohol group of the formula —$R_1$—OH, (3) boric acid; and (4) an optional solvent, and heating the first reaction mixture to prepare an alcohol-substituted colorant of the formula

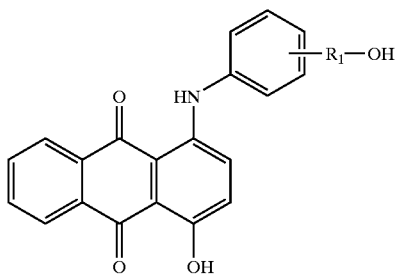

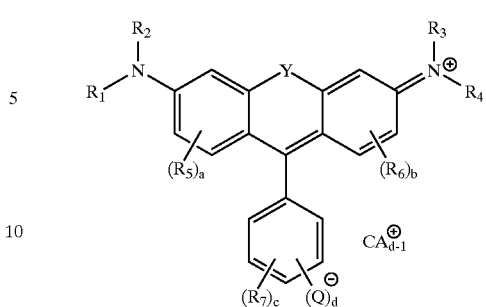

followed by (b) converting the colorant thus prepared to either (i) an ester-substituted colorant by reaction with an esterification compound which is either (A) an anhydride of the formula

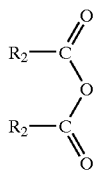

or (B) an acid of the formula $R_2COOH$ in the presence of an optional esterification catalyst, or (ii) a urethane-substituted colorant by reaction with an isocyanate compound of the formula

and (c) brominating the colorant thus prepared, wherein either conversion to ester or urethane can be performed before bromination or bromination can be performed before conversion to ester or urethane.

Copending application U.S. Serial No. 10/607,373, filed concurrently herewith, entitled "Colorant Compounds," with the named inventors Jeffery H. Banning, Bo Wu, James M. Duff, Wolfgang G. Wedler, Jule W. Thomas, and Randall R. Bridgeman, the disclosure of which is totally incorporated herein by reference, discloses compounds of the formula

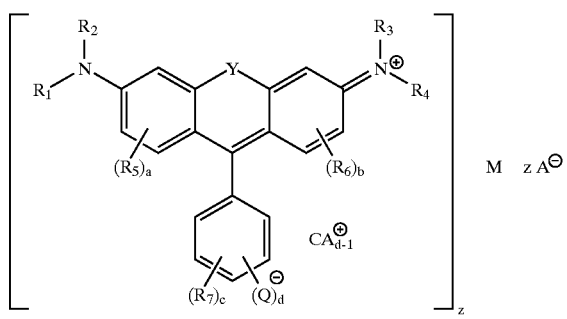

wherein M is either (1) a metal ion having a positive charge of +y wherein y is an integer which is at least 2, said metal ion being capable of forming a compound with at least two chromogen moieties, or (2) a metal-containing moiety capable of forming a compound with at least two

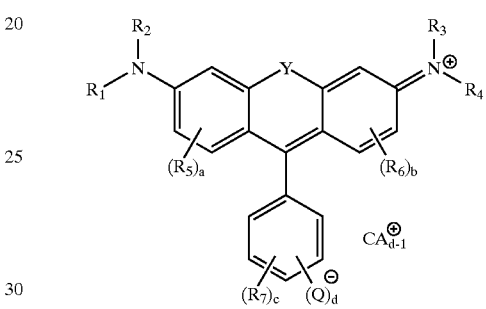

chromogen moieties, z is an integer representing the number of

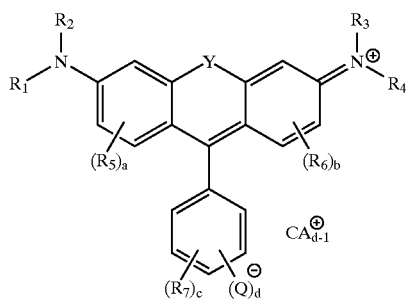

chromogen moieties associated with the metal and is at least 2, and $R_1$, $R_2$, $R_3$, $R_4$, $R_5$, $R_6$, $R_7$, a, b, c, d, Y, $Q^-$, A, and CA are as defined therein.

Copending application U.S. Serial No. 10/606,631, filed concurrently herewith, entitled "Phase Change Inks Containing Colorant Compounds," with the named inventors Bo Wu, Jeffery H. Banning, James M. Duff, Wolfgang G. Wedler, Jule W. Thomas, and Randall R. Bridgeman, the disclosure of which is totally incorporated herein by reference, discloses a phase change ink composition comprising a phase change ink carrier and a colorant compound of the formula

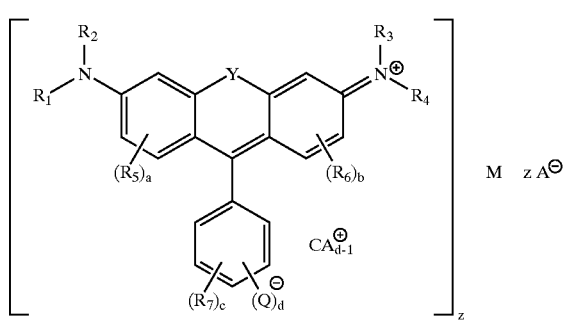

wherein M is either (1) a metal ion having a positive charge of +y wherein y is an integer which is at least 2, said metal ion being capable of forming a compound with at least two

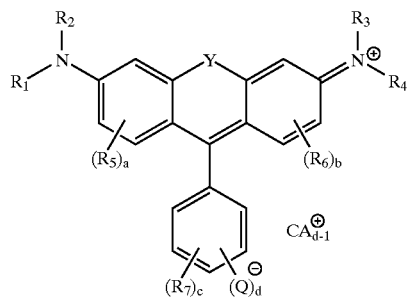

chromogen moieties, or (2) a metal-containing moiety capable of forming a compound with at least two

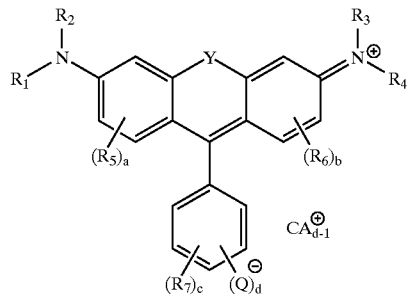

chromogen moieties, z is an integer representing the number of

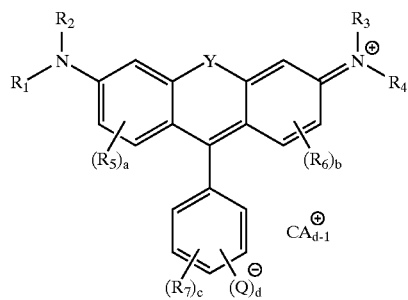

chromogen moieties associated with the metal and is at least 2, and $R_1$, $R_2$, $R_3$, $R_4$, $R_5$, $R_6$, $R_7$, a, b, c, d, Y, $Q^-$, A, and CA are as defined therein.

Copending application U.S. Serial No. 10/607,382, filed concurrently herewith, entitled "Colorant Compounds," with the named inventors Jeffery H. Banning, Bo Wu, James M. Duff, Wolfgang G. Wedler, and Donald R. Titterington, the disclosure of which is totally incorporated herein by reference, discloses compounds of the formulae

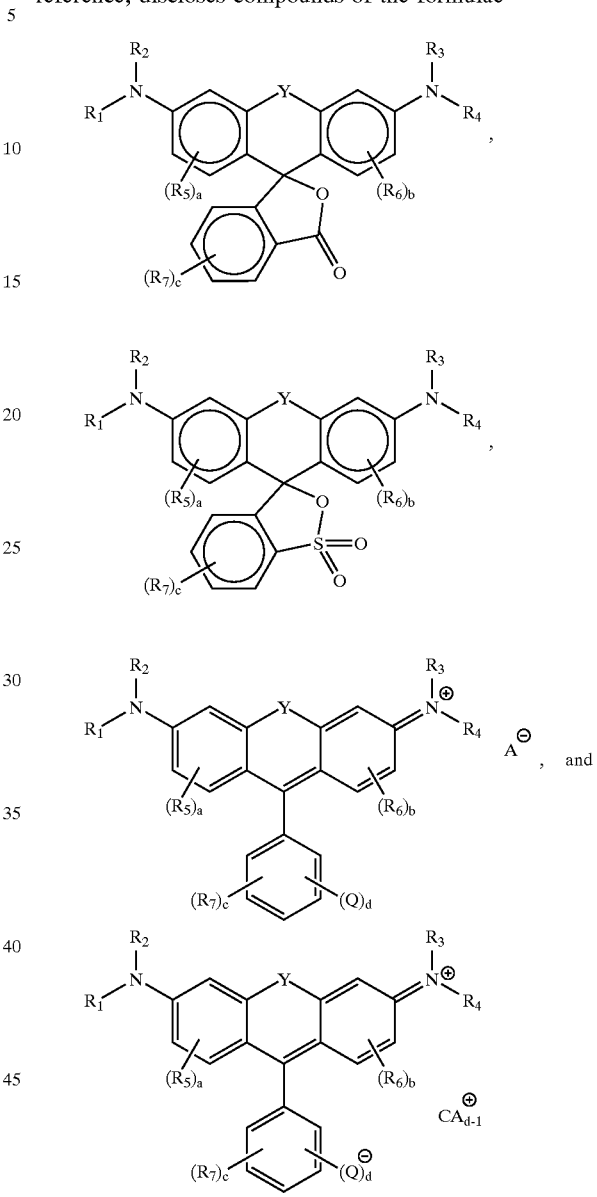

wherein $R_1$, $R_2$, $R_3$, $R_4$, $R_5$, $R_6$, $R_7$, a, b, c, d, Y, Q, $Q^-$, A, and CA are as defined therein.

BACKGROUND

The present invention is directed to phase change inks. More specifically, the present invention is directed to hot melt or phase change inks conjoining specific colorant compounds. One embodiment of the present invention is directed to a phase change ink carrier and a colorant compound of the formula

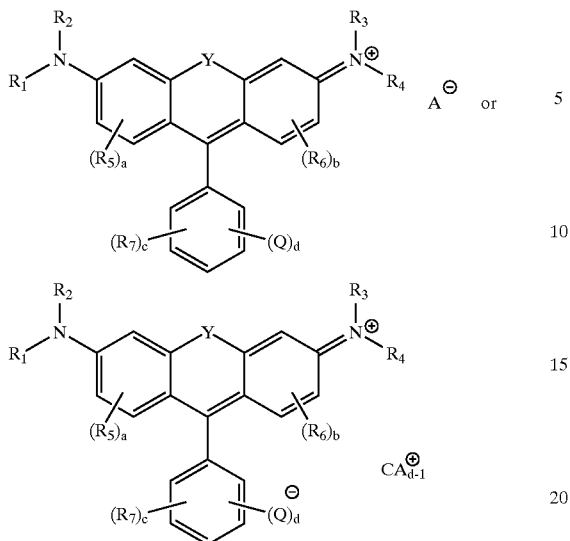

or

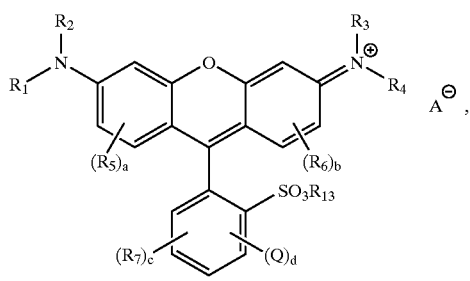

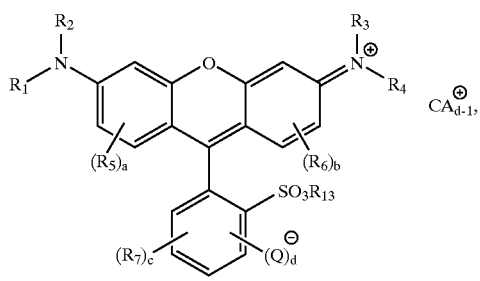

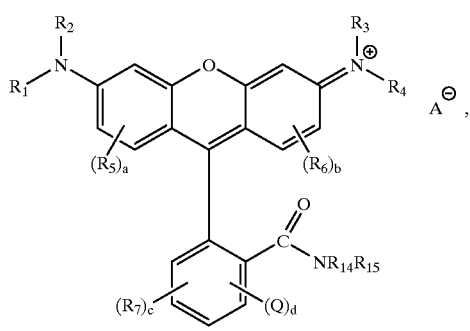

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

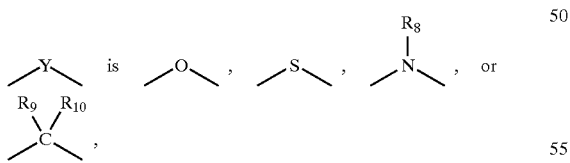

$R_8$, $R_9$, and $R_{10}$ each, independently of the others, is (i) a hydrogen atom, (ii) an alkyl group, (iii) an aryl group, (iv) an arylalkyl group, or (v) an alkylaryl group, provided that the number of carbon atoms in $R_1+R_2+R_3+R_4+R_5+R_6+R_7+R_8+R_9+R_{10}$ is at least about 16, Q is a COOH group or a $SO_3H$ group, $Q^-$ is a $COO^-$ group or a $SO_3^-$ group, d is an integer which is 1, 2, 3, 4, or 5, A is an anion, and CA is either a hydrogen atom or a cation associated with all but one of the $Q^-$ groups, provided that when the colorant compound is of the formula -continued

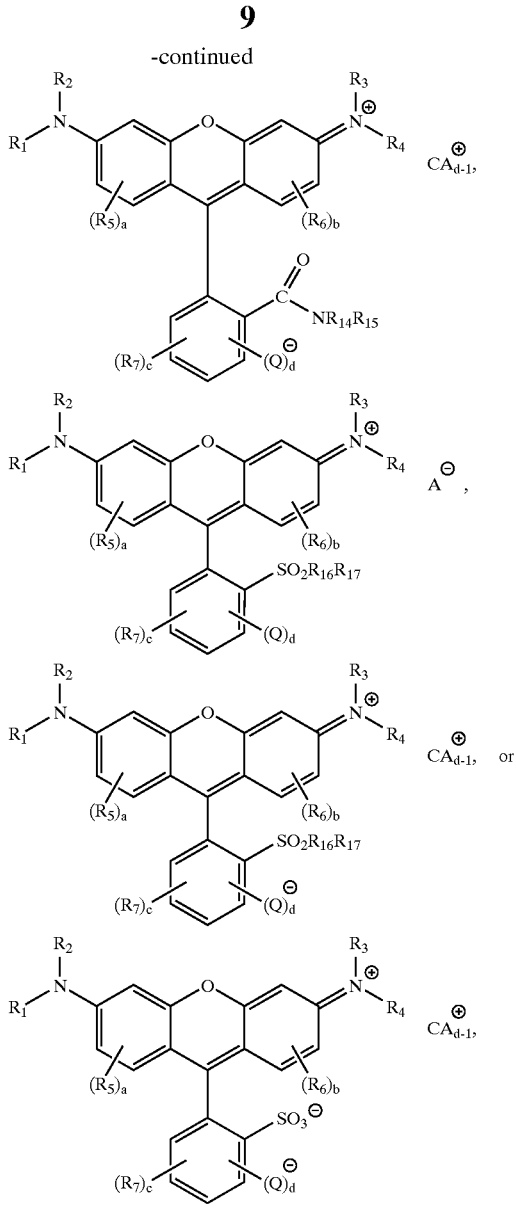

wherein $R_{12}$, $R_{13}$, $R_{14}$, $R_{15}$, $R_{16}$, and $R_{17}$ each, independently of the other, is (i) an alkyl group, (ii) an aryl group, (iii) an arylalkyl group, or (iv) an alkylaryl group, (I) either (a) c is an integer which is 0, 1, 2, or 3, or (b) d is an integer which is 1, 2, 3, or 4, and (II) either (a) three of $R_1$, $R_2$, $R_3$, and $R_4$ are hydrogen atoms; (b) only one of $R_1$, $R_2$, $R_3$, and $R_4$ is a hydrogen atom; (c) $R_1$ and $R_2$ are both hydrogen atoms: (d) $R_3$ and $R_4$ are both hydrogen atoms; or (e) $R_1$ and $R_3$ are both hydrogen atoms and $R_2$ and $R_4$ are each, independently of the other, either alkyl groups or arylalkyl groups.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

British Patent Publication GB 2 311 075 (Gregory et al.), the disclosure of which is totally incorporated herein by reference, discloses a compound of the formula

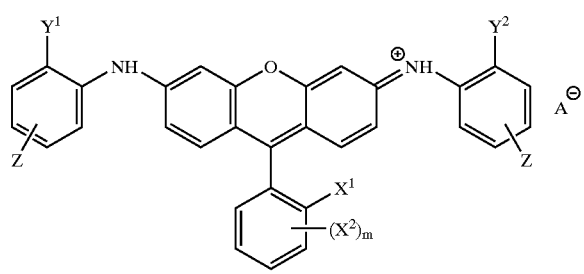

wherein $X^1$ is an ester group or an amide group (such as of a carboxylic or sulfonic acid) or a fatty amine salt of a sulfonic acid, each $X^2$ independently is a substituent, m has a value of from 0 to 2, $Y^1$ and $Y^2$ are each independently H, alkyl, or halo, each Z independently is an ester or amide group, and $A^-$ is an anion. The compound is useful as a colorant for toners, D2T2 printing, plastics, polyesters, nylons, and inks, especially ink jet or hot melt inks.

"Rhodamine Dyes and Related Compounds. XV Rhodamine Dyes with Hydroaromatic and Polymethylene Radicals," I. S. Ioffe et al., Zh. Organ. Khim. (1965), 1(3), 584–6, the disclosure of which is totally incorporated herein by reference, discloses a process wherein heating dichlorofluoran with $ZnCl_2$—ZnO and the appropriate amine for 3 hours at 220° followed by treatment with aqueous HCl gave N,N'-dicyclohexylrhodamine-HCl, m. 180–5°, N,N'-di(tetramethylene)rhodamine-HCl, decompd. 240°, N,N'-di(pentamethylene)rhodamine-HCl, m. 205–10°, N,N'-di(hexamethylene)rhodamine-HCl, decompd. 175°. These dyes gave yellow or orange fluorescence and their spectra were given.

"Rhodamine Dyes and Related Compounds. XI. Aryl- and Alkylrhodamines Containing Carboxyl Groups," I. S. Ioffe et al., Zh. Obsch. Khim. (1964), 34(6), 2041–4, the disclosure of which is totally incorporated herein by reference, discloses a process wherein heating aminobenzoic acids with 3,6-dichlorofluoran in the presence of $ZnCl_2$ for 6 hours at 24–50°, gave after an aqueous treatment: N,N'-bis(o-carboxyphenyl)rhodamine-HCl; m-isomer-HCl; and p-isomer-HCl. A similar reaction with HCl salts of glycine, α-alanine, or β-alanine gave: N,N'-bis(carboxymethyl)rhodamine-HCl; N,N'-bis(α-carboxyethyl)rhodamine-HCl; and N,N'-bis(β-carboxyethyl)rhodamine-HCl. The latter group showed yellow-green fluorescence, lacking in the aryl derivatives. Spectra of the products are shown.

"Rhodamine Dyes and Related Compounds. X. Fluorescence of Solutions of Alkyl- and Arylalkyl rhodamines," I. S. Ioffe et al., Zh. Obsch. Khim. (1964), 34(6), 2039–41, the disclosure of which is totally incorporated herein by reference, discloses fluorescence spectra for the following rhodamines. N,N'-diethyl; N,N'-dibenzyl; N,N'-bis(β-phenylethyl); N,N'-bis(β-phenylisopropyl). In symmetrical substituted rhodamines, the entry of an alkyl or arylalkyl group into both amino residues resulted in the displacement of fluorescence max, toward longer wavelengths, a similar displacement of absorption and an increase in the quantum yield of fluorescence. In unsymmetrical derivatives, an aryl group entering one of the amino groups shifted the spectra to a greater degree in the some direction and sharply reduced the quantum yield of fluorescence.

"Rhodamine Dyes and Related Compounds. IX. Rhodamine B Sulfonic Acids and their Derivatives," I. S. Ioffe et al., Zh. Obsch. Khim. (1964), 34(2), 640–44, the disclosure of which is totally incorporated herein by reference, discloses that healing $m\text{-}Et_2NC_6H_4OH$ and K β-sulfophthalate at 150° while concentrated $H_2SO_4$ was being added gave after 3 hours at 150–70°, followed by heating with $H_2O$ 15 min., a residue of crude sulforhodamine, purified by solution in hot aqueous $Na_2CO_3$ and precipitation with AcOH. The mixed isomeric rhodamine sulfonic acids refluxed 3 hours with 30% AcOH, clarified, and cooled gave a first isomer with Rf 0.74 on paper in aqueous solution (pH 9) while the residue was the other isomer with Rf 0.98. The first isomer and $PCl_5$ gave the sulfonyl chloride, isolated as HCl salt, red solid (from $CHCl_3$-ligroine), which with $NH_3$ in $CHCl_3$ gave the sulfonamide, a violet powder. The two isomers and Rhodamine B had similar spectral characteristics. The two isomers probably contain the $SO_3H$ group in the 4- and 5-positions of the Ph ring at Rhodamine B. Their absorption and fluorescence spectra are shown. Their solutions in $CHCl_3$ gave stronger fluorescence than those in $Me_2CO$.

"Rhodamine Dyes and Related Compounds. VIII. Amides of Sulforhodamine B Containing β-Hydroxyethyl and β-Chloroethyl Groups," I. S. Ioffe et al., Zh. Obsch. Khim. (1963), 33(12), 3943–6, the disclosure of which is totally incorporated herein by reference, discloses that sulforhodamine B chloride heated 10–12 hours with $HOCH_2CH_2NH_2$ at 170–80°, then triturated with saturated NaCl gave, after solution in $CHCl_3$ and precipitation with petroleum ether, 80% red sulforhodamine B N(β-hydroxyethyl)amide; similar reaction with $HN(CH_2CH_2OH)_2$ gave 70% N,N-bis(β-hydroxyethyl) amide, a bright red wax. These treated with $SOCl_2$ in $CHCl_3$ gave, respectively, N-(D-chloroethyl)amide, a brown powder, and N,N-bis(β-chloroethyl)amide, a violet powder. Absorption spectra of the amides are shown. The (hydroxyethyl)amides displayed strong orange fluorescence in solution.

"Rhodamine Dyes and Related Compounds. VII. (β-Phenylethyl)rhodamines," I. S. Ioffe et al., Zh. Obsch. Khim. (1963), 33(4), 1089–92, the disclosure of which is totally incorporated herein by reference, discloses a process wherein heating dichlorofluoran with $PhCH_2CH_2NH_2$ or $PhCH_2CH(Me)NH_2$ in the presence of ZnO and $ZnCl_2$ for 5–6 hours at 220°, gave, after heating for 2 hours with aqueous HCl, 96–8% crude products which, after crystallization from alc. HCl, gave red, powdery N,N'-bis(β-phenylethyl)rhodamine-HCl, m. 172–5°, or N,N'-bis(α-methyl-β-phenylethyl)rhodamine-HCl, m. 175–80: N-phenyl-N'-(β-phenylethyl)rhodamine-HCl, m. 162–6°, was prepared from $PhCH_2CH_2NH_2$ and 3'-chloro-6'-anilinofluoran under the above conditions. Treated with alc. NaOH and quenched in $H_2O$, these hydrochlorides gave the free bases of the dyes as brown-red solids, which tended to form colloids in aqueous medium. The free bases m. 123–5°, decompd. 120°, and m. 164–8°, respectively. The ultraviolet and visible spectra of the dyes were similar to the spectra of dibenzylrhodamine, but had deeper color; strong fluorescence was shown by these dyes. The spectrum of the bis(β-phenylethyl)rhodamine was almost identical with that of diethylrhodamine.

"Rhodamine Dyes and Related Compounds. VI. Chloride and Amides of Sulforhodamine B," I. S. Ioffe et al., Zh. Obsch. Khim. (1962), 32, 1489–92, the disclosure of which is totally incorporated herein by reference, discloses that sulforhodamine B (5 g., dried at 1250) and 3 g. $PCl_5$ heated in 50 milliliters $CHCl_3$ for 4 hours, then extd. with cold $H_2O$ to remove excess $PCl_6$, gave, after concentration of the dried organic layer and treatment of the residue with much cold petroleum ether, the dark red p-sulfonyl chloride, $C_{27}H_{29}O_6N_2S_2Cl$, which slowly forms the original compound on contact with $H_2O$. With $NH_3$ in $CHCl_3$ it gave the corresponding p-sulfonamide, 81%, red-violet powder, sol. in EtOH or AcOH; similarly was prepared the p-sulfonanilide, brown-violet solid. These have absorption spectra similar to the original compound but with less intense absorption. The p-sulfonyl chloride has a more intense absorption than the amides.

"Rhodamine Dyes and Related Compounds. V. α-Pyridylrhodamine," I. S. Ioffe et al., Zh. Obsch. Khim. (1962), 32, 1485–9, the disclosure of which is totally incorporated herein by reference, discloses a process wherein heating 3,6-dichlorofluorane with 2-aminopyridine in the presence of $ZnCl_2$ for 3 hours at 160–80° gave, after extraction with hot $H_2O$ and EtOH and crystallization of the residue from aqueous $Me_2CO$, 3-chloro-6-α-pyridylaminofluorane-HCl, m. 280–2°; free base, m. 185–7°. This heated with 2-aminopyridine and $ZnCl_2$ at 250–60° for 6 hours, then precipitated from hot EtOH—HCl with $H_2O$, gave red N,N'-bis(α-pyridyl)rhodamine-HCl, m. 238–40°, also formed directly from dichlorofluorane and excess aminopyridine at 250–60°. Similarly, 3-chloro-6-anilino-fluorane gave red-violet N-phenyl-N'-α-pyridylrhodamine-HCl, m. 225–30°. All these were converted to N,N'-diphenylrhodamine by heating with $PhNH_2$ and $ZnCl_2$ for 3 hours at 180–200°. The absorption spectra of the products are shown; dipyridylrhodamine has a more intense color than other members of the group.

"Rhodamine Dyes and Related Compounds. IV. Aryl- and Benzylrhodamines," I. S. Ioffe et al., Zh. Obsch. Khim. (1962), 32, 1480–5, the disclosure of which is totally incorporated herein by reference, discloses a process wherein heating fluorescein chloride with $ArNH_2$ in the presence of $ZnCl_2$—ZnO for 4 to 5 hours at 210–20° gave, after leaching with hot dil. HCl, soln. of the residue in hot $PhNH_2$, and pptn. with dil. HCl, the following N,N'-diarylrhodamines which were isolated as HCl salts: Ph, m. 255–60°; o-meC$_6$H$_4$, m. 205–10°; m-meC$_6$H$_4$, m. 195–200°; p-meC$_6$H$_4$, m. 255–60°. $PhCH_2NH_2$ similarly gave N,N'-dibenzylrhodamine, m. 160–5°, HCl salt decomp. 160–5°; di-HCl salt decomp. 210°. $PhCH_2NH_2$ and 3-chloro-6-anilinofluorane gave 90–5% N-phenyl-N'-benzylrhodamine isolated as the HCl salt, m. 200–10°. The absorption spectra of these rhodamines are shown. Dibenzylrhodamine fluoresces strongly in solution, while the phenyl benzyl analog has a weak fluorescence. The benzyl groups cause a bathochromic shift of the absorption band in the substituted rhodamines; the diarylrhodamines form blue-violet solutions unlike the orange-yellow produced by unsubstituted rhodamine. The di-HCl salt of dibenzylrhodamine loses one HCl in soln. as shown by behavior in EtOH.

"Rhodamine Dyes and Related Compounds. III. Reaction of m-aminophenol With Phthalic Anhydride in Hot Sulfuric Acid," I. S. Ioffe et al., Zh. Obsch. Khim. (1962), 32, 1477–80, the disclosure of which is totally incorporated herein by reference, discloses that heating 25 g. of m-H$_2$NC$_6$H$_4$OH with 20 g. o-C$_6$H$_4$(CO)$_2$O in 100 milliliters concentrated $H_2SO_4$ at 160–200° for 2–8 hours was used to examine the effects of conditions of condensation on the reaction products. Rhodamine formation began at 170° and reached a max. (20%) in 2 hours at 190°. Rhodol was a constant byproduct as a result of partial deamination of rhodamine. The deamination is promoted by longer reaction time and higher temperatures. These factors also promoted the formation of a dark, amorphous material. o-Hydroxysulfanilic acid was formed in the reaction in up to 32% yield at 1609 in 2 hours; more drastic conditions lowered its yield rapidly. Prior to the appearance of substantial amounts of rhodamine in the mixture, sulfonation of m-H$_2$C$_6$H$_4$OH takes place, and the resulting compound appears to be the intermediate which reacts, with this compound forming rhodamine by displacement of the sulfonic acid group. This was confirmed by reaction: of o-C$_6$H$_4$(CO)$_2$O with o-hydroxysulfanilic acid under the conditions shown above. m-Aminosalicylic acid also yields the same products in a mixture similar to that formed by m-H$_2$C$_6$H$_4$OH.

"Rhodomine Dyes and Related Compounds. XVIII. N,N'-Dialkylrhodamines with. Long Chain Hydrocarbon Radicals," 1. S. Ioffe et al., Zh. Organ. Khim. (1970), 6(2), 369–71, the disclosure of which is totally incorporated herein by reference, discloses a process wherein the condensation of I (X=Cl) with $RNH_2$ (R=C$_6$H$_{13}$, C$_8$H$_{17}$, C$_{16}$H$_{33}$, or C$_{18}$H$_{37}$) gave the title dyes (I, X=NHR) (II.) The presence of alkyl groups in II did not change their color in comparison with II (R=H); all II absorbed strongly at 523–6 nm. However, long alkyl chains altered the hydrophobic properties of II as shown by the change of their partition coefficients in oil-alc. or kerosine-alc. systems with the length of R chain.

"Rhodamine Dyes and Related Compounds. XIX. Mutual Transformations of Colorless and Colored Forms of N,N'-Substituted Rhodamine," I. S. Ioffe et al., Zh. Organ. Khim. (1972), 8(8), 1726–9, the disclosure of which is totally incorporated herein by reference, discloses that substituted rhodamines give colored solutions in polar and colorless solutions in nonpolar solvents. The solvent polarity at which the colorless lactone form is converted to the quinoid, internal salt form depends on the number and structure of alkyl, aryl, or H substituents. Absorption spectra of N,N'-diethylrhodamine in water-dioxane mixtures show how the light absorption increases when the solvent polarity (i.e., water amount in the mixture) is increased.

"Synthesis of N-Substituted Flaveosines, Acridine Analogs of Rhodamine Dyes," I. S. Ioffe et at., Zh. Org. Khim. (1966), 2(9), 1721, the disclosure of which is totally incorporated herein by reference, discloses that o-(3,6-chloro-9-acridinyl)benzoic acid heated with $BuNH_2$ or $Bu_2NH$ readily gave the hydrochlorides.

"Rhodamine Dyes and Related Compounds. XVII. Acridine. Analogs of Rhodamine and Fluorescein," I. S. Ioffe et al., Zh. Organ. Khim. (1966), 2(5), 927–31, the disclosure of which is totally incorporated herein by reference, discloses absorption spectra for flaveosin, fluorescein, azafluorescein, their Et esters and diacetyl derivatives. Replacement of the xanthene structure by the acridine group changed the spectra of such dyes. Azafluorescein heated with $PCl_5$ at 95–100° gave o-(3,6-dichloro-9-acridinyl)-benzoic acid, decomp. >300°; its uv spectrum was similar to that of unsubstituted acridinylbenzoic acid. One of the flaveosin compounds heated with 25% $H_2SO_4$ in a sealed tube 10 hours at 200–20° gave azafluorescein, decomp. >380°; heated with EtOH—$H_2SO_4$ it gave one of the flaveosins, decomp. >300° $Ac_2O$—$H_2SO_4$ gave in 1 hour one of the flaveosins, decomp. 206°. The compound formed by treatment of 3,6-dichlorofluorane with $NH_3$ was prepared. Its uv spectrum is given.

"New Lipophilic Rhodamines and Their Application to Optical Potassium Sensing," T. Werner et al., *Journal of Fluorescence*, Vol. 2, No. 3, pp. 93–98 (1992), the disclosure of which is totally incorporated herein by reference, discloses the synthesis of new lipophilic fluorescent rhodamines directly from 3,6-dichlorofluoresceins and the respective long-chain amines with excellent solubility in lipids and lipophilic membranes. Spectrophotometric and luminescent properties of the dyes are reported and discussed with respect to their application in new optical ion sensors. One rhodamine was applied in a poly(vinyl chloride)-based sensor membrane for continuous and sensitive optical determination of potassium ion, using valinomycin as the neutral ion carrier.

U.S. Pat. No. 1,991,482 (Allemann), the disclosure of which is totally incorporated herein by reference, discloses a process of producing rhodamine dyes which comprises condensing a halogenated primary amine of the benzene series with fluorescein dichloride and sulfonating the condensed product.

U.S. Pat. No. 5,847,162 (Lee et al.), the disclosure of which is totally incorporated herein by reference, discloses a class of 4,7-dichlororhodamine compounds useful as fluorescent dyes having the structure

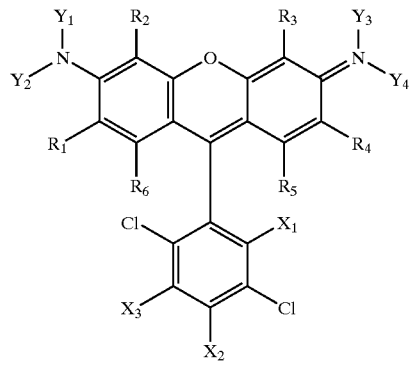

wherein $R_1$–$R_6$ are hydrogen, fluorine, chlorine, lower alkyl lower alkene, lower alkyne, sulfonate, sulfone, amino, amido, nitrile, lower alkoxy, lining group, or combinations thereof or, when taken together, $R_1$ and $R_6$ is benzo, or, when taken together, $R_4$ and $R_5$ is benzo; $Y_1$–$Y_4$ are hydrogen or lower alkyl or, when taken together, Y, and $R_2$ is propano and $Y_2$ and $R_1$ is propano, or, when taken together, $Y_3$ and $R_3$ is propano and $Y_4$ and $R_4$ is propano; and $X_1$–$X_3$ taken separately are selected from the group consisting of hydrogen, chlorine, fluorine, lower alkyl carboxylate, sulfonic acid, —$CH_2OH$, and linking group. In another aspect, the; invention includes reagents labeled with the 4,7-dichlororhodamine dye compounds, including deoxynucleotides, dideoxynucleotides, and polynucleotides. In an additional aspect, the invention includes methods utilizing such dye compounds and reagents including dideoxy pblynucleotide sequencing and fragment analysis methods.

U.S. Pat. No. 4,935,059 (Mayer et al.), the disclosure of which is totally incorporated herein by reference, discloses basic rhodamine dyes suitable for use in recording fluids for the ink jet process and for coloring paper stock having the formula

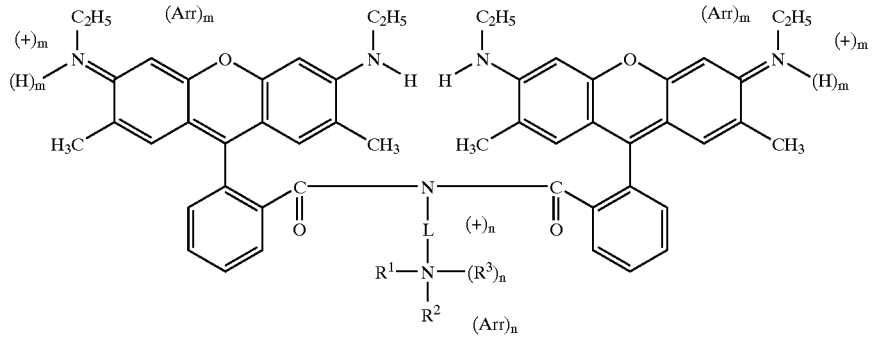

where L is $C_2$–$C_{10}$-alkylene, $R^1$, $R^2$, and $R^3$ are each independently of the others hydrogen, substituted or unsubstituted $C_1$–$C_{10}$-alkyl or $C_5$–$C_7$-cycloalkyl or $R_1$ and $R^2$ together with the nitrogen atom linking them together are a hetero cyclic radical, $An^-$ is one equivalent of an anion and m and n are each independently of the other 0 or 1.

U.S. Pat. No. 4,647,675 (Mayer et al.), the disclosure of which is totally incorporated herein by reference, discloses compounds of the general formula

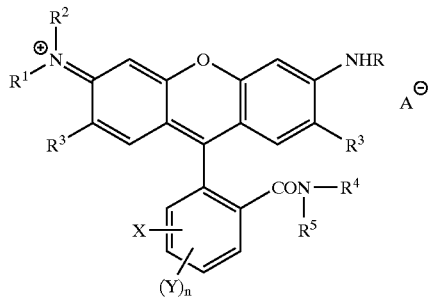

where $A^-$ is an anion, R is hydrogen or unsubstituted or substituted alkyl or cycloalkyl, $R^1$ and $R^2$ independently of one another are each hydrogen or unsubstituted or substituted alkyl or cycloalkyl, or one of the radicals may furthermore be aryl, or $R^1$ and $R^2$, together with the nitrogen atom, form a saturated heterocyclic structure, the radicals $R^3$ independently of one another ore each hydrogen or $C_1$–$C_4$-alkyl, $R^4$ and $R^5$ independently of one another are each unsubstituted or substituted alkyl or cycloalkyl, or one of the radicals may furthermore be hydrogen aryl or hetaryl, $R_4$ and $R^5$, together with the nitrogen atom, form a saturated heterocyclic structure, n is 1, 2 or 3, X is hydrogen, chlorine, bromine, $C_1$–$C_4$-alkyl, $C_1$–$C_4$-alkoxy or nitro and Y is hydrogen or chlorine, are particularly useful for dyeing paper stocks.

U.S. Pat. No. 1,981,515 (Kyrides), the disclosure of which is totally incorporated herein by reference, discloses intermediates for rhodamine dyestuffs.

U.S. Pat. No. 1,981,516 (Kyrides), the disclosure of which is totally incorporated herein by reference, discloses intermediates for secondary alkylated rhodamine dyes.

British Patent Publication GB 421 737, the disclosure of which is totally incorporated herein by reference, discloses dyes of the rhodamine series which are prepared by condensing naphthalene-2:3-dicarboxylic acid with a m-aminophenol in which the nitrogen group is substituted by one or two alkyl groups, the products, if desired, being sulphonated. The unsulphonated products may be used as lake colouring matters whilst the sulphonoted dyes are acid wool dyes. In examples, (1) naphthalene-2:3-dicarboxylic acid is condensed with diethyl-m-aminophenol in the presence of zinc chloride giving a product which dyes tannin-mordanted cotton in the same shade as Rhodamine B and a sulphonated product which dyes wool bluish-red shades; (2) monoethyl-m-aminophenol is used instead of the diethyl-m-aminophenol in example (1), yielding a dye, which when sulphonated dyes wool red-orange shades: (3) 2-ethylamino-p-cresol replaces the diethyl-n)-aminophenol in example (1), yielding a dye dyeing and printing tannin-mordanted cotton in shades similar to Rhodamine 69BS and when sulphonated dyeing wool red.

Japanese Patent Publication JP 61221265, the disclosure of which is totally incorporated herein by reference, discloses rhodamine compounds of formula I

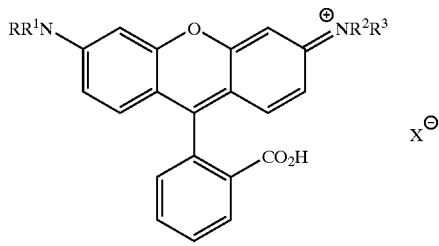

wherein $R_1$, $R_3$ are each lower alkyl; $R_2$ is lower alkyl; 10C or higher long-chain alkyl; $R_4$ is 10C or higher long-chain alkyl; $X^-$ is an anion, or squarylium compounds of formula II

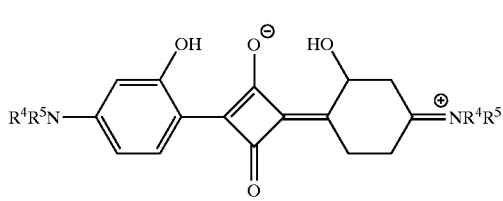

wherein $R_2$ is 10C or higher long-chain alkyl. Example: 3,6-diethyl-N,N'-dioctadecyl) diamino-9-(2-carboxyphenyl) xanthilium perchlorate. Use: materials for molecular electronics, which are suitable for use as materials for photoelectric converter, optical memory, etc. Preparation: 2-(4-N,N'-diethylamino-2-hydroxybenzoyl)-benzoic acid, which is a condensate between N-ethyl-N-octadecyl-m-hydroxyaniline and phthalic anhydride, is reacted with N-ethyl-N-octadecyl-m-hydroxyaniline to obtain the compound, of formula I. 3-HOC$_6$H$_4$N(Et)(CH$_2$)$_{17}$Me and phthalic anhydride were heated at 150° for 4 hours, treated with aqueous NH$_3$, and the amorphous intermediate mixed with aqueous HClO$_4$ forming a compound of formula I (R=R$_2$=Et; R$_1$=R$_3$=C$_{18}$H$_{37}$; X=ClO$_4$), having $\lambda_{max}$ (MeOH) 550 nm.

U.S. Pat. No. 5,084,099 (Jaeger et al.), the disclosure of which is totally incorporated herein by reference, discloses modified phase change ink compatible colorants which comprise a phase change ink soluble complex of (a) a tertiary alkyl primary amine and (b) dye chromophores, i.e., materials that absorb light in the visible wavelength region to produce color having at least one pendant acid functional group in the free acid form (not the salt of that acid). These modified colorants are extremely useful in producing phase change inks when combined with a phase change ink carrier, even though the unmodified dye chromophores have limited solubility in the phase change ink carrier. Thin films of uniform thickness of the subject phase change ink compositions which employ the modified phase change ink colorants exhibit a high degree of lightness and chroma. The primary amine-dye chromophore complexes are soluble in the phase change ink carrier and exhibit excellent thermal stability.

U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the invention, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,747,554 (Sacripante et al.), the disclosure of which is totally incorporated herein by reference, discloses an ink composition comprising a polyesterified-dye (I) or polyurethane-dye (II) with a viscosity of from about 3 centipoise to about 20 centipoise at a temperature of from about 125° C. to about 165° C. and represented by the formulas

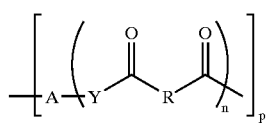

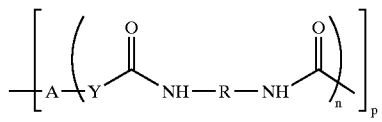

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

European Patent Publication 0 565 798 (Shustack), the disclosure of which is totally incorporated herein by reference, discloses ultraviolet radiation-curable primary and secondary coating compositions for optical fibers. The primary coatings comprise a hydrocarbon polyol-based reactively terminated aliphatic urethane oligomer; a hydrocarbon monomer terminated with at least one end group capable of reacting with the terminus of the oligomer; and an optional photoinitiator. The secondary coatings comprise a polyester and/or polyether-based aliphatic urethane reactively terminated oligomer; a hydrocarbonaceous viscosity-adjusting component capable of reacting with the reactive terminus of (I); and an optional photoinitiator. Also disclosed are optical fibers coated with the secondary coating alone or with the primary and secondary coatings of the invention.

While known compositions and processes are suitable for their intended purposes, a need remains for new magenta colorant compositions. In addition, a need remains for magenta colorant compositions particularly suitable for use in phase change inks. Further, a need remains for magenta colorants with desirable thermal stability. Additionally, a need remains for magenta colorants that exhibit minimal undesirable discoloration when exposed to elevated temperatures. There is also a need for magenta colorants that exhibit a desirable brilliance. In addition, there is a need for magenta colorants that exhibit a desirable hue. Further, there is a need for magenta colorants that are of desirable chroma. Additionally, there is a need for magenta colorants that have desirably high lightfastness characteristics. A need also remains for magenta colorants that have a desirably pleasing color. In addition, a need remains for magenta colorants that exhibit desirable solubility characteristics in phase change ink carrier compositions. Further, a need remains for magenta colorants that enable phase change inks to be jetted at temperatures of over 135° C. while maintaining thermal stability. Additionally, a need remains for magenta colorants that enable phase change inks that generate images with low pile height. There is also a need for magenta colorants that enable phase change inks that generate images that approach lithographic thin image quality. In addition, there is a need for magenta colorants that exhibit oxidative stability. Further, there is a need for magenta colorants that do not precipitate from phase change ink carriers. Additionally, there is a need for magenta colorants that do not, when included in phase change inks, diffuse into adjacently printed inks of different colors. A need also remains for magenta colorants that do not leach from media such as phase change ink carriers into tape adhesives, paper, or the like. In addition, a need remains for magenta colorants that, when incorporated into phase change inks, do not lead to clogging of a phase change ink jet printhead. Further, there is a need for magenta colorants that enable phase change inks that generate images with sharp edges that remain sharp over time. Additionally, there is a need for magenta colorants that enable phase change inks that generate images which retain their high image quality in warm climates. Further, there is a need for magenta colorants that enable phase change inks that generate images of desirably high optical density. Additionally, there is a need for magenta colorants that, because of their good solubility in phase change ink carriers, enable the generation of images of low pile height without the loss of desirably high optical density. A need also remains for magenta colorants that enable cost-effective inks.

SUMMARY

The present invention is directed to a phase change ink composition comprising a phase change ink carrier and a colorant compound of the formula

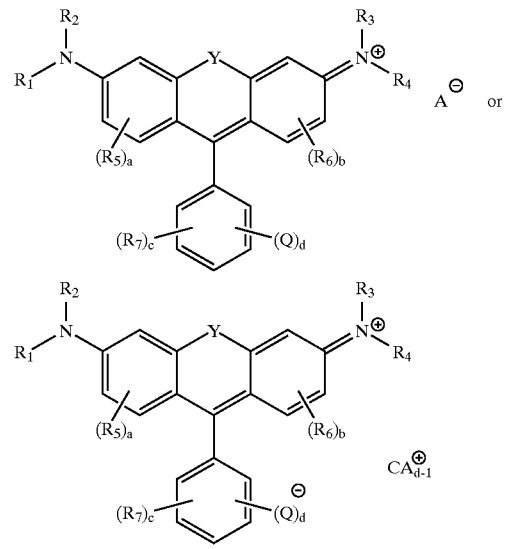

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ con be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a, phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

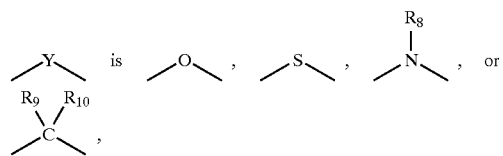

$R_8$, $R_9$, and $R_{10}$ each, independently of the others, is (i) a hydrogen atom, (ii) an alkyl group, (iii) an aryl group, (iv) an arylalkyl group, or (v) an alkylaryl group, provided that the number of carbon atoms in $R_1+R_2+R_3+R_4+R_5+R_6+R_7+R_8+R_9+R_{10}$ is at least about 16, Q is a COOH group or a $SO_3H$ group, $Q^-$ is a $COO^-$ group or a $SO_3^-$ group, d is an integer which is 1, 2, 3, 4, or 5, A is an anion, and CA is either a hydrogen atom or a cation associated with all but one of the Q⁻ groups, provided that when the colorant compound is of the formula

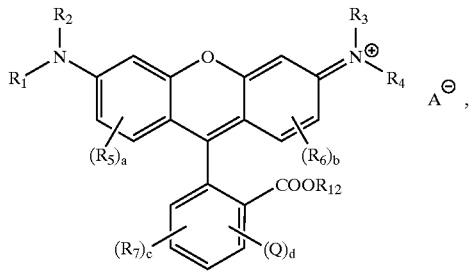

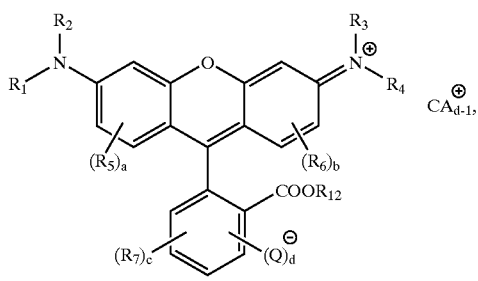

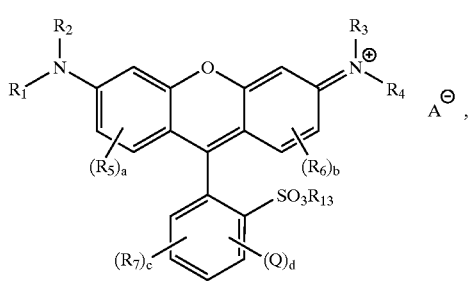

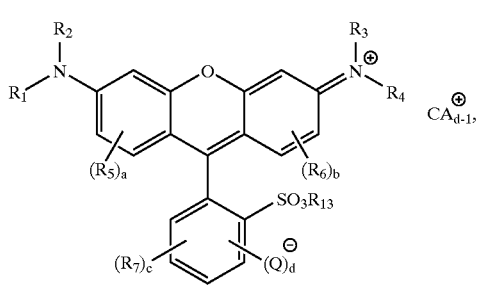

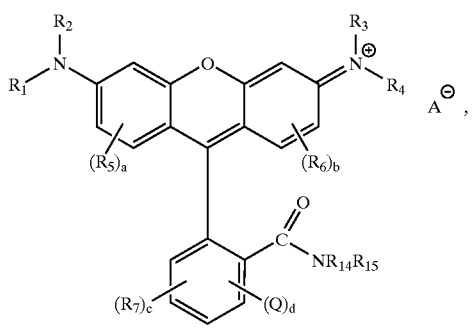

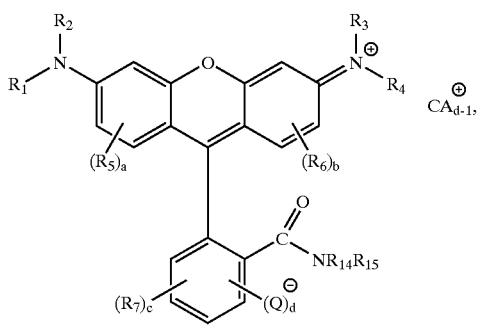

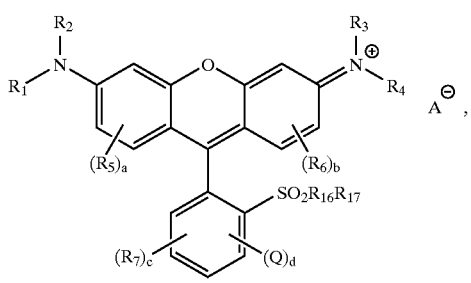

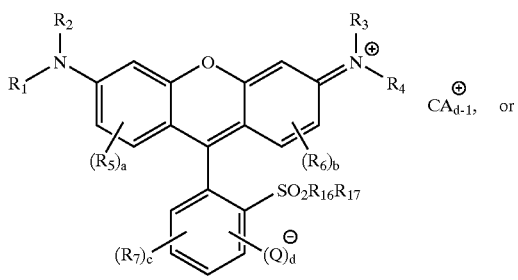

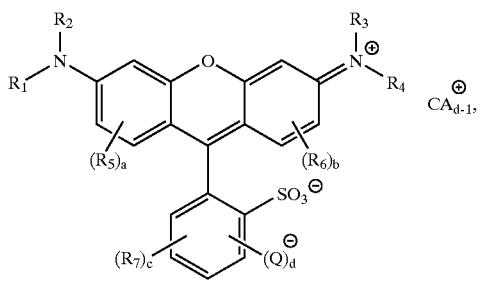

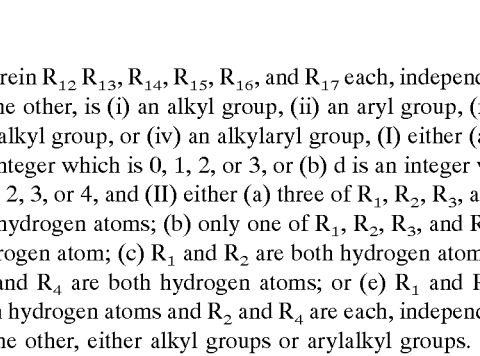

wherein $R_{12}$, $R_{13}$, $R_{14}$, $R_{15}$, $R_{16}$, and $R_{17}$ each, independently of the other, is (i) an alkyl group, (ii) an aryl group, (iii) an arylalkyl group, or (iv) an alkylaryl group, (I) either (a) c is an integer which is 0, 1, 2, or 3, or (b) d is an integer which is 1, 2, 3, or 4, and (II) either (a) three of $R_1$, $R_2$, $R_3$, and $R_4$ are hydrogen atoms; (b) only one of $R_1$, $R_2$, $R_3$, and $R_4$ is a hydrogen atom; (c) $R_1$ and $R_2$ are both hydrogen atoms; (d) $R_3$ and $R_4$ are both hydrogen atoms; or (e) $R_1$ and $R_3$ are both hydrogen atoms and $R_2$ and $R_4$ are each, independently of the other, either alkyl groups or arylalkyl groups.

DETAILED DESCRIPTION

The present invention is directed to phase change inks containing colorant compounds of the formula

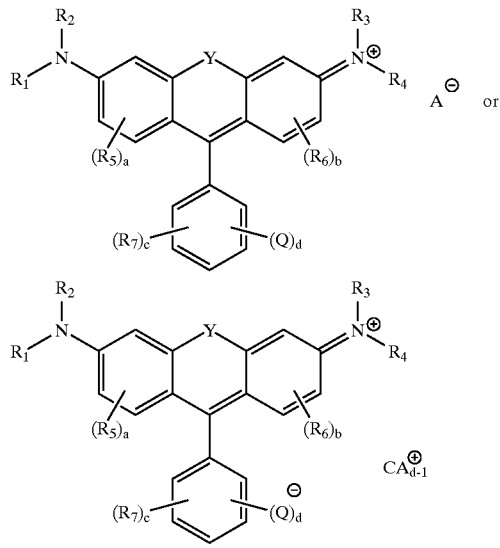

wherein $R_1$, $R_2$, $R_3$, and $R_4$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group); in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with, at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside, of these ranges, such as tolyl or the like, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both at the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like, (iv) an alkylaryl group including unsubstituted and substituted alkylaryl groups, wherein the alkyl portion of the alkylaryl group can be linear, branched; saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and yet another embodiment with no more than about 18 carbon atoms, although the number of carbon atoms can be outside of these ranges, such as tolyl or the like, (v) a halogen atom, such as fluorine, chlorine, bromine, iodine, or the like, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) ah acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the, central structure,

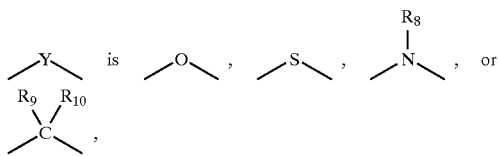

$R_8$, $R_9$, and $R_{10}$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon, atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges such as tolyl or the like, provided that the number of carbon atoms in $R_1+R_2+R_3+R_4+R_5+R_6+R_7+R_8+R_9+R_{10}$ is in one embodiment at least about 16 in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72, each, Q, independently of the others, is a COOH group or a $SO_3H$ group, each $Q^-$, independently of the others, is a $COO^-$ group or a $SO_3^-$ group, d is an integer which is 1, 2, 3, 4, or 5, A is an anion, with examples of suitable anions including (but not being limited to) $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, as well as mixtures thereof, and CA is either a hydrogen atom or a cation associated with all but one of the $Q^-$ groups, with examples of suitable cations including (but not being limited to) alkali metal cations, such as $Li^+$, $Na^+$, $K^+$, $Rb^+$, and $Cs^+$, nonpolymeric or monomeric ammonium and quaternary amine cations, including those of the general formula

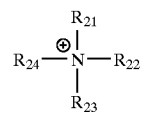

wherein each of $R_{21}$, $R_{22}$, $R_{23}$, and $R_{24}$, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon a atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of $R_{21}$, $R_{22}$, $R_{23}$, and $R_{24}$ can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups; nitro groups, nitroso groups, sulfone groups, acyl groups, acid anhydride groups, azide groups, azo groups, cyanato groups, isocyanato groups, thiocyanato groups, isothiocyanato, groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In situations wherein

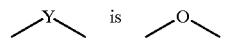

and either (i) one of the $R_7$ groups is in the ortho position and is either an ester based on a carboxylic acid, an ester based on a sulfonic acid, an amide based on a carboxylic acid, or an amide based on a sulfonic acid, or (ii) one of the $Q^-$ groups is a sulfonate salt, i.e., when the colorant compound is of the formula

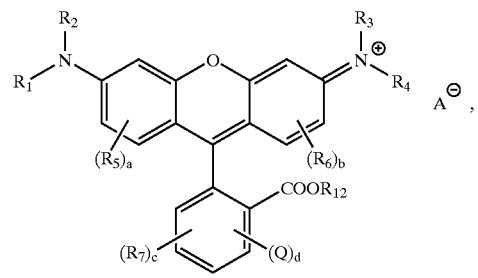

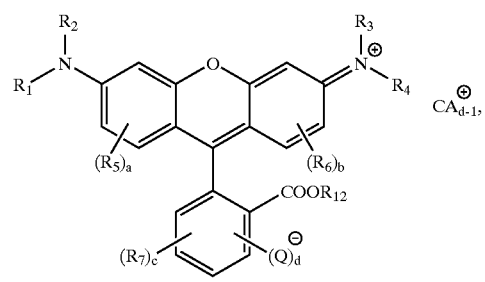

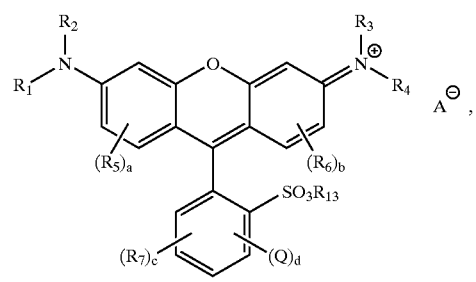

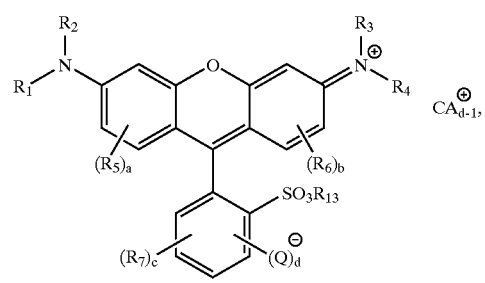

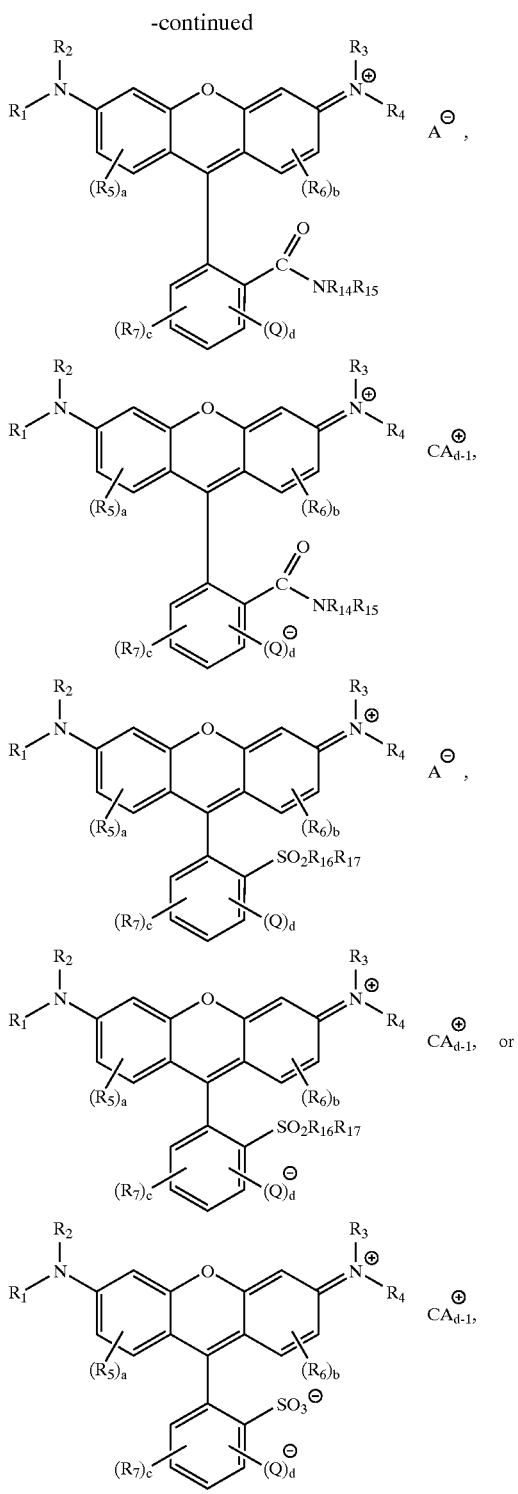

wherein $R_{12}$, $R_{13}$, $R_{14}$, $R_{15}$, $R_{16}$, and $R_{17}$ each, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 55 carbon atoms in another embodiment with no more than about 30 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like, wherein the substituents on the substituted alkyl, aryl, arylalkyl, and alkylaryl groups con be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, (I) either (a) c is an integer which is 0, 1, 2, or 3, or (b) d is an integer which is 1, 2, 3, or 4, and (II) either (a) three of $R_1$, $R_2$, $R_3$, and $R_4$ are hydrogen atoms; (b) only one of $R_1$, $R_2$, $R_3$, and $R_4$ is a hydrogen atom; (c) $R_1$ and $R_2$ are both hydrogen atoms; (d) $R_3$ and $R_4$ are both hydrogen atoms; or (e) $R_1$ and $R_3$ are both hydrogen atoms and $R_2$ and $R_4$ are each, independently of the other, either alkyl groups or arylalkyl groups.

In one embodiment, the number of carbon atoms in $R_1+R_2+R_3+R_4$ is at least about 16, in another embodiment at least about 18, in yet another embodiment at least; about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

Since hetero atoms can be included in the alkyl, aryl, arylalkyl, and alkylaryl groups, and since the groups can be substituted, it is to be understood that $R_1$, $R_2$, $R_3$, $R_4$, $R_5$, $R_6$, $R_7$, $R_8$, $R_9$, and $R_{10}$ can also be groups such as alkoxy, polyalkyleneoxy, aryloxy, polyaryleneoxy, arylalkyloxy, polyarylalkyleneoxy, alkylaryloxy, or polyalkylaryleneoxy groups, provided that the oxygen atom in such a group is not directly bonded to a nitrogen, oxygen, or sulfur atom in the

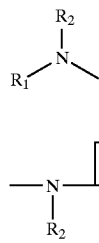

central structure.

Examples of situations wherein one of the $R_{1-4}$ groups is a cycloalkyl is when

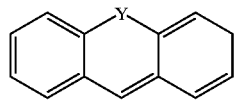 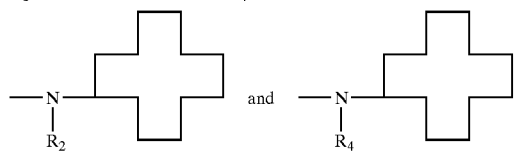

Examples of situations wherein the $R_{1-4}$ groups are joined together to form a ring are when

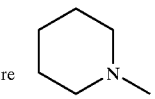 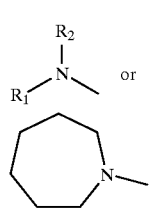

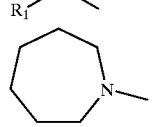

Examples of situations wherein one of the $R_{1-4}$ groups is joined to a phenyl ring in the central structure is when

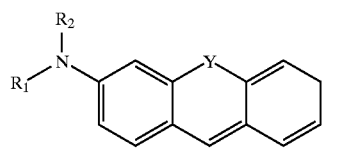

-continued

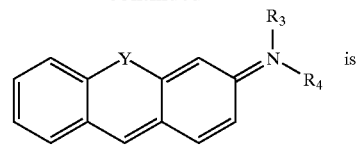

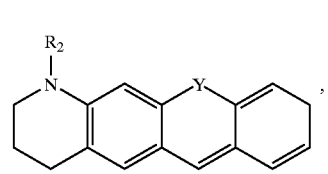

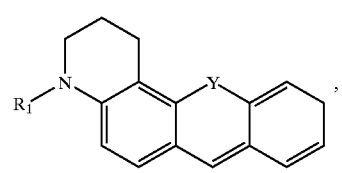

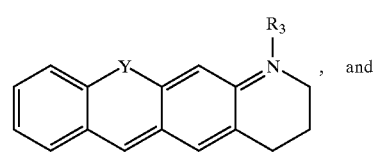

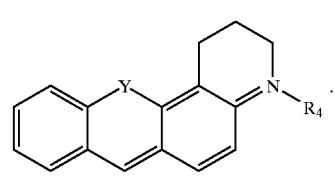

Compounds of the present invention include monocarboxylic acids and monocarboxylates, wherein

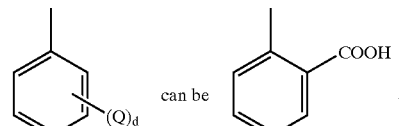

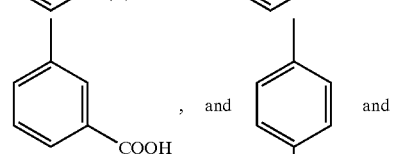

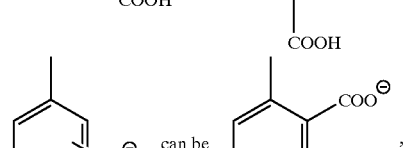

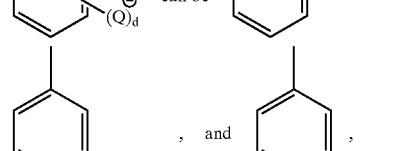

dicarboxylic acids and dicarboxylates, wherein
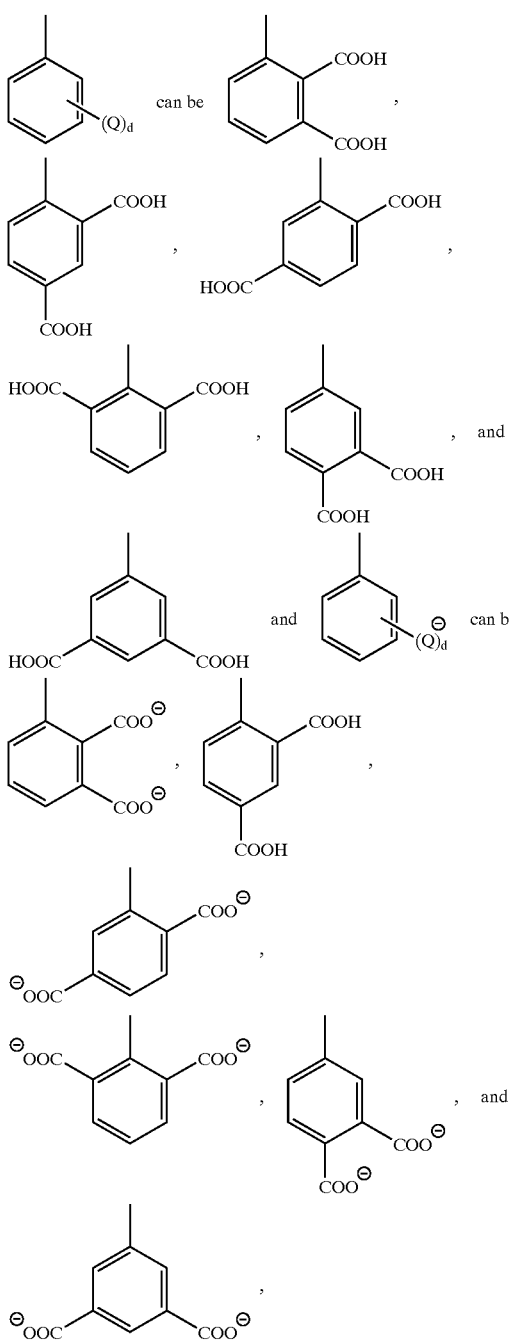
tricarboxylic acids and tricarboxylates, tetracarboxylic acids and tetracarboxylates, pentacarboxylic acids and pentacarboxylates, monosulfonic acids and monosulfonates, wherein
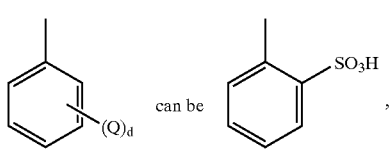
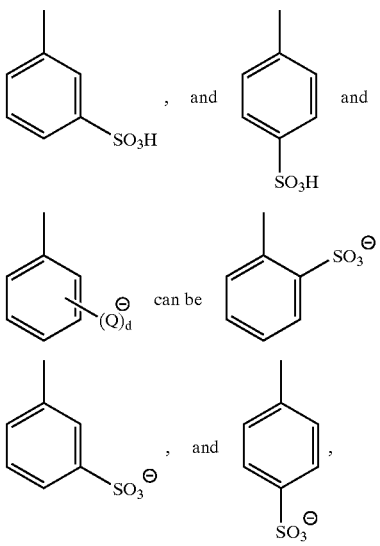
disulfonic acids and disulfonates, wherein
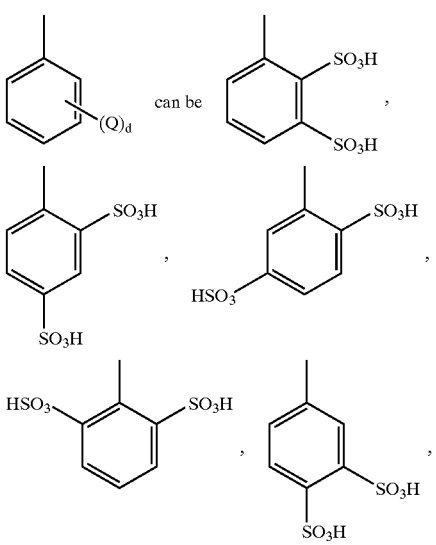
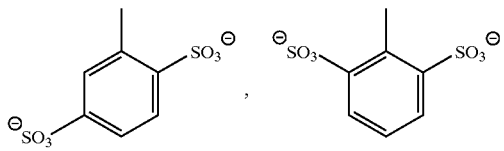

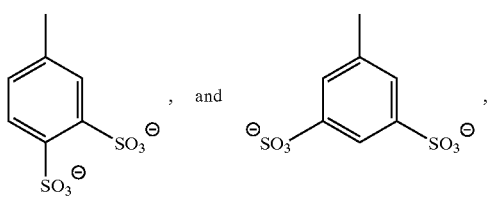

trisulfonic acids and trisulfonates, tetrasulfonic acids and tetrasulfonates, pentasulfonic acids and pentasulfonates, monocarboxylic acid monosulfonic acids and monocarboxylate monosulfonates, wherein

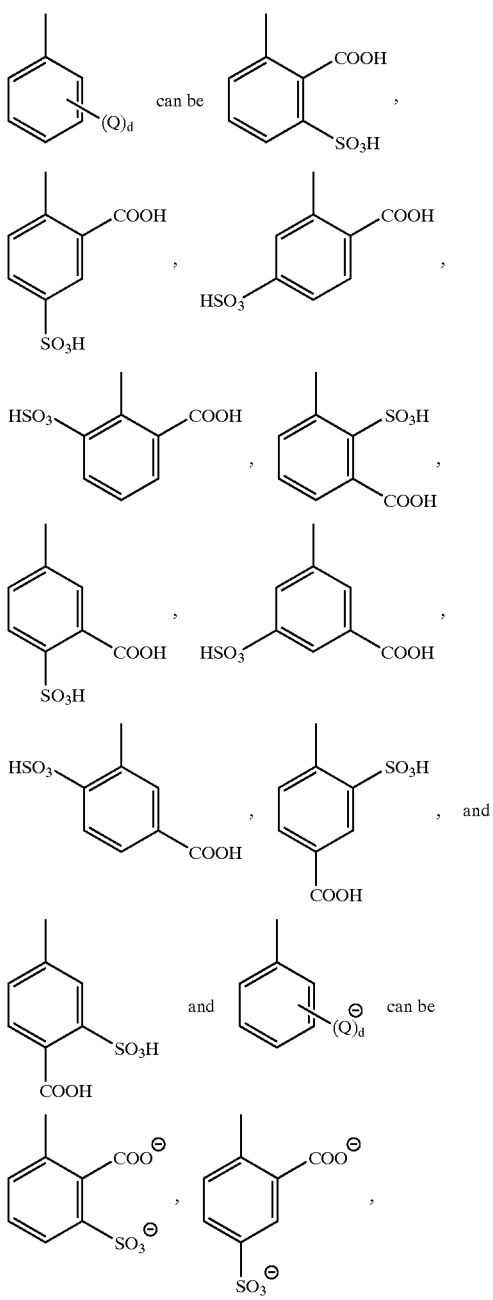

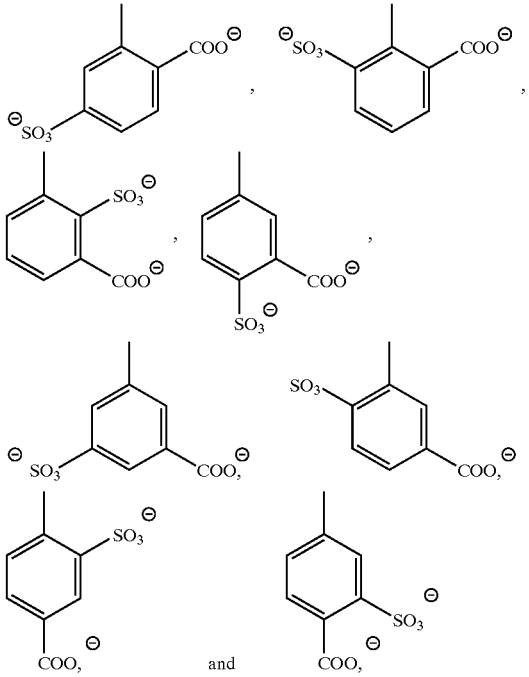

monocarboxylic acid disulfonic acids and monocarboxylate disulfonates, monocarboxylic acid trisulfonic acids and monocarboxylate trisulfonates, monocarboxylic acid tetrasulfonic acids and monocarboxylate tetrasulfonates, dicarboxylic acid monosulfonic acids and dicarboxylate monosulfonates, dicarboxylic acid disulfonic acids and dicarboxylate disulfonates, dicarboxylic acid trisulfonic acids and dicarboxylate trisulfonates, tricarboxylic acid monosulfonic acids and tricarboxylate monosulfonates, tricarboxylic acid disulfonic acids and tricarboxylate disulfonates, tetracarboxylic acid, monosulfonic acids and tetracarboxylate monosulfonates, and the like. In addition, it is possible for a compound according to the present invention to have both one or more acid groups (i.e., COOH or SO$_3$H) and one or more anionic salt groups (i.e., COO$^-$ or SO$_3^-$) present in the molecule.

Colorant compounds suitable for inks according to the present invention include rhodamines, wherein

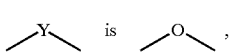 is 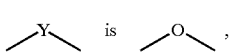, of the general formulae

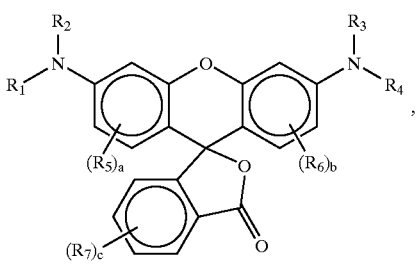

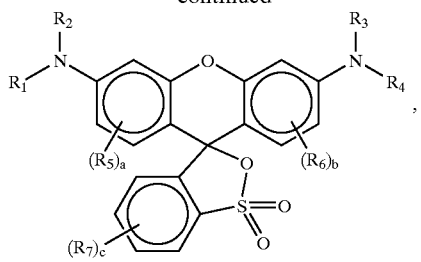
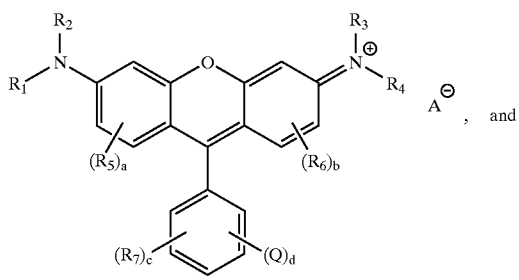
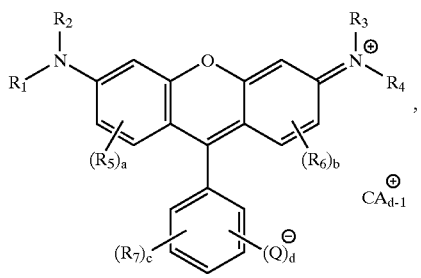
acridines, wherein
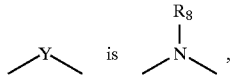 is ,
of the general formulae
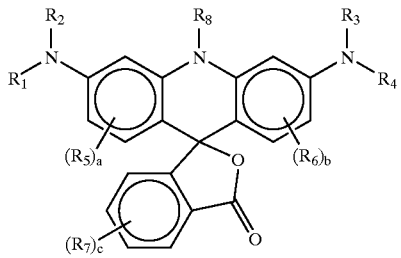
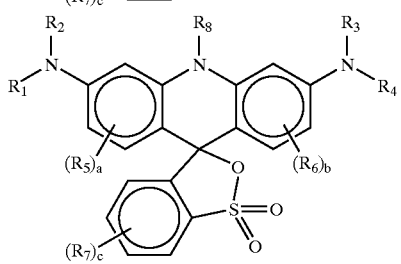
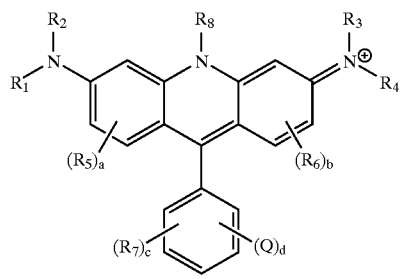
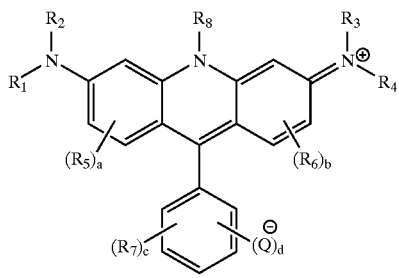
sulforhodamines, wherein
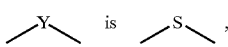 is ,
of the general formulae
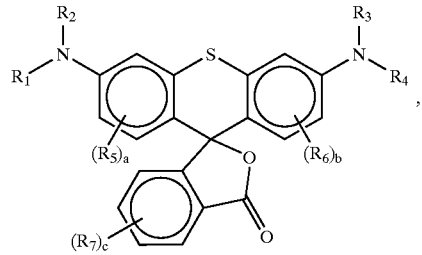
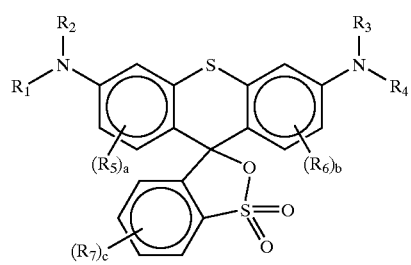
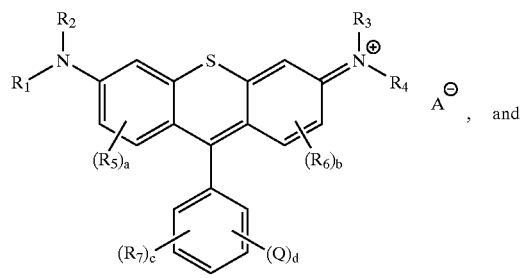

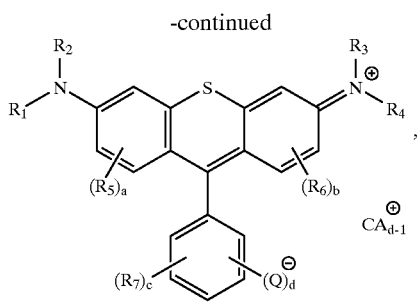

anthracenes, wherein

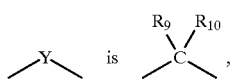 is 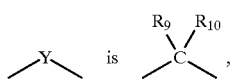, of the general formulae

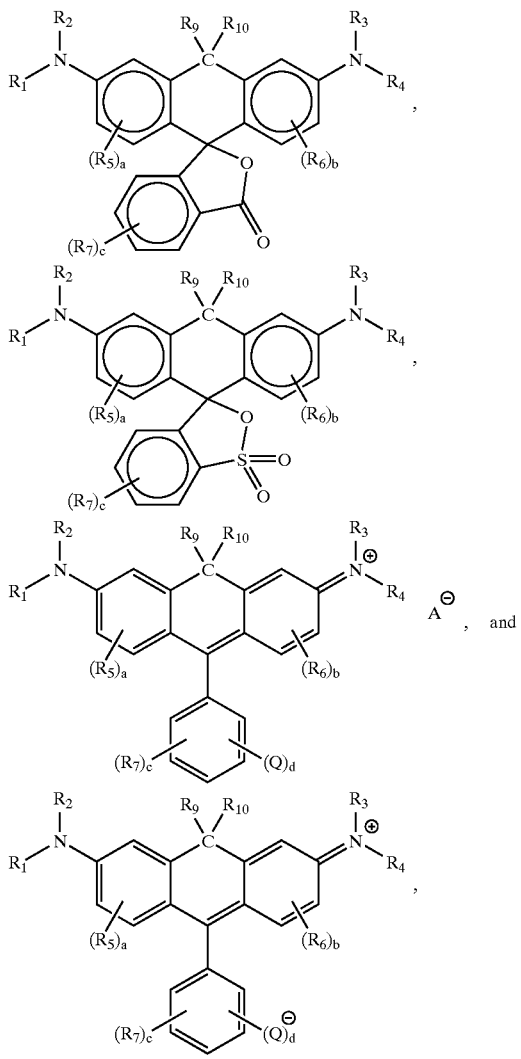

and the like.

In a specific embodiment, the anion A can be an organic dianion of the formula $A_1$-$R_{11}$-$A_2$ wherein $A_1$ and $A_2$ each, independently of the other, are anionic groups, such as carboxylate, sulfonate, or the like, and wherein $R_{11}$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, and wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups; aldehyde groups, ketone groups, ester groups, amide groups, carbonyl groups, thiocarbonyl groups, sulfate groups, sultanate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Examples of suitable organic dianions include unsubstituted and substituted naphthalene disulfonates, unsubstituted and substituted benzene disulfonates, and the like, as well as mixtures thereof.

In another specific embodiment, the anion A can be an organic trianion, tetraanion, and higher, an oligomeric and polymeric anion, such as a polysulfonate or polycarboxylate, or the like.

In one specific embodiment, the colorant compounds for inks according to the present invention are of the formulae

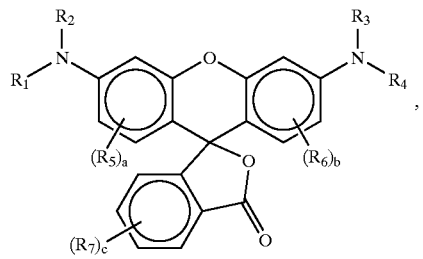,

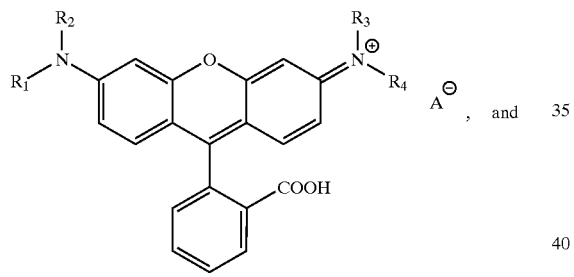, and

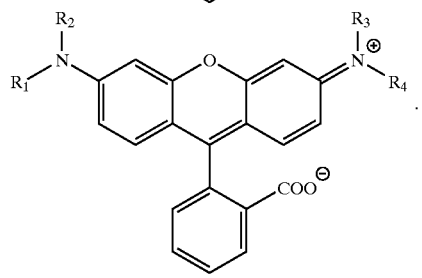.

It is to be understood that in colorants of the formulae

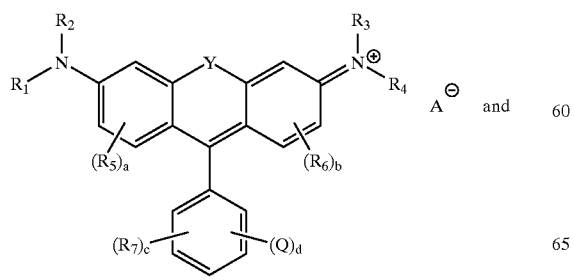 and

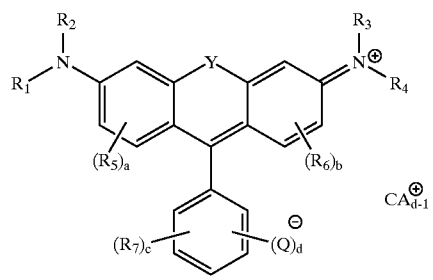

the positive charge is delocalized, and that other tautomeric structures can be drawn, including (but not limited to)

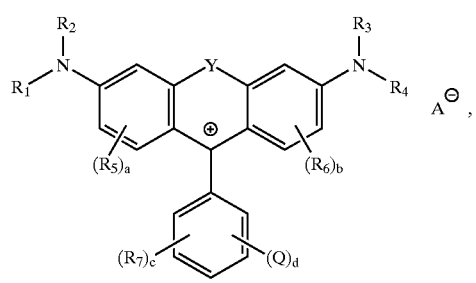,

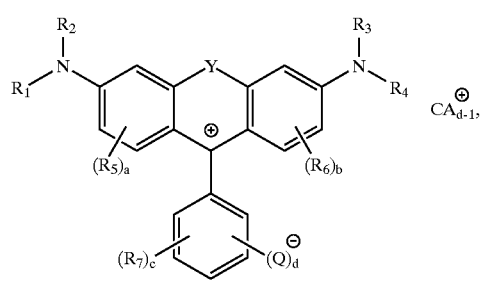,

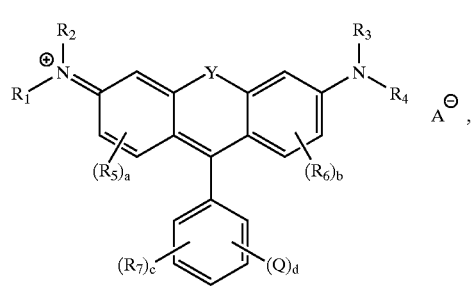,

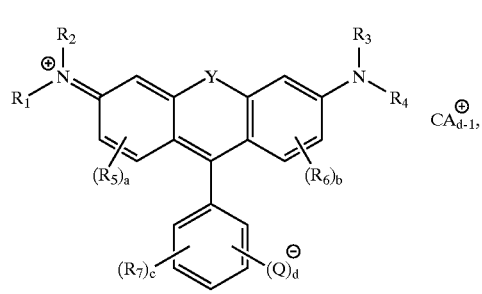

-continued

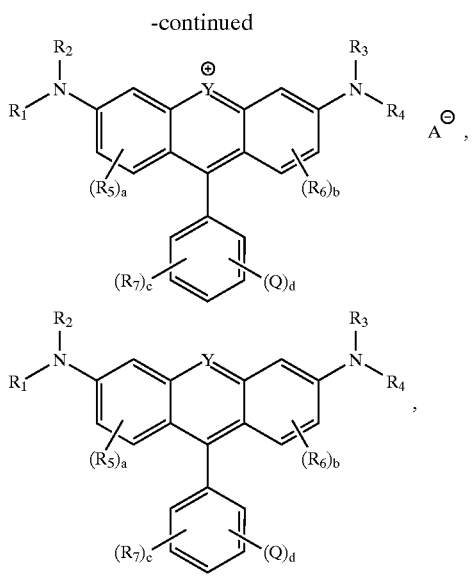

and the like. If is to be understood that all possible tautomeric forms of these, colorants are included within the above formulae.

Colorant compounds for inks of the present invention can be prepared by any desired or effective procedure. For example, a dihalofluorescein, such as dichlorofluorescein or the like, can be admixed with one or more amines having the desired $R_1$, $R_2$, $R_3$, and $R_4$ groups thereon, an optional zinc halide, such as zinc chloride or the like, and an optional nonnucleophilic base, such as calcium oxide, zinc oxide, or the like, either neat or, optionally, in the presence of a solvent.

The amine and the dihalofluorescein are present in any desired or effective relative amounts, in one embodiment at least about 0.9 mole of base per every one mole of dihalofluorescein, in another embodiment at least about 0.95 mole of base per every one mole of dihalofluorescein, and in yet another embodiment at least about 1 mole of base per every one mole of dihalofluorescein, and in one embodiment no more than about 20 moles of base per every one mole of dihalofluorescein, in another embodiment no more than about 10 moles of base per every one mole of dihalofluorescein, and in yet another embodiment no more than about 2 moles of base per every one mole of dihalofluorescein, although the relative amounts can be outside of these ranges.

Dichlorofluorescein is commercially available from, for example, Aldrich Chemical Co., Milwaukee, Wis. Dihalofluoresceins can also be prepared by the reaction of fluorescein with $PX_5$ wherein X is fluorine, chlorine, bromine, or iodine, or with a toluenesulfonylhalide, such as toluenesulfonylchloride or the like.

When an optional zinc halide is used, the dihalofluorescein and the zinc halide are present in any desired or effective relative amounts, in one embodiment at least about 2 moles of zinc halide per every one mole of dihalofluorescein, in another embodiment at least about 2.5 moles of zinc halide per every one mole of dihalofluorescein, and yet in another embodiment at least about 3 moles of zinc halide per every one mole of dihalofluorescein, and in one embodiment no more than about 5 moles of zinc halide per every one mole of dihalofluorescein, in, another embodiment no more than about 4.5 moles of zinc halide per every one mole of dihalofluorescein, and in yet another embodiment no more than about 4 moles of zinc halide per every one mole of dihalofluorescein, although the relative amounts can be outside of these ranges.

When an optional base is used, the base is present in any desired or effective amount, in one embodiment at least about 2 equivalents of base per every one mole of dihalofluorescein (i.e., about 2 moles of monobasic base per every one mole of dihalofluorescein, about 1 mole of dibasic base., such as calcium oxide, pert every one mole of dihalofluorescein, and the like), in another embodiment at least about 2.5 equivalents of base per every one mole of dihalofluorescein, and yet in another embodiment at least about 3 equivalents of base per every one mole of dihalofluorescein, and in one embodiment no, more than about 10 equivalents of base per every one mole of dihalofluorescein, in another embodiment no more than about 5 equivalents of base per every one mole of dihalofluorescein, and in yet another embodiment no more than about 3.2 equivalents of base per every one mole of dihalofluorescein, although the relative amounts can be outside of these ranges.

If desired, the reaction can be run neat, in the absence of a solvent. In addition, if desired, the reaction can be run in the presence of an optional solvent. Examples of suitable solvents include tetramethylene sulfone (sulfolane), N-methyl pyrrolidone, dimethyl formamide, dimethyl sulfoxide, octanol, or the like, as well as mixtures thereof. When present, the optional solvent is present in any desired or effective amount, in one embodiment at least about 1 liter per every 0.1 mole of dihalofluorescein, in another embodiment at least about 1 liter per every 0.3 mole of dihalofluorescein, and in yet another embodiment at least about 1 liter per every 0.35 mole of dihalofluorescein, and in one embodiment no more than about 1 liter per every 2 moles of dihalofluorescein, in another embodiment no more than about 1 liter per every 1.5 moles of dihalofluorescein, and in yet another embodiment no more than about 1 liter per every 1 mole of dihalofluorescein, although the relative amounts can be outside of these ranges.

The mixture of dihalofluorescein, amine, optional zinc halide, optional base, and optional solvent is then heated to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of dihalofluorescein, amine, optional zinc halide, optional base, and optional solvent is heated for any effective period of time, in one embodiment at least about 5 minutes, in another embodiment at least about 2 hours, and in yet another embodiment at least about 3, hours, and in one embodiment no more than about 4 days, in another embodiment no more than about 60 hours, and in yet another embodiment no more than about 40 hours, although the time can be outside of these ranges.

If desired, the resulting product can be purified by pouring the reaction mixture into an organic non-water-soluble and non-water-miscible solvent in which the product is soluble or miscible and in which undesirable salt byproducts are not soluble, such as methyl isobutyl ketone, toluene, hexane, heptane, or the like, followed by admixing the solvent containing the product with water in a separatory funnel and separating the aqueous and organic phases.

The crude product can then, if desired, be further purified by washing it with aqueous EDTA to remove metal salts, followed by washing with water. If desired, a titration or other instrumental technique, such as AA (atomic absorption) or ICP (inductively coupled plasma) can be performed to determine if the metal salts have been completely removed. The purified product can be isolated by distilling off any solvents.

Various substituents can be placed on the rings of the colorants of the present invention by any desired or effective method, such as, for example, the methods disclosed in U.S. Pat. No. 5,847,162 and U.S. Pat. No. 1,991,482, the disclosures of each of which are totally incorporated herein by reference.

Additional numbers of carbon atoms can be placed on the central structure by, for example, selecting long chain amines as reactants. Examples of such compounds include (but are not limited to) those of the formulae

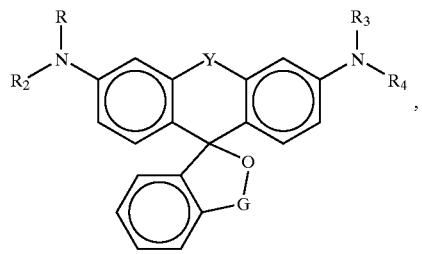

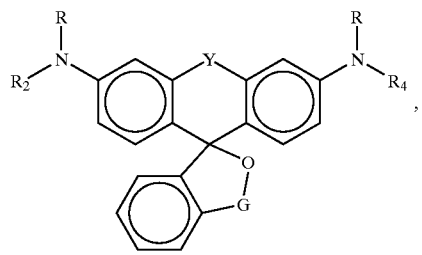

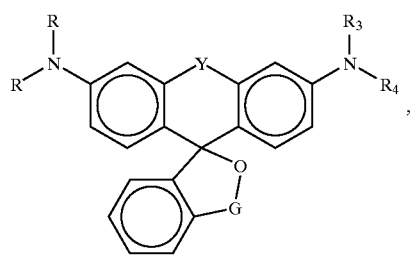

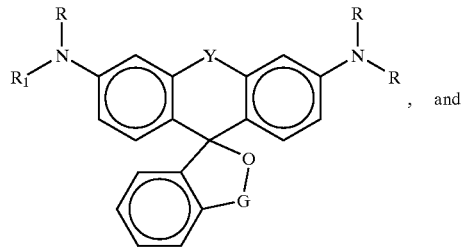

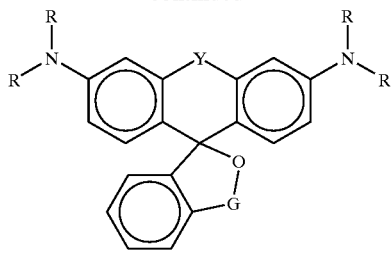

wherein Y, $R_1$, $R_2$, $R_3$, and $R_4$ have the same definitions as given hereinabove, G is either

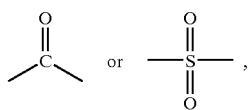

and (1) R is a linear alkyl group of the formula $—C_nH_{2n+1}$ wherein n is at least about 12, (2) R is a branched alkyl group of the formula $—C_nH_{2n+1}$ wherein n is at least about 12, (3) R is an ether group of the formula $—(CH_2)_3—O—C_nH_{2n+1}$ wherein n is at least about 11, and the like, as well as their ring-opened, or protonated, or free-base forms and their zwitterionic forms.

Additional numbers of carbon atoms can also be placed on the central structure by, for example, first preparing the corresponding alcohols and then reacting these alcohols with, for example, high-carbon-number acids to prepare esters, high-carbon-number isocyanates to prepare urethanes, or the like. Examples of such compounds include (but are not limited to) those of the formulae

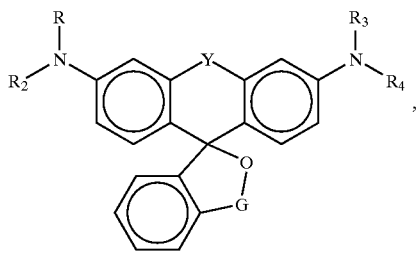

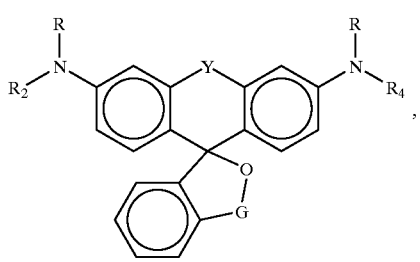

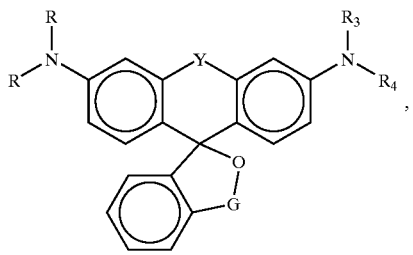

-continued

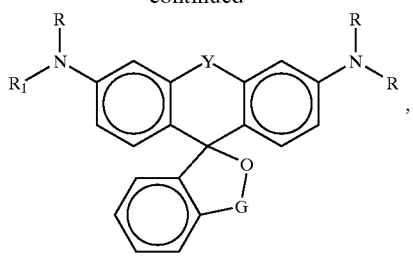
, and

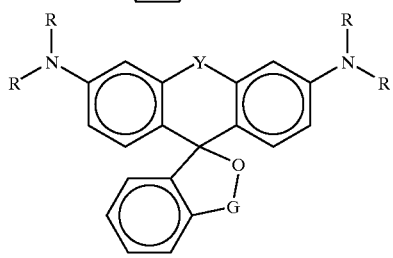

wherein Y, $R_1$, $R_2$, $R_3$, and $R_4$ have the some definitions as given hereinabove, G is either

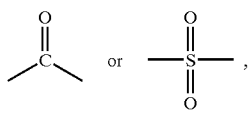

and (1) R is a group of the formula

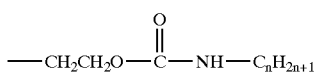

wherein n is at least about 12, (2) R is a group of the formula

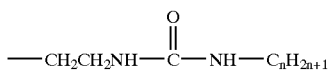

wherein n is at least about 12, (3) R is a group of the formula

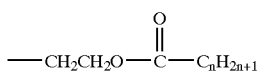

wherein n is at least about 12, (4) R is a group of the formula

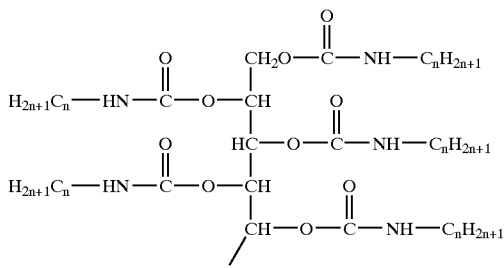

wherein n is at least about 12, (5) R is a group of the formula

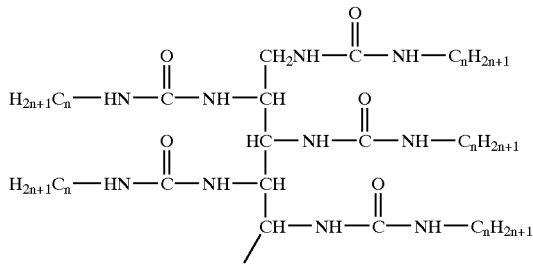

wherein n is at least about 12, (6) R is a group of the formula

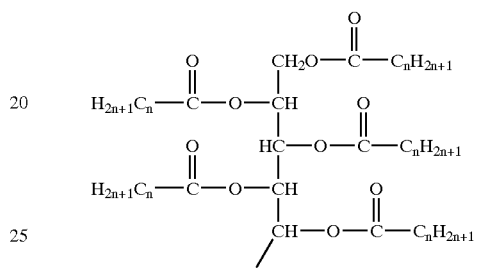

wherein n is at least about 12, (7) two R groups on the same nitrogen atom form a group, with the nitrogen atom, of the formula

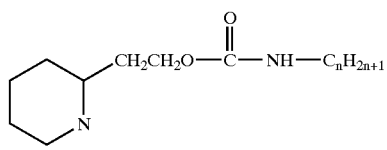

wherein n is at least about 12, (8) two R groups on the same nitrogen atom form a group, with the nitrogen atom, of the formula

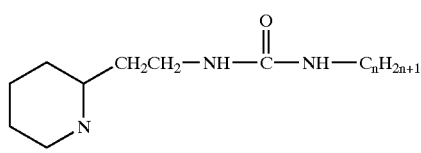

wherein n is at least about 12, (9) two R groups on the same nitrogen atom form a group, with the nitrogen atom, of the formula

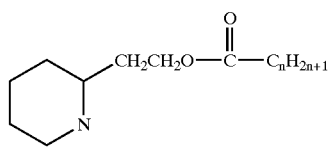

wherein n is at least about 12, and the like, as well as their ring-opened, or protonated, or free-base forms and their zwitterionic forms.

Some specific examples of such compounds include (a) those of the formulae

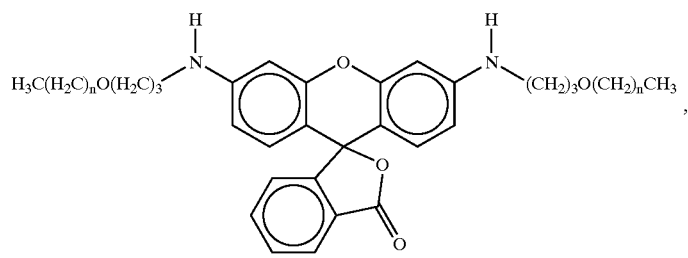
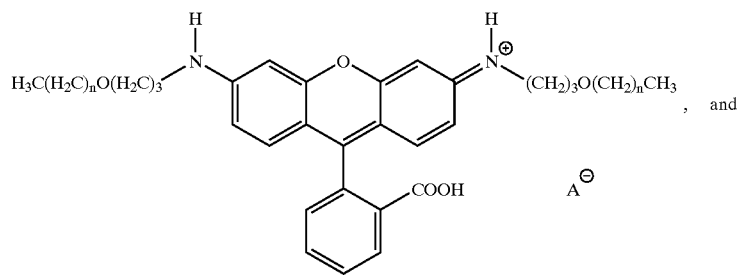
, and
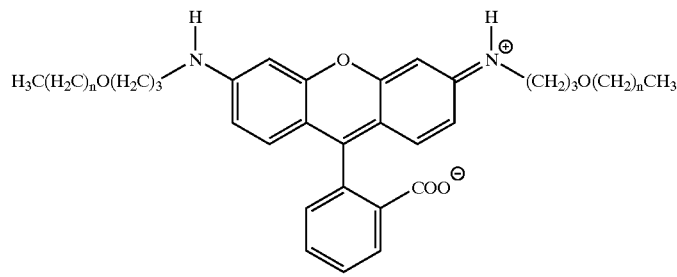
wherein n is at least about 11, (b) those of the formulae
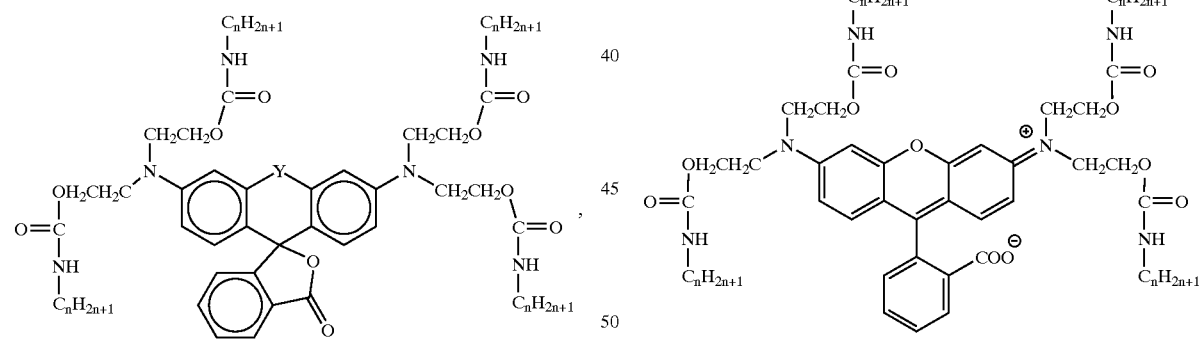
wherein n is at least about 12, (c) those of the formulae
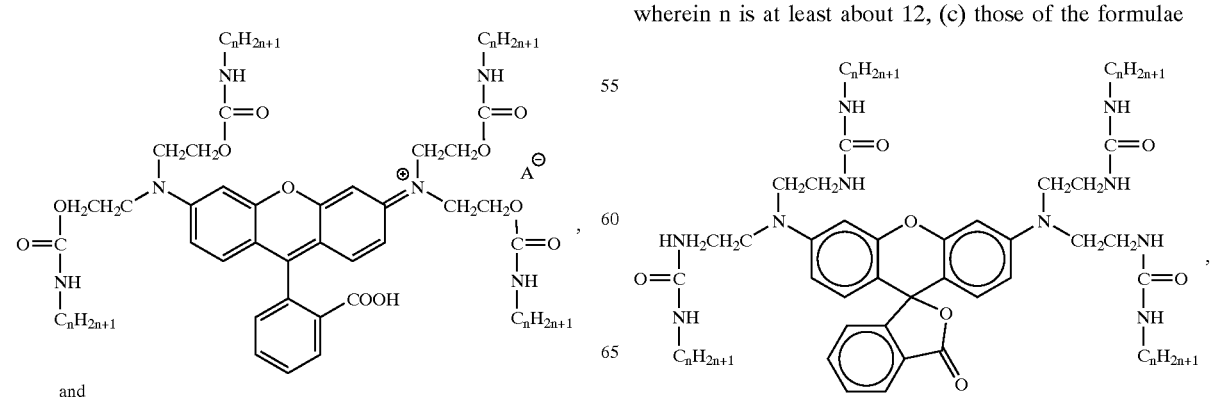
and
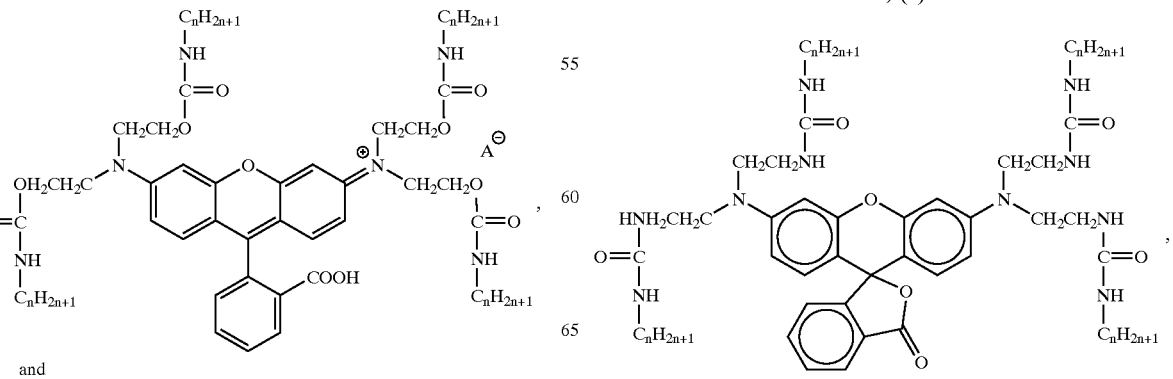

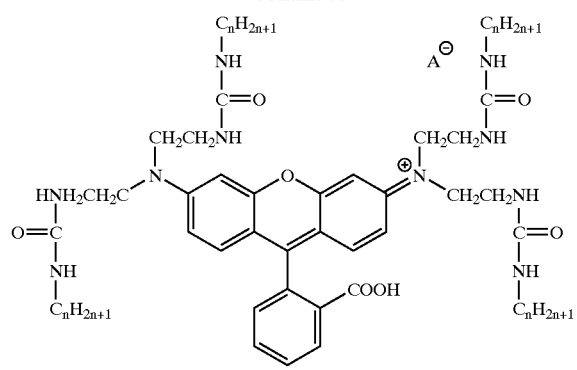
and
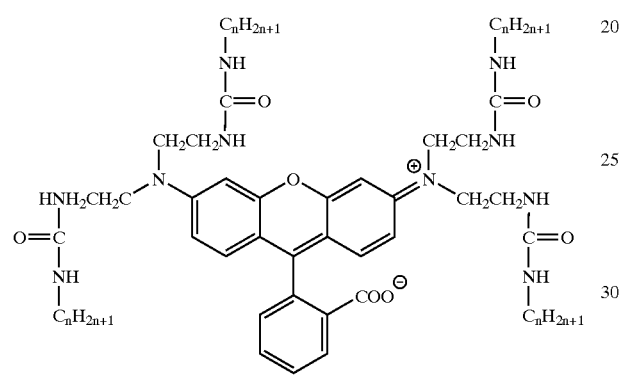
wherein n is at least about 12, (d) those of the formulae
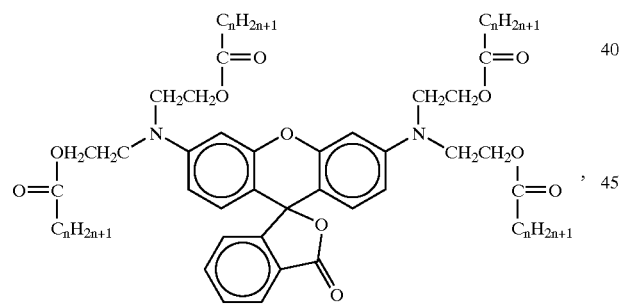
and
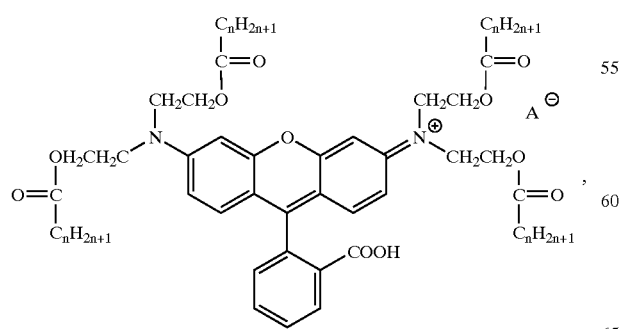
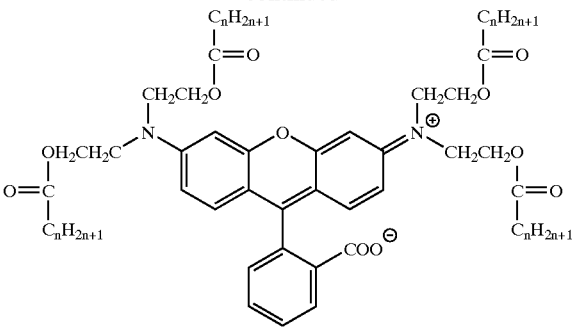
wherein n is at least about 12, (e) those of the formulae
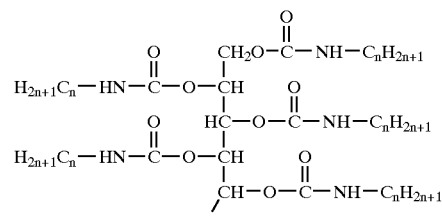
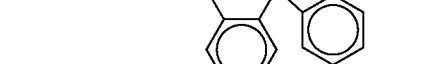
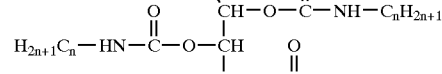
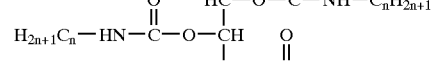
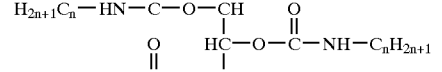
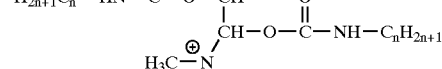
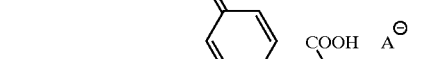
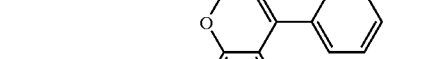
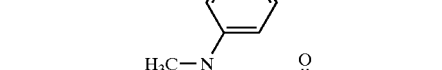
, and
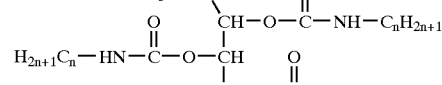
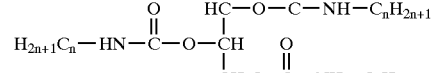

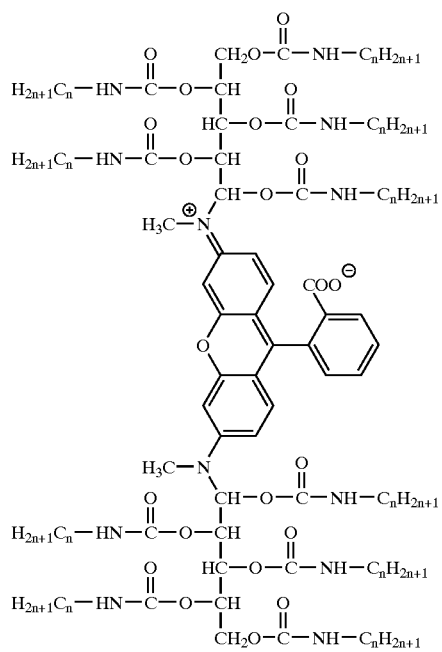
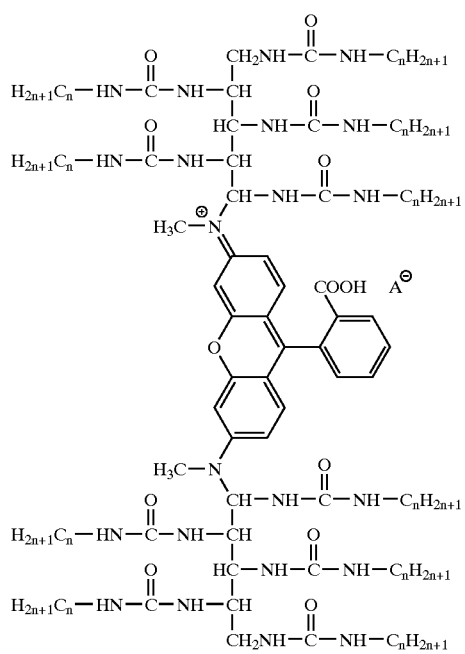, and
wherein n is at least about 12, (f) those of the formulae
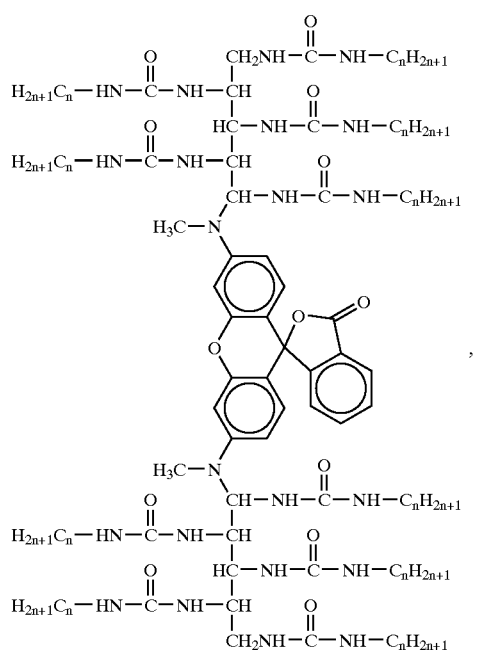,
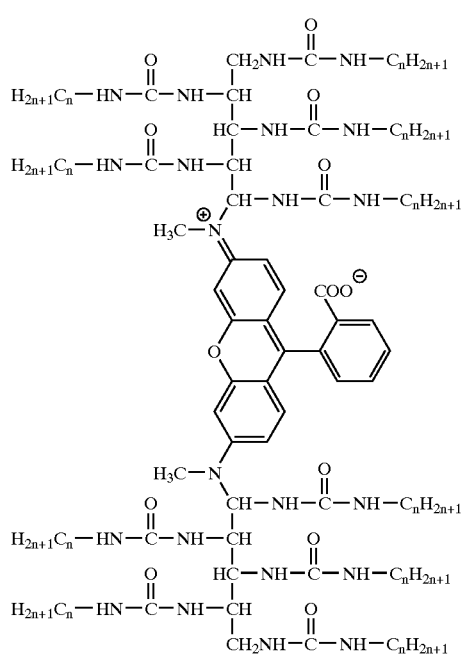

wherein n is at least about 12, (g) those of the formulae
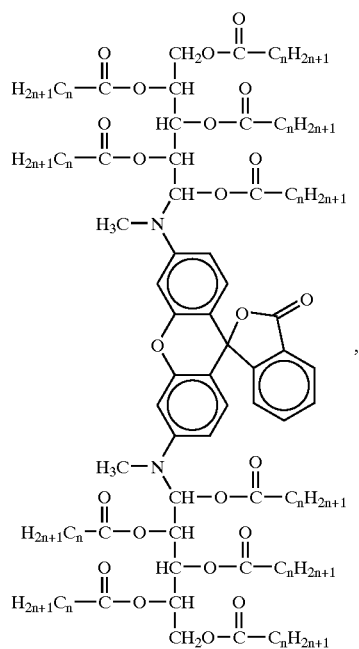
,
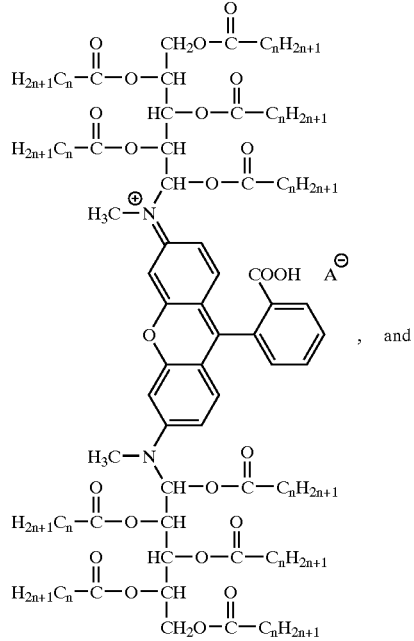
, and
wherein n is at least about 12, (h) those of the formulae
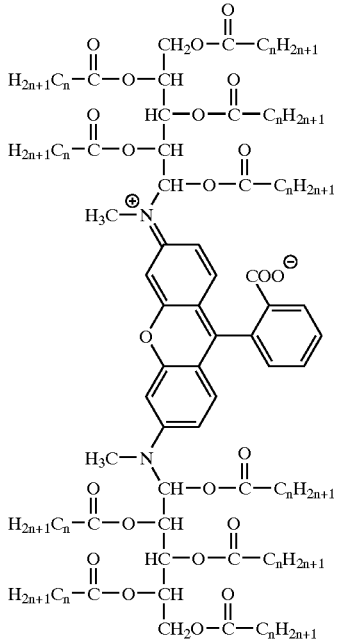
,
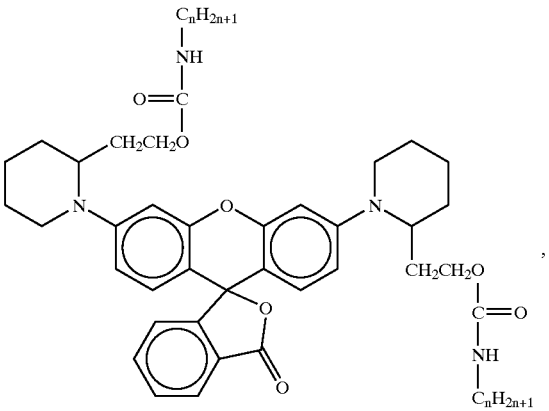
,
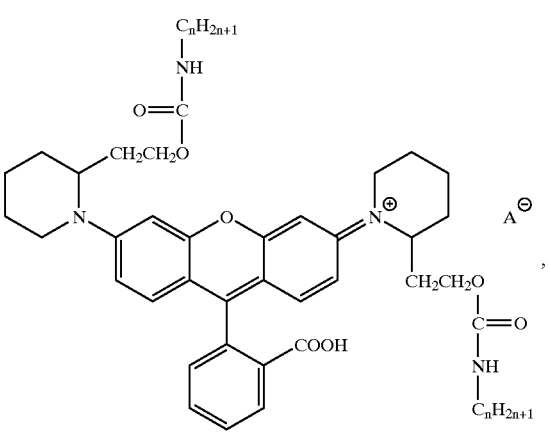
and

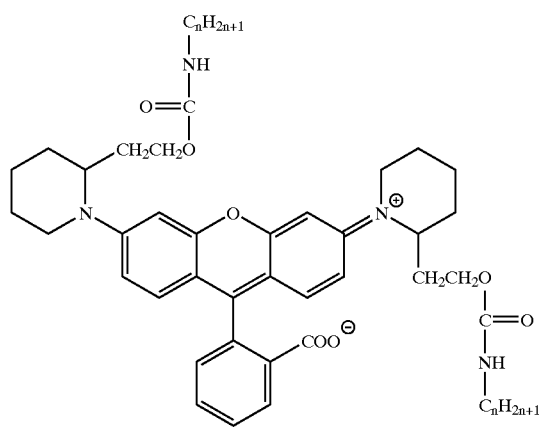
wherein n is at least about 12, (i) those of the formulae
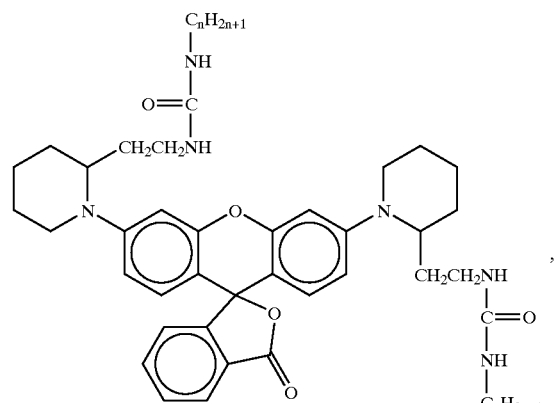
,
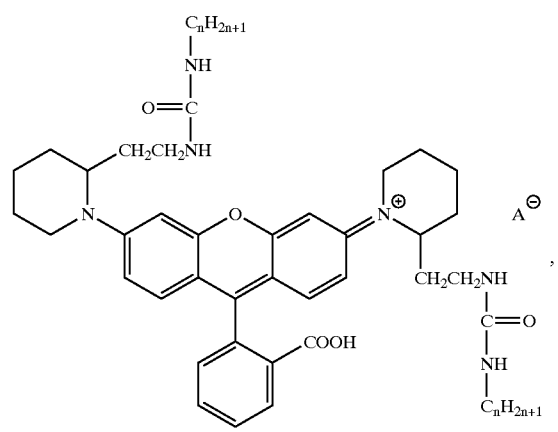
and
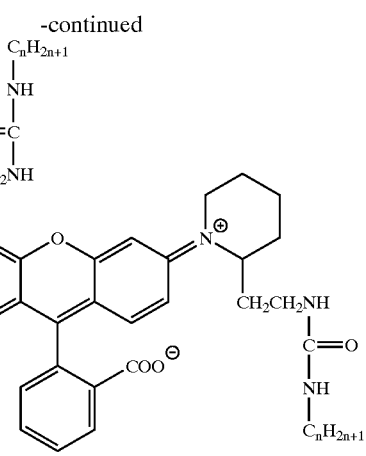
wherein n is at least about 12, (j) those of the formulae
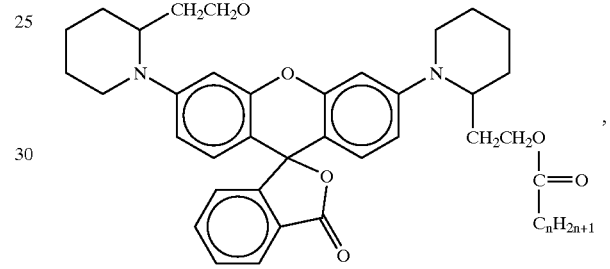
,
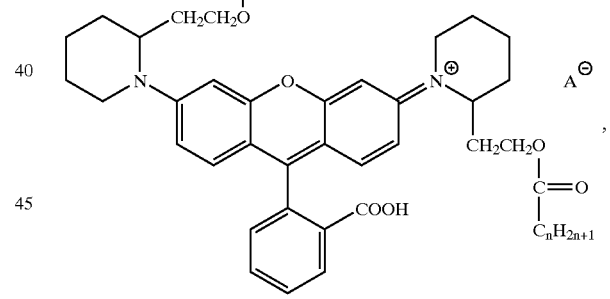
and
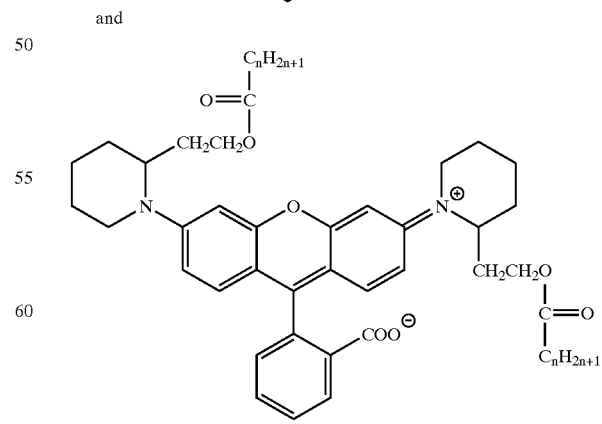

wherein n is at least about 12, (k) those of the formulae
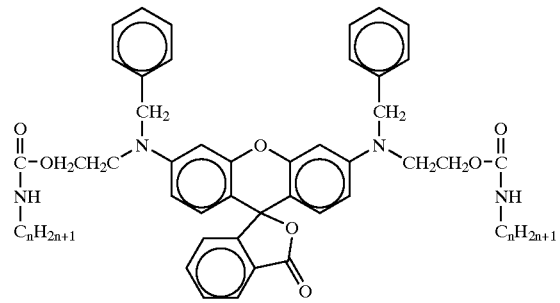
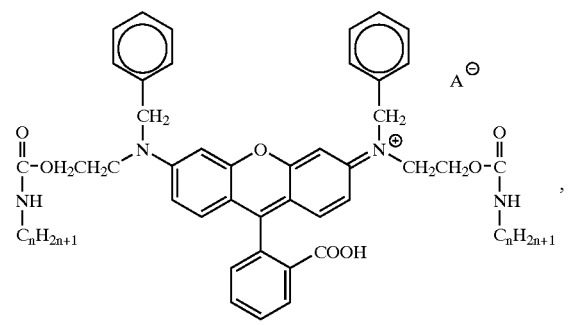
and
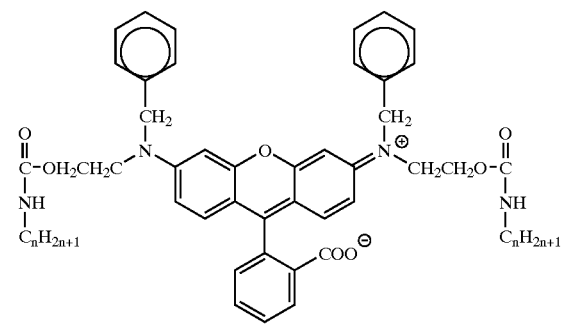
wherein n is at least about 12, (l) those of the formulae
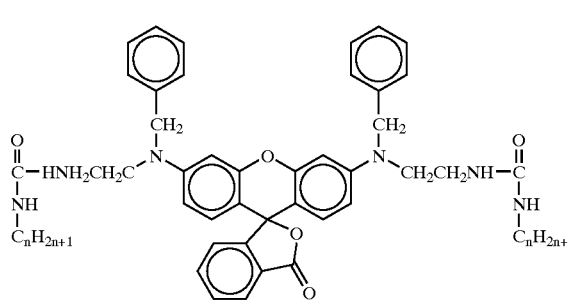
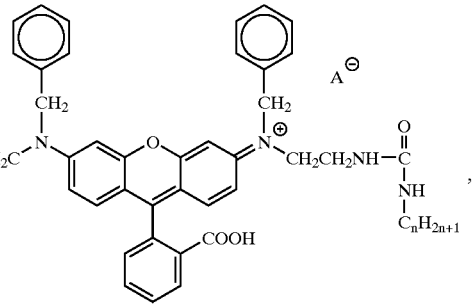
and
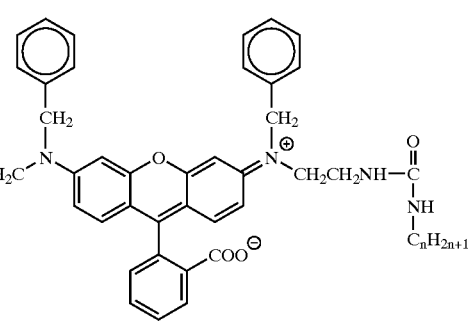
wherein n is at least about 12, (m) those of the formulae
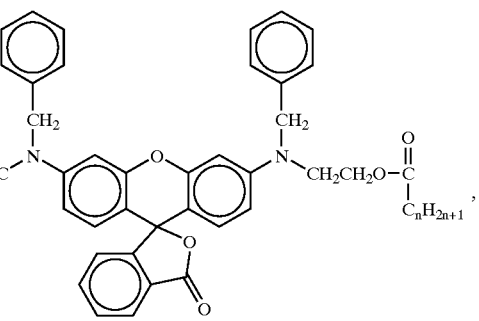
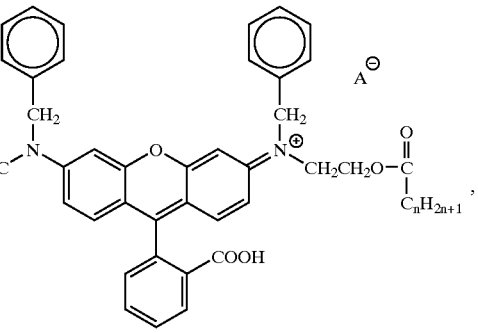
and -continued
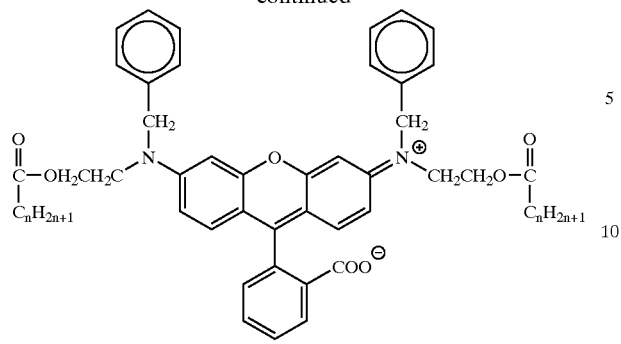
wherein n is at least about 12, (n) those of the formulae
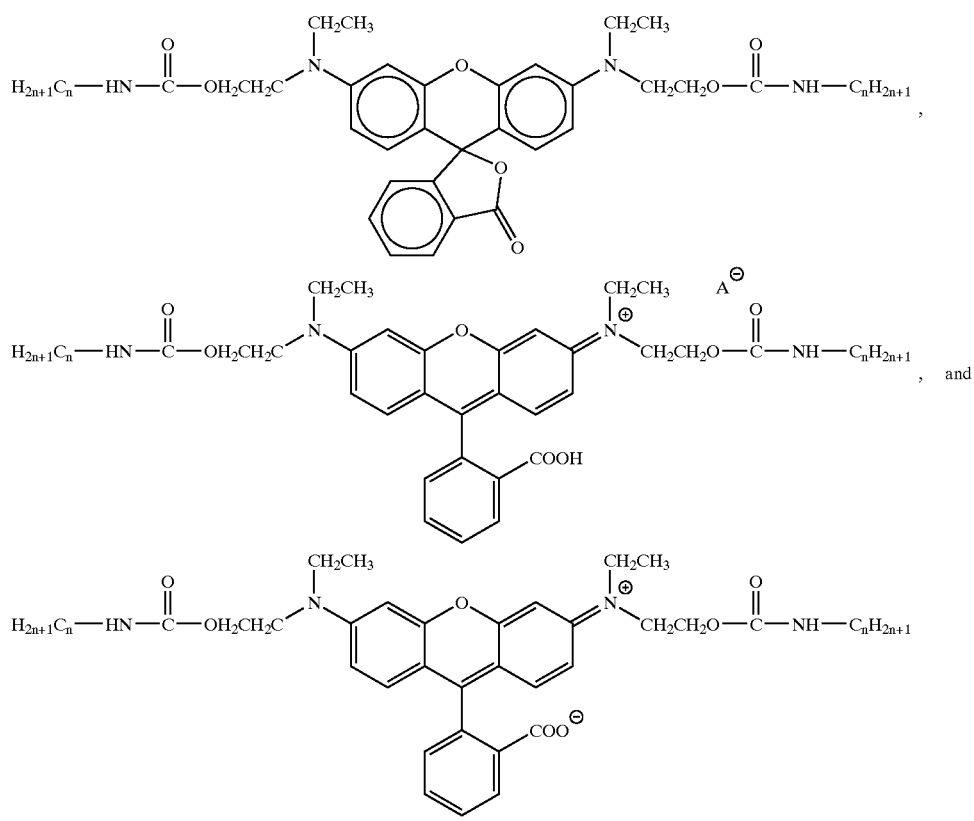
wherein n is at least about 12, (o) those of the formulae
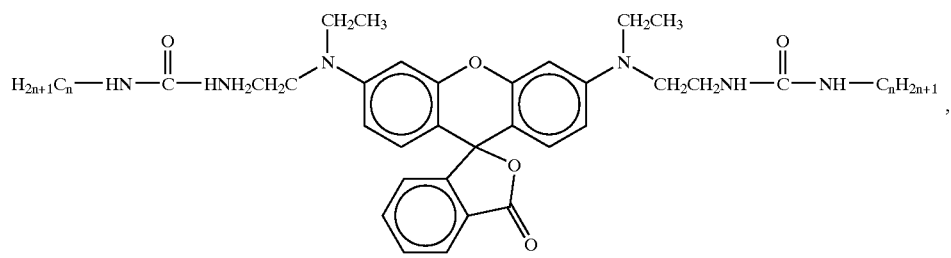

-continued

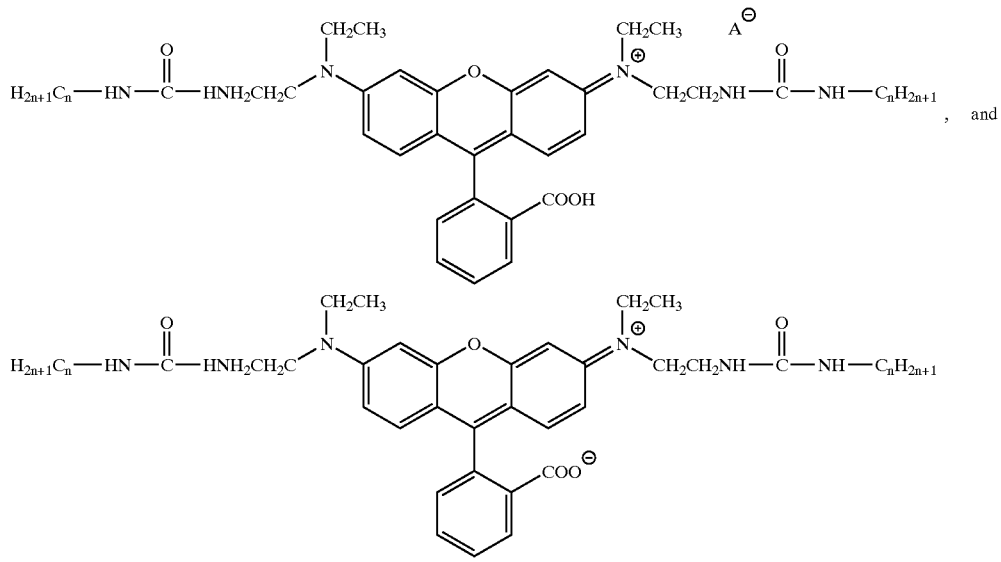

wherein n is at least about 12, (p) those of the formulae

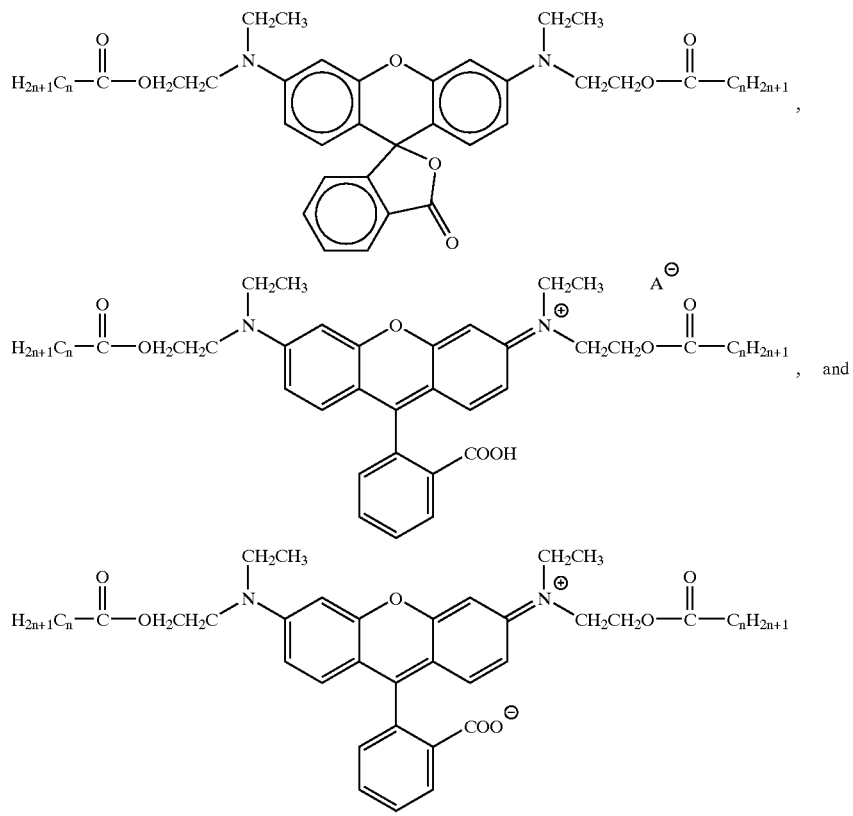

wherein n is at least about 12, and the like.

Phase change inks of the present invention contain a phase change carrier system or composition. The phase change carrier composition is typically designed for use neither a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

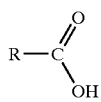

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT. Publication WO 97/33943, and PCT Publication WO 95/04760, the disclosures of each of which ore totally incorporated herein by reference.

Mixtures of fatty amide materials and isocyanate-derived materials can also be employed as the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 10 percent by weight of the ink in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges (d) a urethane resin derived from the reaction of two equivalents of hydroabietyl alcohol and one equivalent of isophorone diisocyanate, present in the, ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks of the resent invention contain a colorant compound of the formula

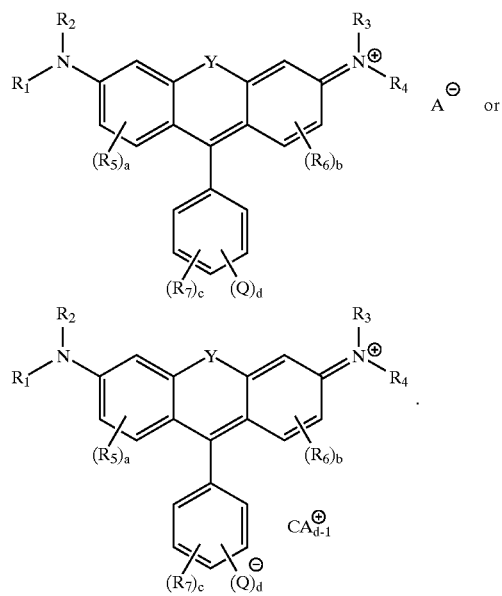

This colorant is present in the ink in any desired or effective amount to obtain the desired color or hue, in one embodiment of at least about 0.1 percent by weight of the ink, in another embodiment of at least about 0.5 percent by weight of the ink, in yet another embodiment of at least about 1 percent by weight of the ink, in still another embodiment of at least about 2 percent by weight of the ink, and in another embodiment of at least about 3 percent by weight of the ink, and in one embodiment of no more than about 20 percent by weight of the ink, in another embodiment of no more than about 13 percent by weight of the ink, and in yet another embodiment of no more than about 6 percent by weight of the ink, although the amount can be outside of these ranges. The colorant according to the present invention can either be the sole colorant in the ink or can be present in combination with other colorants, such as dyes, pigments, mixtures thereof, and the like.

In a specific embodiment, the inks of the present invention include an anthraquinone colorant in addition to the colorant according to the present invention. Examples of suitable anthraquinone colorants include Solvent Red 172, colorants as disclosed in U.S. Pat. No. 6,395,078 and U.S. Pat. No. 6,422,695, the disclosures of each of which are totally incorporated herein by reference, colorants as disclosed in Copending application U.S. Ser. No. 10/260,146, Copending application U.S. Ser. No. 10/260,376, and Copending application U.S. Ser. No. 10/260,379, the disclosures of each of which are totally incorporated herein by reference, and the like. In a specific embodiment, the anthraquinone colorant is one prepared as described in Example XVII, Parts. 1 through 5. The anthraquinone colorant can be present in the inks of the present invention in any desired or effective amount to achieve the desired color, hue, and other characteristics, in one embodiment of at least about 1 percent by weight of the ink, in another embodiment of at least about 2 percent by weight of the ink, and in yet another embodiment of at least about 3 percent by weight of the ink, and in one embodiment of no more than about 20 percent by weight of the ink, in another embodiment of no more than about 13 percent by weight of the ink, and in yet another embodiment of no more than about 6 percent by weight of the ink, although the amount can be outside of these ranges.

In specific embodiments, the inks of the present invention further contain an acid having a $K_a$ value greater than that of the $K_a$ of the carboxylic acid and/or sulfonic acid and/or carboxylate and/or sulfonate groups on the colorant. Specific examples of suitable acids include organic sulfonic acids, including alkyl benzene sulfonic acids such as para-toluenesulfonic acid, dodecylbenzenesulfonic acid, and the like, p-toluene sulfonic acid, hydrochloric acid, trifluoroacetic acid, methylsulfonic acid, trifluoromethyl sulfonic acid, hydrobromic acid, and the like, as well as mixtures thereof. The acid is present in any desired or effective amount, in one embodiment at least about 2 percent by weight of the amount of colorant according to the present invention, and in another embodiment at least about 5 percent by weight of the amount of colorant according to the present invention, and in one embodiment no more than about 100 percent by weight of the amount of the colorant according to the present invention, and in another embodiment no more than about 30 percent by weight of the colorant according to the present invention, although the amount of acid can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink; in another embodiment of at least about 1 percent by weight of the ink, and in yet another embodiment of at least about 10 percent by weight of the ink, and in one embodiment of no more than about 99 percent by, weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300' NEVTAC® 100, and NEVTAC® 80 (commercially available from Neville Chemical Company), WINGTACK® 86, a modified, synthetic polyterpene resin (commercially available from, Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex) the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present invention in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions of the present invention generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions of the present invention con be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks of the present invention are solid at ambient temperature. In a specific embodiment, during the formation process, the inks in their molten state are poured into molds and then allowed to cool and solidify to form ink sticks.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, and the like. Phase change inks of the present invention can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE IA

Synthesis of Dichlorofluorescein

A mixture of fluorescein (100 grams, 0.331 mole; obtained from Aldrich Chemical Co., Milwaukee, Wis.) and $PCl_5$ (128.5 grams, 0.62 mole; obtained from Aldrich Chemical Co.) in 650 milliliters of chlorobenzene was stirred and heated to 140° C. in a 1 liter round bottom flask equipped with a reflux condenser. After 6 hours of heating, the reflux condenser was replaced with a distillation setup, and $POCl_3$ formed during the reaction as well as the chlorobenzene were distilled off. After all of the. $POCl_3$ and chlorobenzene were removed, 300 grams of N-methylpyrrolidinone was added and the resulting mixture was heated to 100° C. with stirring until all of the crude dichlorofluorescein dissolved. The solution was then poured into a 4 liter beaker containing 1 liter of deionized water. A tan solid precipitated out and was collected on a filter and dried in a vacuum oven. The final tan solid matched the IR, NMR, and TLC of commercially available dichlorofluorescein.

Other synthetic processes can also be used. For example, a one-pot process using DMF solvent can be employed wherein the $POCl_3$ intermediate is not distilled off but is removed by reaction with methanol, which also precipitates the dichlorofluorescein as a white solid. Methods using toluenesulfonylchloride, a less reactive and corrosive chlorinating agent than $PCl_5$, can also be used.

EXAMPLE IB

Synthesis of Tetrastearyl Colorant

A mixture of dichlorofluorescein (105 grams, 0.284 mole, prepared as described above), calcium oxide (24 grams, 0.62 mole, obtained from Aldrich Chemical Co., Milwaukee, Wis.), $ZnCl_2$ (116 grams, 0.85 mole; obtained from Aldrich Chemical Co.), and distearyl amine (288 grams, 0.585 mole; ARMEEN 2HT, obtained from Akzo-Nobel; McCook, Ill.) in 650 milliliters of tetramethylene sulfone (obtained from Chevron Phillips Chemical. Co., LP, The Woodlands, Tex.) was stirred and heated to 190° C. in a 1 liter round bottom flask. After 10 hours of heating, the deeply magenta colored mixture was cooled to 120° C. and poured into 2.5 liters of methyl isobutyl ketone (MIBK) and stirred until totally dissolved.

EXAMPLE IC

Purification of Tetrastearyl Colorant

The solution of crude tetrastearyl colorant in MIBK was then transferred to a 4 liter separatory funnel. Three aqueous EDTA washes were then performed (50 grams of the tetrasodium salt of EDTA in 1,000 milliliters of water for each wash) to remove all of the zinc and calcium salts in the crude reaction product. The product, dissolved in MIBK, remained on the top layer with the water/EDTA chelated metal waste on the bottom layer, which was discarded. Two washes with deionized water (1 liter each) were then performed. At this point, the MIBK solution was no longer magenta, but a faint orangeish-red color. The lack of a brilliant magenta color at this point indicated a ring-closed, or free base, form at the colorant, believed to be of the formula

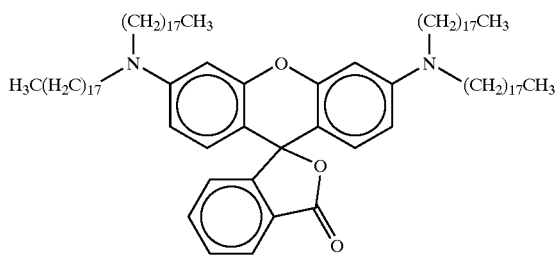

EXAMPLE ID

Isolation of Tetrastearyl Colorant

The solution of the ring-closed, purified tetrastearyl colorant in MIBK was then transferred to a 2 liter round bottom flask with distillation setup. The MIBK and residual water were distilled off and the product, a slightly viscous wax when hot, was transferred to a jar and allowed to harden. The wax was a deep red colored, somewhat hard wax when cooled to room temperature.

EXAMPLE IE

Protonation of Tetrastearyl Colorant 250 grams of the solid, ring-closed, purified tetrastearyl colorant prepared in Example ID was then transferred to a 1 liter beaker and 500 milliliters of MIBK were added and allowed to dissolve the solid with stirring. A stoichiometric amount of dodecyl benzene sulfonic acid was added to this solution and stirred for 1 hour. A deep magenta hue was observed with the addition of the acid. The solution was then transferred to a distillation setup and the MIBK removed. The molten ring-opened waxy colorant was then transferred to an aluminum tin and allowed to cool to room temperature. The ring-opened, or protonated, or free-base form of this colorant is believed to be of the formula

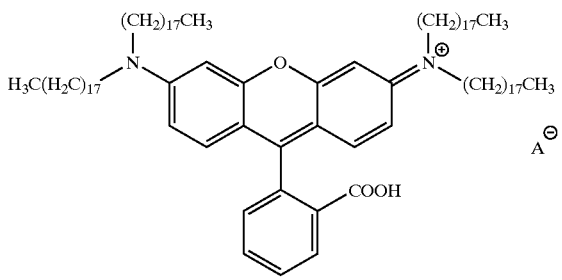

wherein A is the anion corresponding to the acid used for protonaton. The zwitterionic form of this colorant is believed to be of the formula

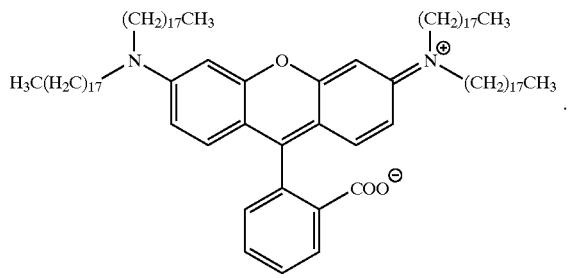

The process was repeated a number of times substituting for dodecyl benzene sulfonic acid the following acids: p-toluene sulfonic acid; hydrochloric acid; trifluoroacetic acid; methyl sulfonic acid; trifluoromethyl sulfonic acid; and hydrobromic acid. Similar results were observed in all cases.

EXAMPLE IIB

The process of Example IB was repeated except that dioctyl amine (NH((CH$_2$)$_7$CH$_3$)$_2$, obtained from Aldrich Chemical Co., Milwaukee, Wis.) was used instead of distearyl amine. The dioctyl amine was present in an amount of 1.95 moles of dioctyl amine per every one mole of dichlorofluorescein.

EXAMPLE IIC

The process of Example IC was repeated using the product obtained in Example IIB. It is believed that the purified product was of the formula

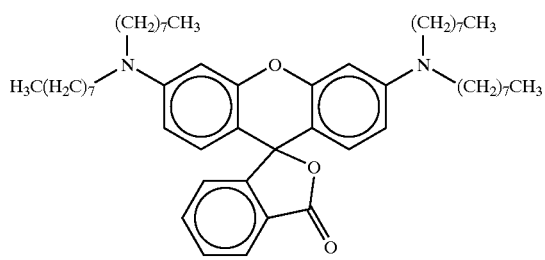

The ring-opened, or protonated, or free-base form of this colorant is believed to be of the formula

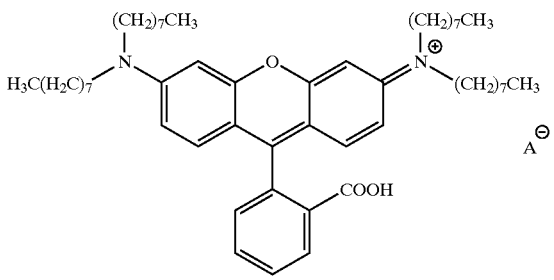

wherein A is the anion corresponding to the acid used for protonaton. The zwitterionic form of this colorant is believed to be of the formula

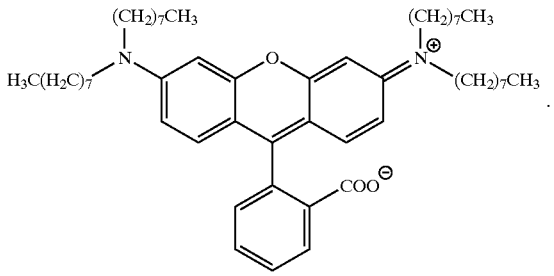

EXAMPLE IID

The process of Example ID was repeated using the product obtained in Example IIC.

EXAMPLE IIIB

The process of Example IB was repeated except that the reaction was run with 2.05 moles of stearyl amine per every one mole of dichlorofluorescein.

EXAMPLE IIIC

The process of Example IC was repeated using the product obtained in Example IIIB. It is believed that the purified product was of the formula

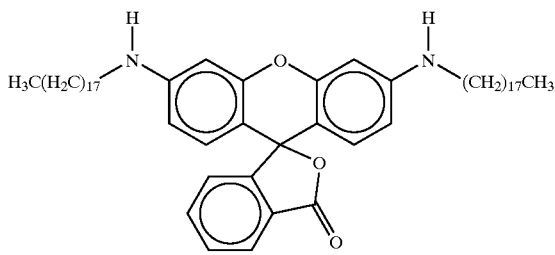

The ring-opened, or protonated, or free-base form of this colorant is believed to be of the formula

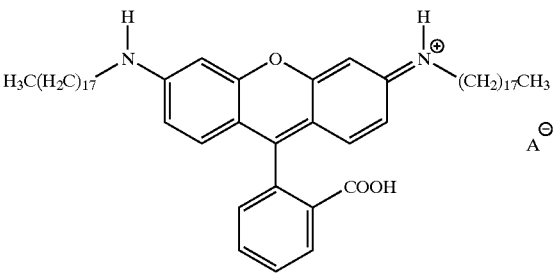

wherein A is the anion corresponding to the acid used for protonaton. The zwitterionic form of this colorant is believed to be of the formula

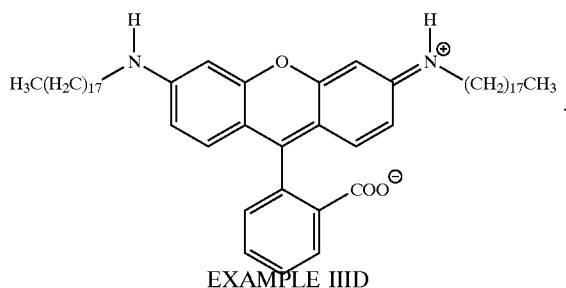

EXAMPLE IIID

The process of Example ID was repeated using the product obtained in Example IIIC.

EXAMPLE IVB

The process of Example IB was repeated except that PRIMENE JM-T (obtained from Rohm and Haas Company, Philadelphia, Pa.), of the formula

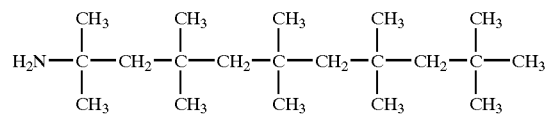

was used instead of distearyl amine. The PRIMENE JM-T was present in an amount of 2 moles of PRIMENE JM-T per every one mole of dichlorofluorescein.

EXAMPLE IVC

The process of Example IC was repeated using the product obtained in Example IVB. It is believed that the purified product was of the formula

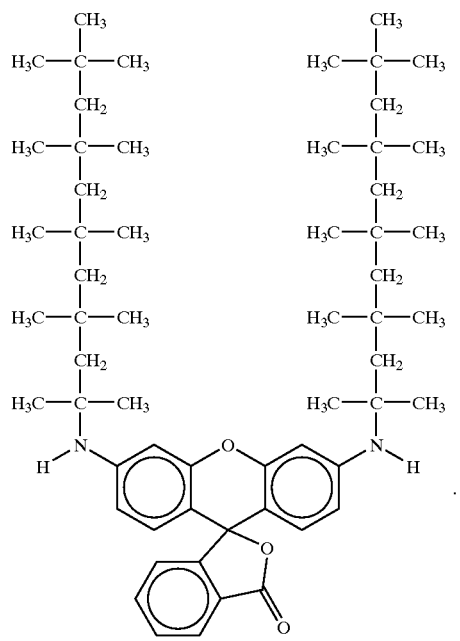

The ring-opened, or protonated, or free-base form of this colorant is believed to be of the formula

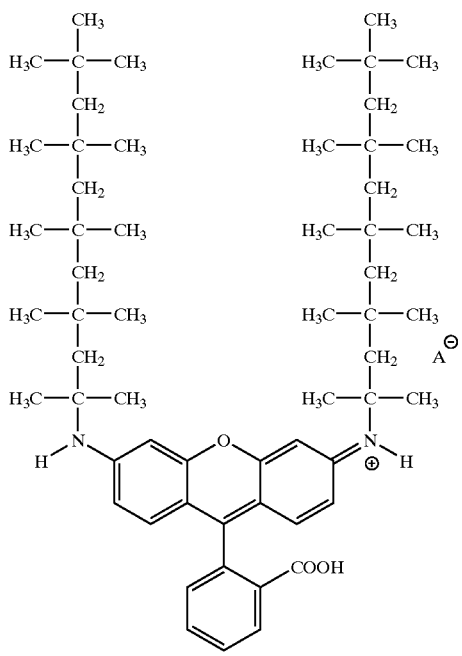

wherein A is the anion corresponding to the acid used for protonaton. The zwitterionic form of this colorant is believed to be of the formula

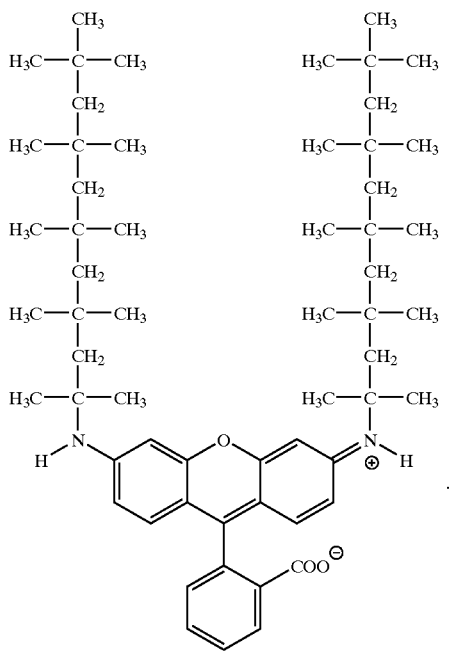

EXAMPLE IVD

The process of Example ID was repeated using the product obtained in Example IVC.

EXAMPLE VB

The process of Example IB was repeated except that UNILIN 425-PA (obtained from Tomah Products, Milton, Wis., of the formula $CH_3(CH_2)_{31}-O-CH_2CH_2CH_2NH_2$) was used instead of distearyl amine. The UNILIN 425-PA was present in an amount of 2 moles of UNILIN 425-PA per every one mole of dichlorofluorescein. It is believed that the product was of the formula

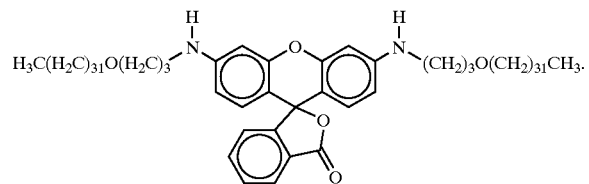

The ring-opened, or protonated, or free-base form of this colorant is believed to be of the formula

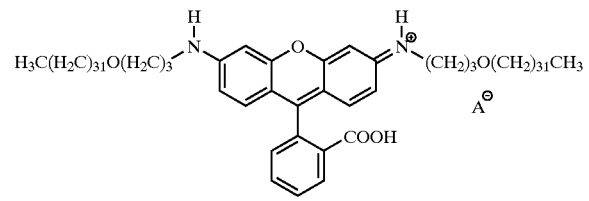

wherein A is the anion corresponding to the acid used for protonaton. The zwitterionic form of this colorant is believed to be of the formula

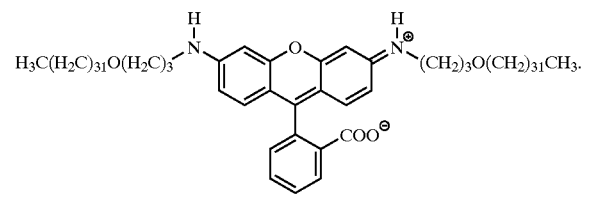

EXAMPLE VIB

The process of Example IB was repeated except that diethanol amine (obtained from Aldrich Chemical Co., Milwaukee, Wis., of the formula $HN(CH_2CH_2OH)_2$) was used instead of distearyl amine. The diethanol amine was present in an amount of 2.5 moles of diethanol amine per every one mole of dichlorofluorescein. In addition, 2 moles of zinc chloride, were used per every one mole of dichlorofluorescein and 1 mole of calcium oxide was used per every one mole of dichlorofluorescein, the solvent was N-methyl pyrrolidone instead of tetramethylene sulfone, and the reaction mixture was heated to 125° C. for 100 hours.

EXAMPLE VIC

The process of Example IC was repeated using the product obtained in Example VIB except that the product was poured into methanol and sufficient EDTA was added to remove all of the $Zn^{2+}$ and $Ca^{2+}$ ions. It is believed that the purified product was of the formula

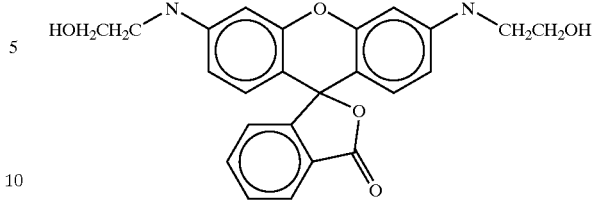

EXAMPLE VIC-1

About 10 grams of the product obtained in Example VIC is added to 23.4 grams of octadecylisocyanate (available from Aldrich Chemical Co., Milwaukee, Wis.) at 120° C., after which 2 drops of dibutyltindilaurate catalyst (available from Aldrich Chemical Co.) is added and the reaction is stirred and heated until disappearance of the isocyanate peak in the IR is observed. The tetraurethane rhodamine is poured into aluminum tins and is believed to be of the formula The ring-opened, or protonated, or free-base form of this colorant is believed to be of the formula

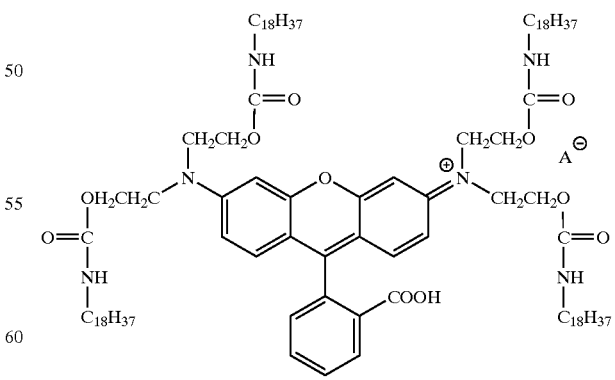

wherein A is the anion corresponding to the acid used for protonaton. The zwitterionic form of this colorant is believed to be of the formula

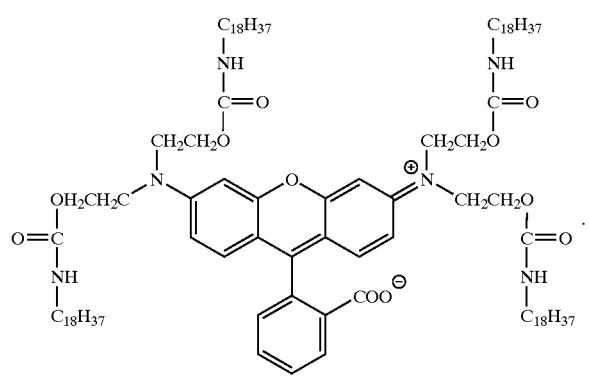

EXAMPLE VIIB

The process of Example IB was repeated except that N-methyl-D-glucamine (obtained from Aldrich Chemical Co., Milwaukee, Wis.), of the formula

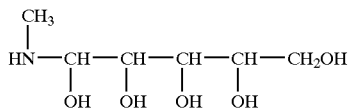

was used instead of distearyl amine. The N-methyl-D-glucamine was present in an amount of 2.5 moles of N-methyl-D-glucamine per every one mole of dichlorofluorescein. In addition, 2 moles of zinc chloride were used per every one mole of dichlorofluorescein and 1.5 moles of calcium oxide was used per every one mole of dichlorofluorescein, the solvent was N-methylpyrrolidone instead of tetramethylene sulfone, and the reaction mixture was heated to 130° C. for 7 days.

EXAMPLE VIIC

The process of Example IC was repeated using the product obtained in Example VIIB except that the product was poured into methanol and sufficient EDTA was added to remove all of the $Zn^{2+}$ and $Ca^{2+}$ ions. It is believed that the purified product was of the formula

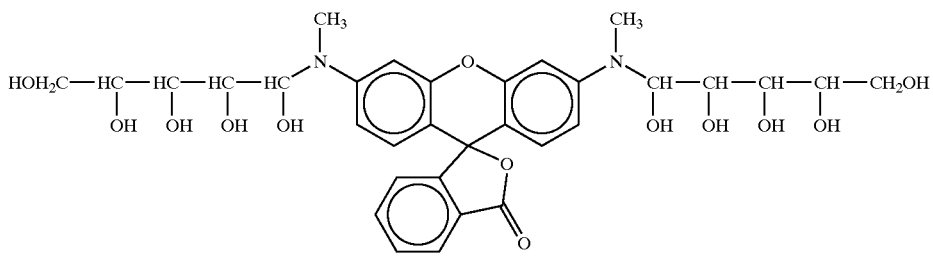

EXAMPLE VIIC-1

About 10 grams of the product obtained in Example VIIC is added to 45 grams of octadecylisocyanate (available from Aldrich Chemical Co., Milwaukee, Wis.) at 120° C., after which 4 drops of dibutyltindilaurate catalyst (available from Aldrich Chemical Co.) is added and the reaction is stirred and heated until disappearance of the isocyanate peak in the IR is observed. The deca-urethane rhodamine is poured into aluminum tins and is believed to be of the formula

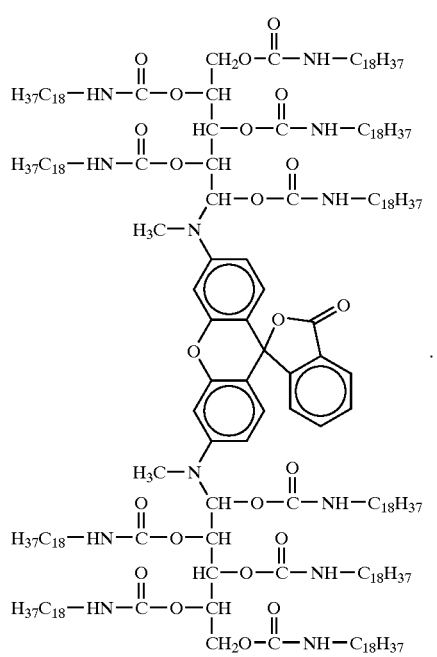

The ring-opened, or protonated, or free-base form of this colorant is of the formula

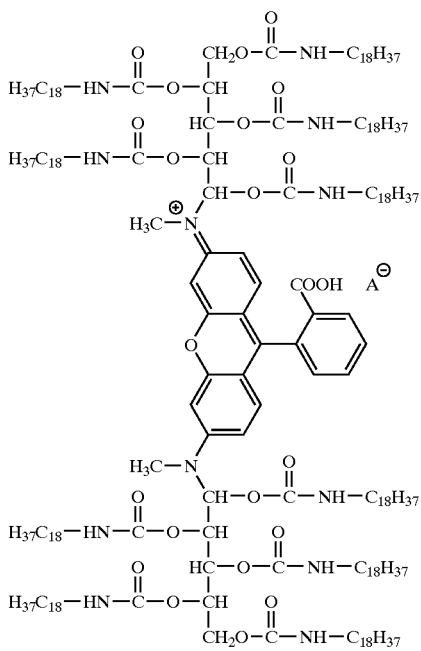

wherein A is the anion corresponding to the acid used for protonaton. The zwitterionic form of this colorant is believed to be of the formula

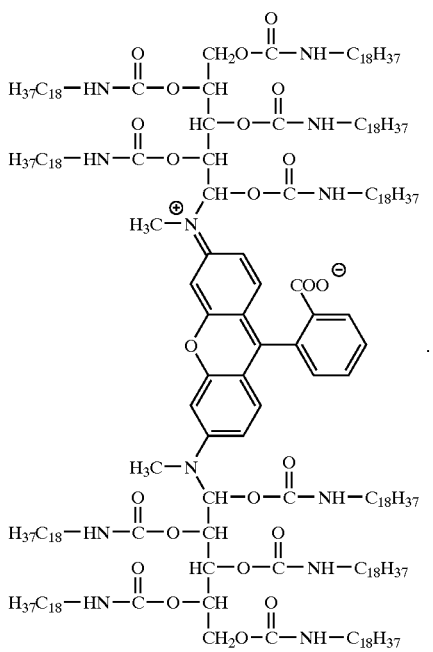

EXAMPLE VIIIB

The process of Example IB was repeated except that 2-piperidine ethanol (obtained from Aldrich Chemical Co., Milwaukee, Wis.), of the formula

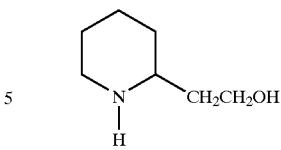

was used instead of distearyl amine. The 2-piperidine ethanol was present in an amount of 2.5 moles of 2-piperidine ethanol per every one mole of dichlorofluorescein. In addition, 2 moles of zinc chloride were used per every one mole of dichlorofluorescein and 1 mole of calcium oxide was used per every one mole of dichlorofluorescein, the solvent was N-methylpyrrolidone instead of tetramethylene sulfone, and the reaction mixture was heated to 160° C. for 24 hours. The reaction product was then poured into water and filtered and washed with water. It is believed that the product was of the formula

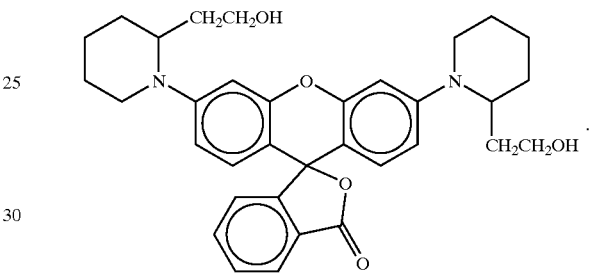

EXAMPLE VIIIC-1

About 10 grams of the product obtained in Example VIIIB is added to 10.7 grams of octadecylisocyanate (available from Aldrich Chemical Co., Milwaukee, Wis.) at 120° C., after which 1 drop of dibutyltindilaurate catalyst (available from Aldrich Chemical Co.) is added and the reaction is stirred and heated until disappearance of the isocyanate peak in the IR is observed. The di-urethane rhodamine is poured into aluminum tins and is believed to be of the formula

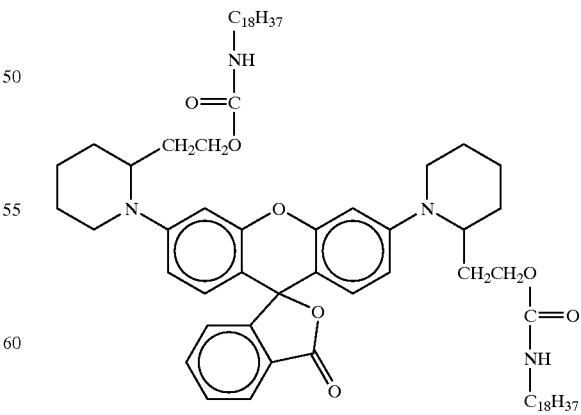

The ring-opened, or protonated, or free-base form of this colorant is believed to be of the formula

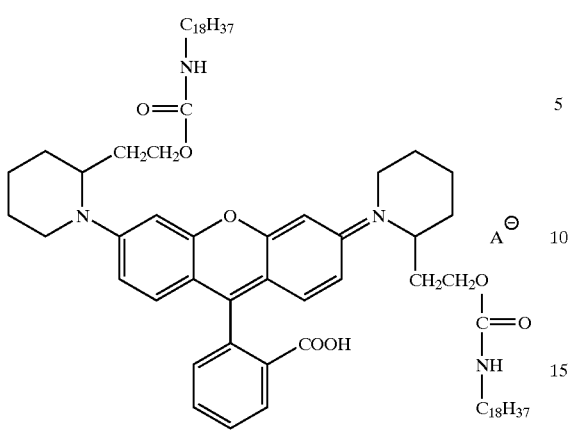

wherein A is the anion corresponding to the acid used for protonaton. The zwitterionic form of this colorant is believed to be of the formula

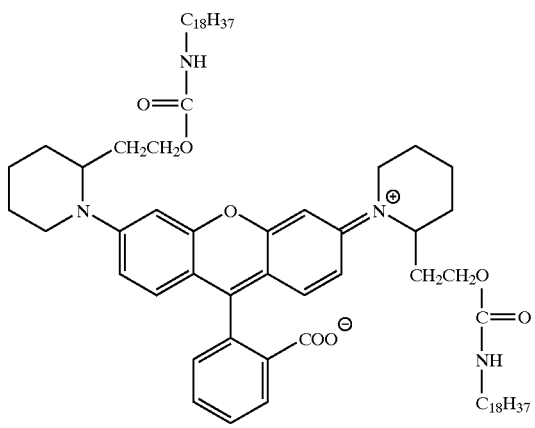

EXAMPLE IXB

The process of Example IB was repeated except that N,N-dimethyl-1,4-phenylene diamine (obtained from Aldrich Chemical Co., Milwaukee, Wis.), of the formula

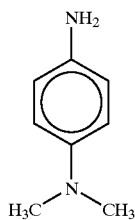

was used instead of distearyl amine. The N,N-dimethyl-1,4-phenylene diamine was present in an amount of 2.5 moles of N,N-dimethyl-1,4-phenylene diamine per every one mole of dichlorofluorescein. In addition, 2 moles of zinc chloride were used per every one mole of dichlorofluorescein and 1 mole of calcium oxide was used per every one mole of dichlorofluorescein, the solvent was N-methylpyrrolidone instead of tetramethylene sulfone, and the reaction mixture was heated to 140° C. for 48 hours. The reaction product was then poured into water and filtered and washed with water. It is believed that the product was of the formula

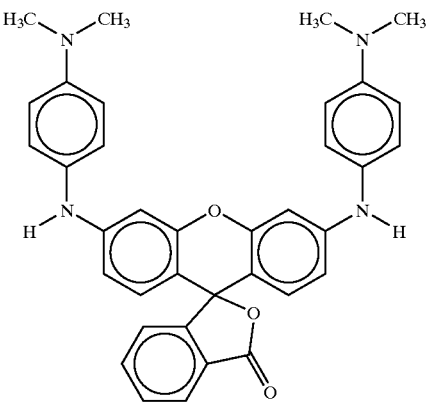

The ring-opened, or protonated, or free-base form of this colorant is believed to be of the formula

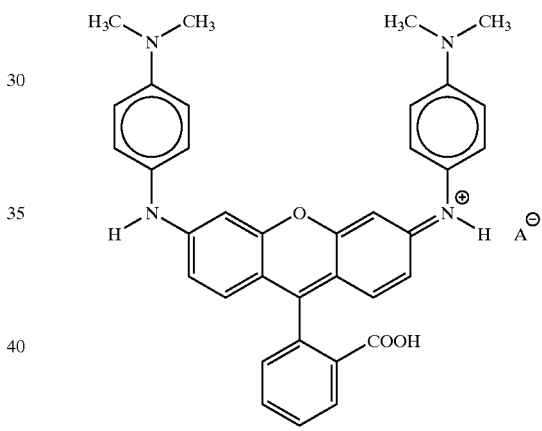

wherein A is the anion corresponding to the acid used for protonaton. The zwitterionic form of this colorant is believed to be of the formula

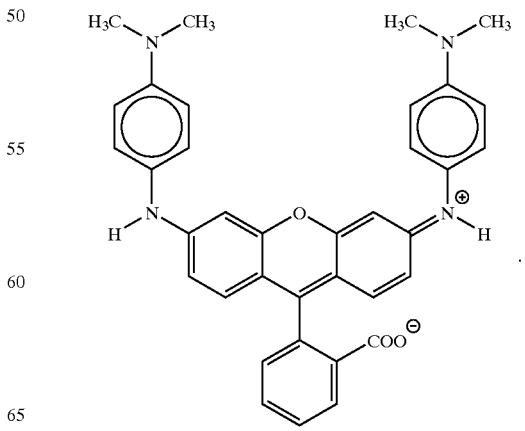

EXAMPLE XB

The process of Example IB was repeated except that N,N-diethyl-1,4-phenylene diamine (obtained from Aldrich Chemical Co., Milwaukee, Wis.), of the formula

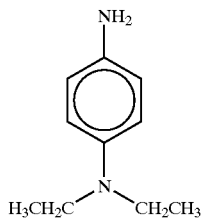

was used instead of distearyl amine. The N,N-diethyl-1,4-phenylene diamine was present in an amount of 2.5 moles of N N-diethyl-1,4-phenylene diamine per every one mole of dichlorofluorescein. In addition, 2 moles of zinc chloride were used per every one mole of dichlorofluorescein and 1 mole of calcium oxide was used per every one mole of dichlorofluorescein, the solvent was N-methylpyrrolidone instead of tetramethylene sulfone, and the reaction mixture was heated to 150° C. for 96 hours. The reaction product was then poured into water and filtered and washed with water. It is believed that the product was of the formula

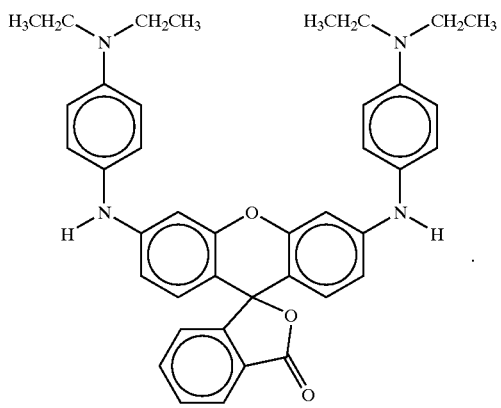

The ring-opened, or protonated, or free-base form of this colorant is believed to be of the formula

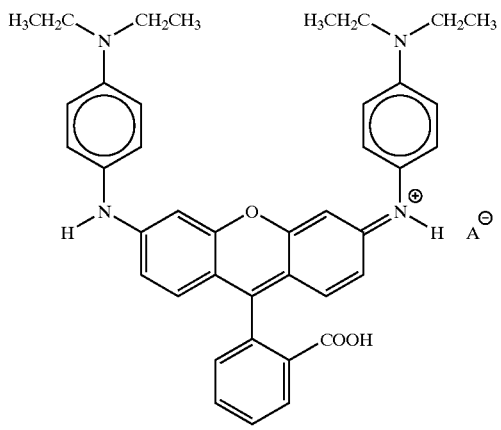

wherein A is the anion corresponding to the acid used for protonaton. The zwitterionic form of this colorant is believed to be of the formula

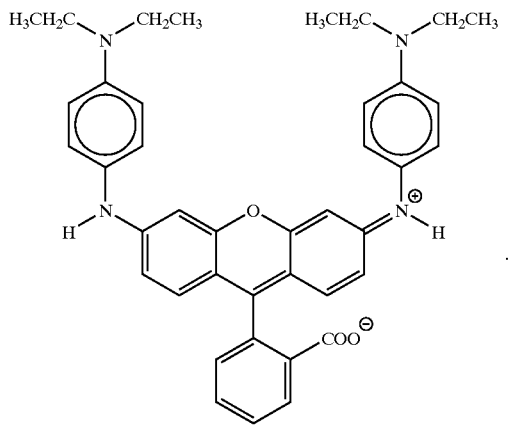

EXAMPLE XIB

The process of Example IB was repeated except that N-benzylethanolamine (obtained from Aldrich Chemical Co., Milwaukee, Wis.), of the formula

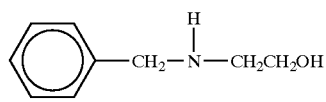

was used instead of distearyl amine. The N-benzylethanolamine was present in an amount of 2.5 moles of N-benzylethanolamine per every one mole of dichlorofluorescein. In addition, 2 moles of zinc chloride were used per every one mole of (dichlorofluorescein and 1 mole of calcium oxide was used per every one mole of dichlorofluorescein the solvent was dimethyl formamide instead of tetramethylene sulfone, and the reaction mixture was heated to 150° C. for 48 hours.

EXAMPLE XIC

The process of Example IC was repeated using the product obtained in Example XIB except that the product was poured into methanol and sufficient EDTA was added to remove all of the $Zn^{2+}$ and $Ca^{2+}$ ions. It is believed that the purified product was of the formula

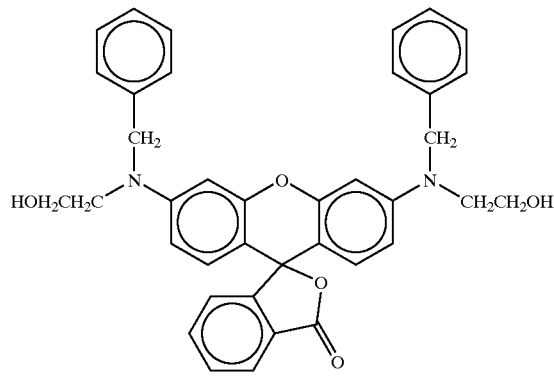

EXAMPLE XIC-1

About 10 grams of the product obtained in Example XIC is added to 9.9 grams of octadecylisocyanate (available from Aldrich Chemical Co., Milwaukee, Wis.) at 120° C., after which 1 drop of dibutyltindilaurate catalyst (available from Aldrich Chemical Co.) is added and the reaction is stirred and heated until disappearance of the isocyanate peak in the IR is observed. The diurethane rhodamine is poured into aluminum tins and is believed to be of the formula

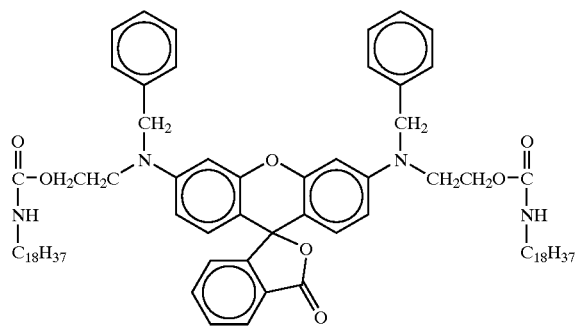

The ring-opened, or protonated, or free-base form of this colorant is believed to be of the formula

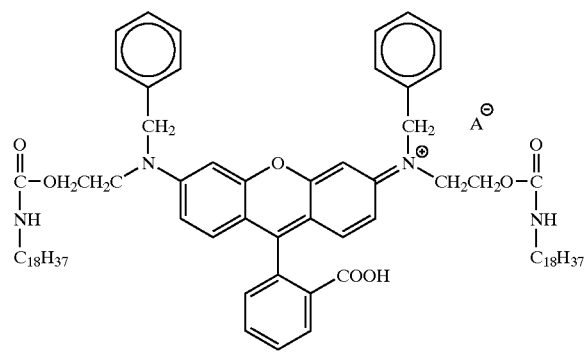

wherein A is the anion corresponding to the acid used for protonaton. The zwitterionic form of this colorant is believed to be of the formula

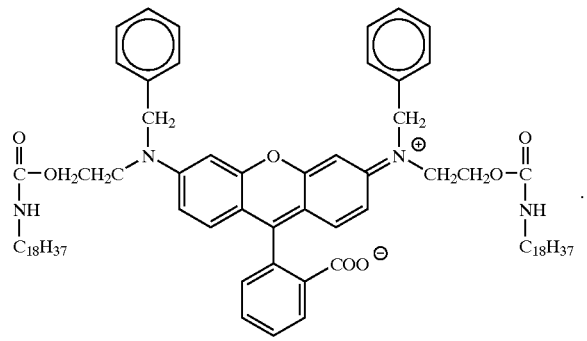

EXAMPLE XIIB

The process of Example IB was repeated except that N-benzylethanolamine (obtained from Aldrich Chemical Co., Milwaukee, Wis.), of the formula

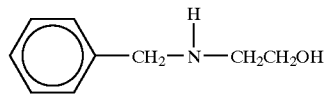

was used instead of distearyl amine. The N-benzylethanolamine was present in an amount of 10 moles of N-benzylethanolamine per every one mole of dichlorofluorescein. In addition, 2 moles of zinc chloride were used per every one mole of dichlorofluorescein and 1 mole of calcium oxide was used per every one mole of dichlorofluorescein, the solvent was the excess N-benzylethanolamine instead of tetramethylene sulfone, and the reaction mixture was refluxed in an oil bath for 48 hours, followed by distilling off the excess amine.

EXAMPLE XIIC

The process of Example IC was repeated using the product obtained in Example XIIB except that the product was poured into methanol and sufficient EDTA was added to remove all of the $Zn^{2+}$ and $Ca^{2+}$ ions. It is believed that the purified product was of the formula

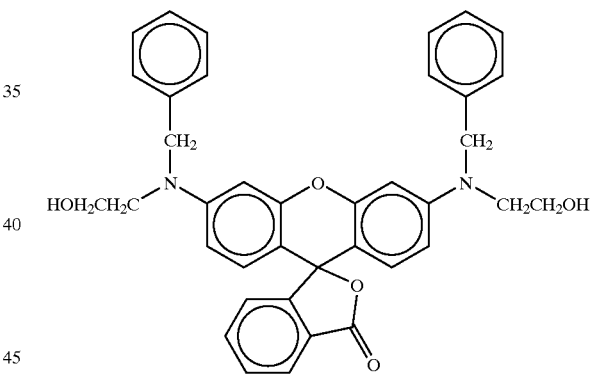

EXAMPLE XIIC-1

In a glass reaction flask is combined 10 grams of the product obtained; in Example XIIC, 29.8 grams of UNI-CID® 700 (a material containing carboxylic acid of the formula RCOOH wherein R is a linear alkyl group having an average of about 50 carbon atoms, also containing other unfunctionalized wax materials in an amount of up to about 25 percent by weight; available from Baker Petrolite, Sugarland, Tex.), 152 grams of xylene (available from Tarr, Inc., Portland, Oreg.), and 0.6 grams of para-toluenesulfonic acid (available from Capital Resin Corp., Columbus, Ohio). The materials are mixed and heated to a reflux temperature of about 143° C. After about 72 hours, the reaction is complete The reaction mixture is then cooled to 40° C. and filtered. The filter cake is reslurried and filtered two more times in methanol to remove residual xylene. The filter coke is then dried in air at ambient temperature. It is believed that this filter cake will contain a colorant of the formula

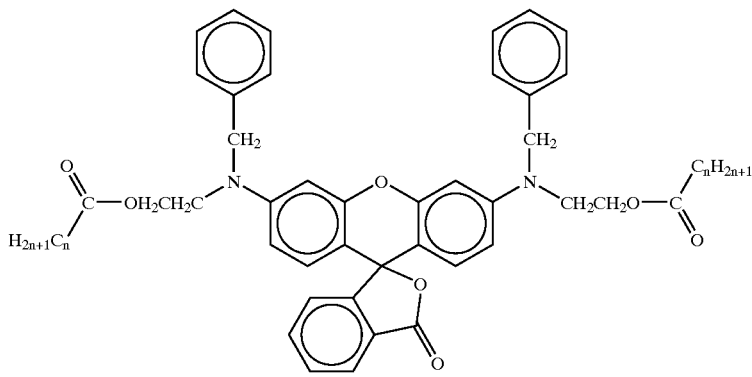
wherein n has an average value of about 50. The ring-opened, or protonated, or free-base form of this colorant is believed to be of the formula
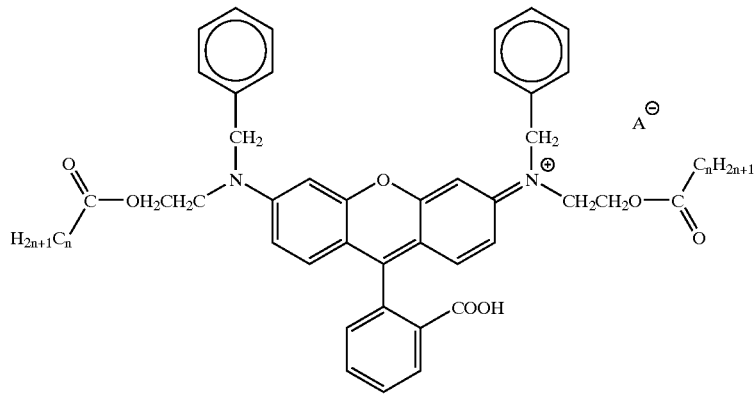
wherein A is the anion corresponding to the acid used for protonaton. The zwitterionic form of this colorant is believed to be of the formula
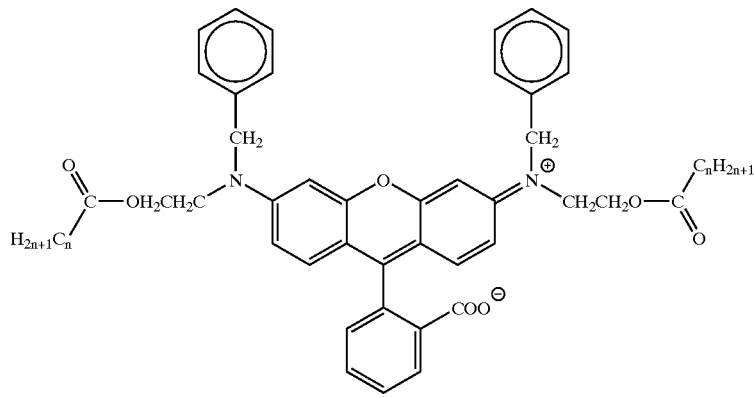

EXAMPLE XIIIB

The process of Example IB was repeated except that 2-(ethylamino)ethanol (obtained from Aldrich Chemical Co., Milwaukee, Wis.), of the formula

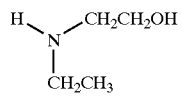

was used instead of distearyl amine. The 2-(ethylamino)ethanol was present in an amount of 20 moles of 2-(ethylamino)ethanol per every one mole of dichlorofluorescein. In addition, 2 moles of zinc chloride were used per every one mole of dichlorofluorescein and 1 mole of calcium oxide was used per every one mole of dichlorofluorescein, the solvent was the excess 2-(ethylamino)ethanol instead of tetramethylene sulfone, and the reaction mixture was refluxed in an oil bath for 24 hours, followed by distilling off the excess amine.

EXAMPLE XIIIC

The process of Example IC was repeated using the product obtained in Example XIIIB except that the product was poured into methanol and sufficient EDTA was added to remove all of the $Zn^{2+}$ and $Ca^{2+}$ ions. It is believed that the purified product was of the formula

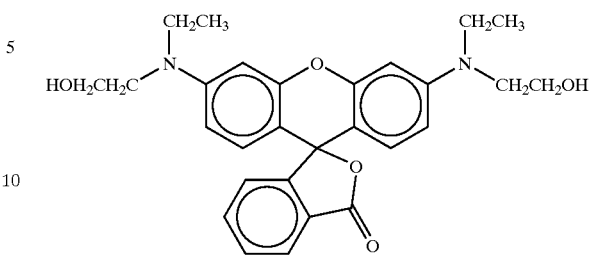

EXAMPLE XIIIC-1

About 10 grams of the product obtained in Example XIIIC is added to 12.5 grams of octadecylisocyanate (available from Aldrich Chemical Co., Milwaukee, Wis.) at 120° C., after which 1 drop of dibutyltindilaurate catalyst (available from Aldrich Chemical Co.) is added and the reaction is stirred and heated until disappearance of the isocyanate peak in the IR is observed. The diurethane rhodamine is poured into aluminum tins and is believed to be of the formula

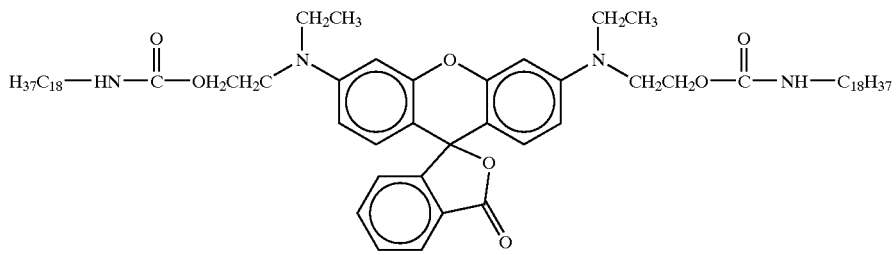

The ring-opened, or protonated, or free-base form of this colorant is believed to be of the formula

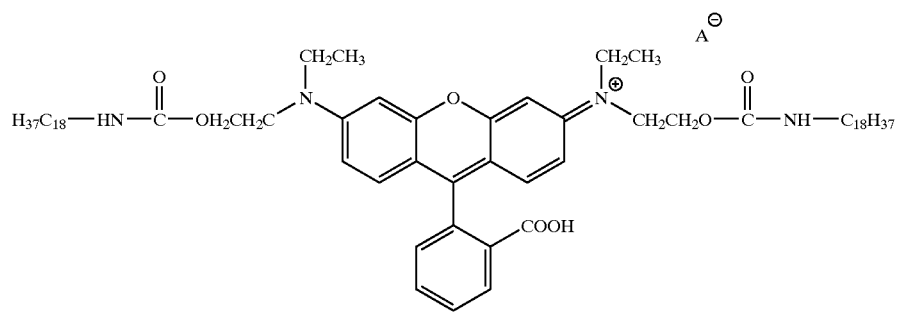

wherein A is the anion corresponding to the acid used for protonaton. The zwitterionic form of this colorant is believed to be of the formula

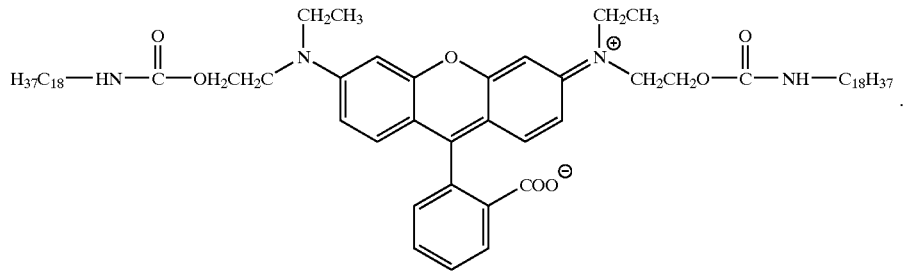

EXAMPLE XIVB

The process of Example IB was repeated except that 2-aminoanthracene (obtained from Aldrich Chemical Co., Milwaukee, Wis.), of the formula

was used instead of distearyl amine. The 2-aminoanthracene was present in an amount of 2.05 motes of 2-aminoanthracene per every one mole of dichlorofluorescein. It is believed that the product was of the formula

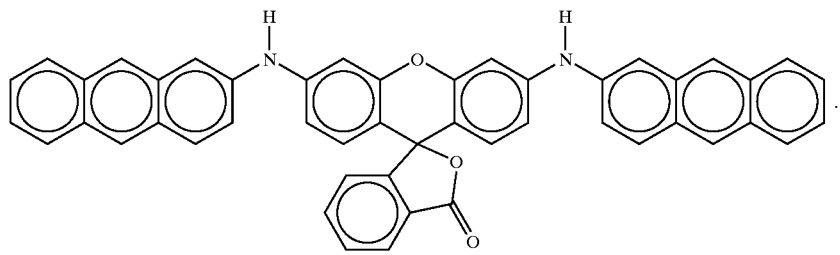

The ring-opened, or protonated, or free-base form of this colorant is believed to be of the formula

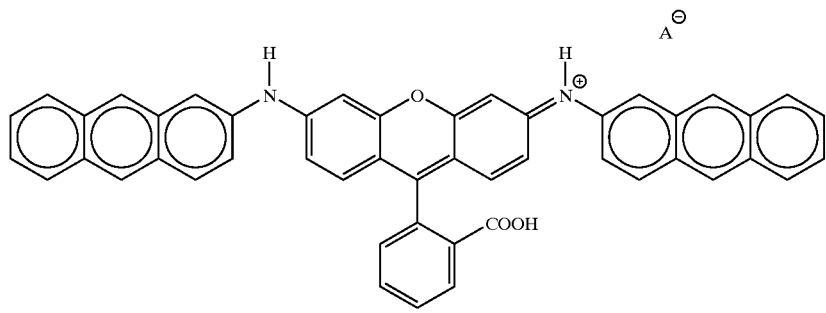

wherein A is the anion corresponding to the acid used for protonaton. The zwitterionic form of this colorant is believed to be of the formula

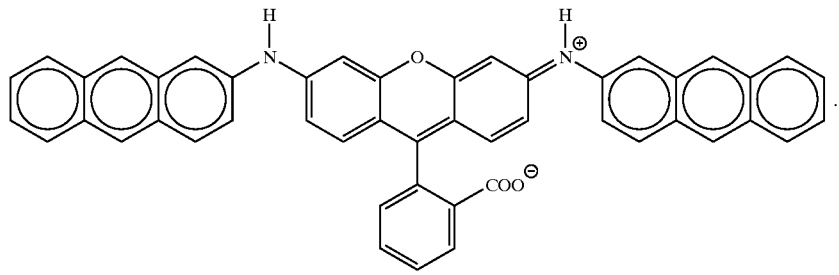

EXAMPLE XVB

The process of Example IB was repeated except that a mixture of stearyl amine (ARMEEN 18D; obtained from Akzo-Nobel, McCook, Ill.) and distearyl amine was used instead of pure distearyl amine. The stearyl amine was present in an amount of 1.02 moles of stearyl amine per every one mole of dichlorofluorescein, and the distearyl amine was present in an amount of 1.02 moles of distearyl amine per every one mole of dichlorofluorescein.

EXAMPLE XVC

The process of Example IC was repeated using the product obtained in Example XVB. It is believed that the purified product was a mixture of compounds of the formulae

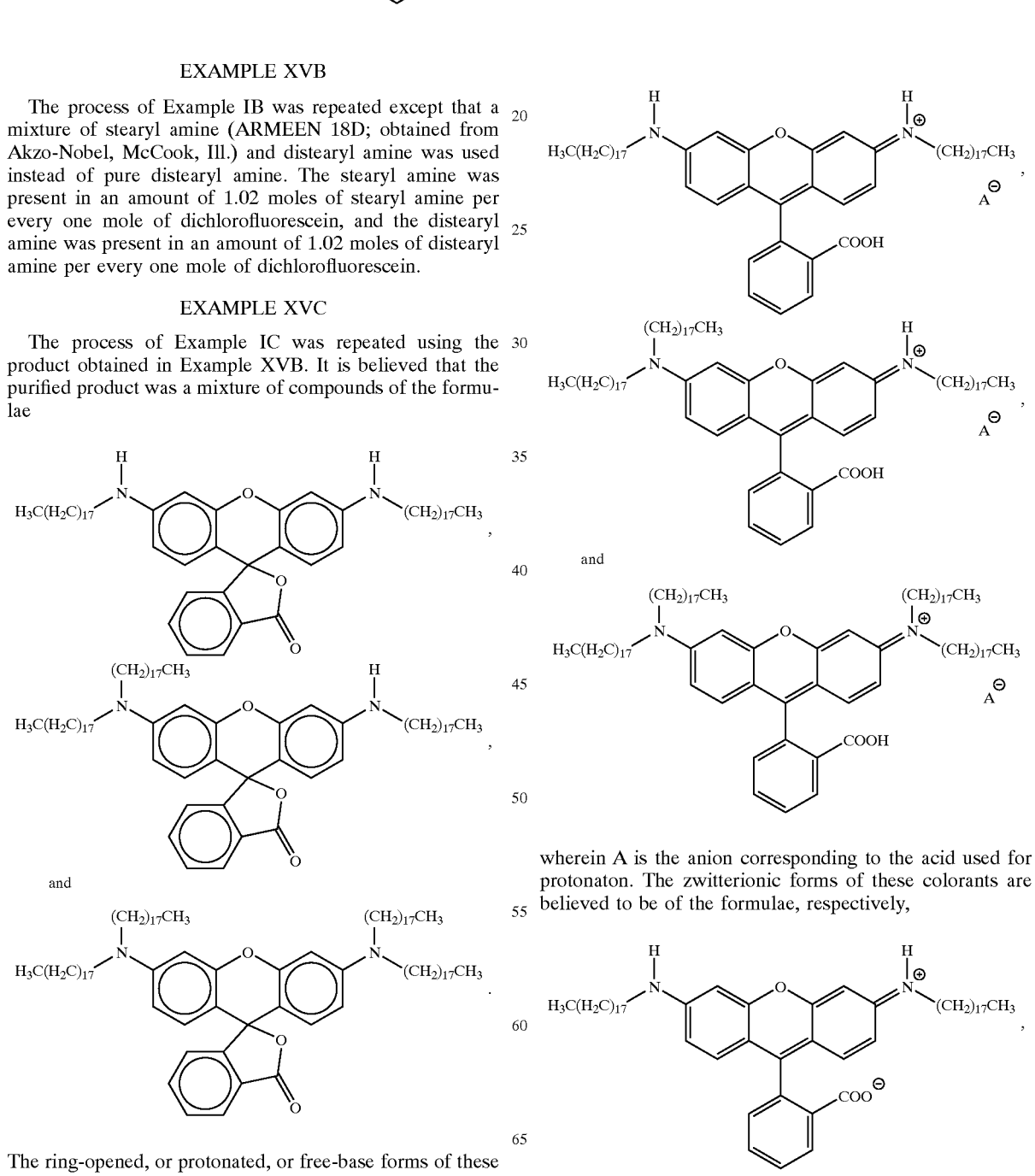

and

The ring-opened, or protonated, or free-base forms of these colorants are believed to be of the formulae, respectively, wherein A is the anion corresponding to the acid used for protonaton. The zwitterionic forms of these colorants are believed to be of the formulae, respectively, -continued

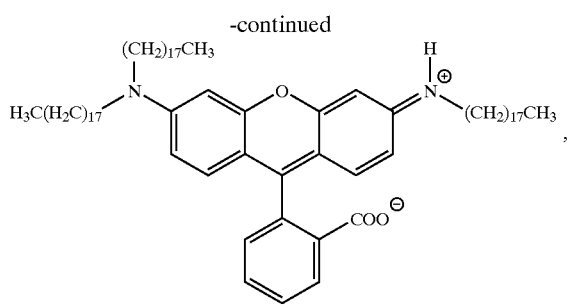
, and

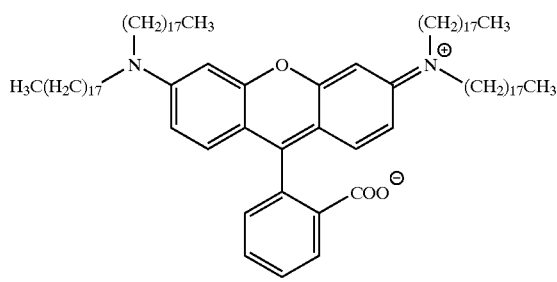

EXAMPLE XVD

The process of Example ID was repeated using the product obtained in Example XVC.

EXAMPLE XVI

The processes of Examples IA through IC were repeated.

Thereafter, to the solution of the ring-closed purified tetrastearyl colorant in MIBK was added a naphthalene disulfonate adduct of the formula

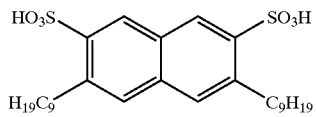

(dinonylnaphthalene disulfonic acid, 50 wt. % in isobutanol, NACURE® 155, obtained from King Industries, Norwalk, Conn.) in a stoichiometric amount of 2 moles of naphthalene sulfonate adduct per every one mole of tetrastearyl colorant. The solution was stirred until a magenta color developed fully. Thereafter, the solution was transferred to a 2 liter round bottom flask equipped with distillation setup, and the MIBK was distilled off. The product, a slightly viscous wax when worm, was transferred to a jar and allowed to harden. At room temperature, the product was a deep magenta/red colored somewhat hard wax, believed to be of the formula

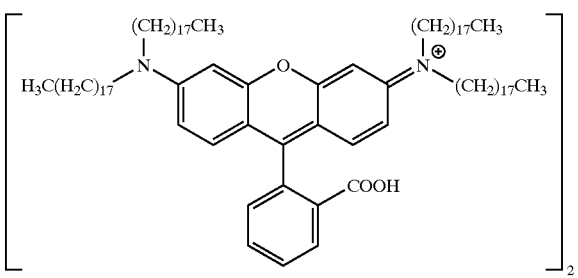

-continued

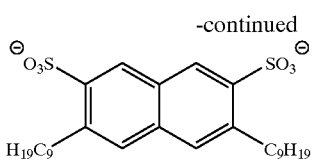

Ink Preparation and Testing

EXAMPLE XVII

Preparation of Secondary Colorant

Part 1

A secondary magenta colorant was prepared as follows,

In a glass reaction flask were combined 73 grams of sublimed quinizarin (obtained from Aceto Corp., Lake Success, N.Y.); 49 grams of leucoquinizarin (obtained from Aceto Corp.), 66 grams of 4-aminobenzene ethanol (obtained from Aceto Corp.), 31 grams of boric acid (obtained from Aldrich Chemical Co., Milwaukee, Wis.), and 780 grams of methanol (obtained from J T Baker, Phillipsburg, N.J.). The materials were mixed and heated until the solvent refluxed at about 66° C.

After about 16 hours of reflux the reaction was complete, having generated an alcohol-substituted colorant of the formula

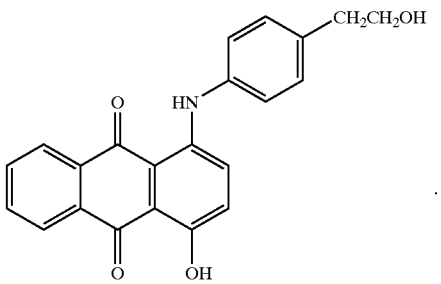

The reaction mixture was cooled and filtered. The product filter cake was dried in air at ambient temperature.

The spectral strength of the alcohol-substituted colorant was determined using a spectrophotographic procedure based on the measurement, of the colorant in solution by dissolving the colorant in toluene and measuring the absorbance using a Perkin Elmer Lambda 2S UV/VIS spectrophotometer. The spectral strength of the alcohol-substituted colorant was measured as about 21,000 mL Absorbance Units per gram at absorption $\lambda_{max}$, indicating a purity of about 80 percent.

Part 2

In a glass reaction flask were combined 8 grams of the alcohol-substituted colorant prepared in Part 1 of this. Example, 68 grams of glacial acetic acid (obtained from J T Baker), 13 grams of propionic acid (obtained from Aldrich Chemical Co.), and 2.3 grams of acetic anhydride (obtained from Aldrich Chemical Co.). The materials were mixed and heated to a reflux temperature of about 121° C. After about 4 hours of reflux, the reaction was complete and the reaction mixture contained an ethyl acetate-substituted colorant of the formula

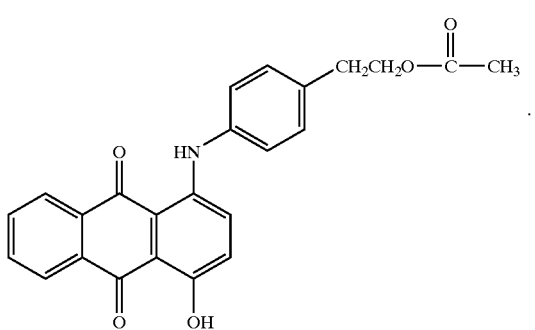

Part 3

About 91 grams of the reaction mixture containing the ethyl acetate-substituted colorant from Part 2 of, this Example was charged, into a glass reaction flask. The mixture was cooled to a minimum of 30° C. While mixing, about 9 grams of bromine (obtained from Aldrich Chemical Co.) was added to the mixture at a rate such that the temperature remained below about 40° C. The mixture was then heated to about 40° C. After about 24 hours of mixing the reaction was complete.

The reaction mixture was then quenched into 234 grams of deionized water and allowed to cool to room temperature. The reaction mixture was then filtered. The filter coke was reslurried and filtered twice in deionized water to remove most of the residual acetic acid. The filter coke was then dried in a 60° C. oven. This filter coke contained a mixture of brominated ethyl acetate-substituted colorants of the formulae

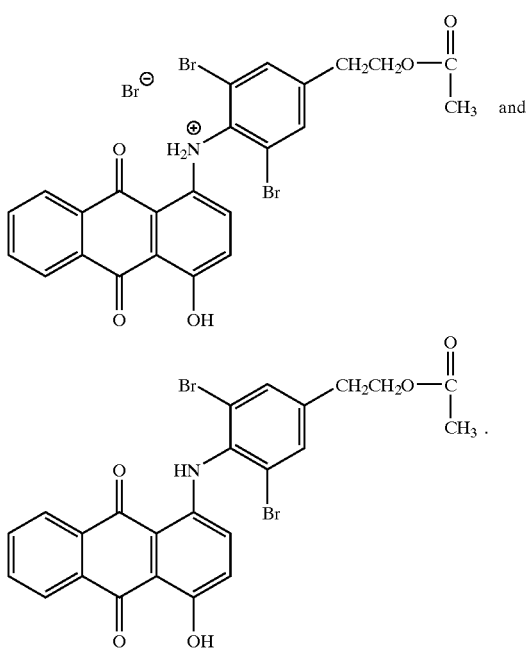

The spectral strength of the brominated ethyl acetate-substituted colorant was determined using a spectrophotographic procedure based on the measurement of the colorant in solution by dissolving the colorant in toluene and measuring the absorbance using a Perkin Elmer Lambda 2S UV/VIS spectrophotometer. The spectral strength of the brominated ethyl acetate-substituted colorant was measured as about 15,000 mL Absorbance Units per gram at absorption $\lambda_{max}$. This spectral strength indicated a purity of about 60 percent.

Part 4

In a glass reaction flask were combined 18 grams of the mixture of the brominated ethyl acetate-substituted colorant and its salt prepared in Part 3 of this Example, 72 grams of N-methyl-2-pyrrolidone (obtained from Aldrich Chemical Co.), 4 grams of sodium hydroxide (obtained from Aldrich Chemical Co.), and 4 grams of deionized water. The materials were mixed and heated to about 60° C. After about 3 hours the reaction was complete.

The reaction mixture was then quenched into 234 grams of deionized water and allowed to cool to room temperature. Glacial acetic acid was added until the solution reached a pH of between 6 and 7. The reaction mixture was then filtered. The filter cake was reslurried and filtered twice in deionized water to remove most of the residual N-methyl-2-pyrrolidone. The filter cake was then dried in a 60° C. oven. This filter cake contained a brominated alcohol-substituted colorant of the formula

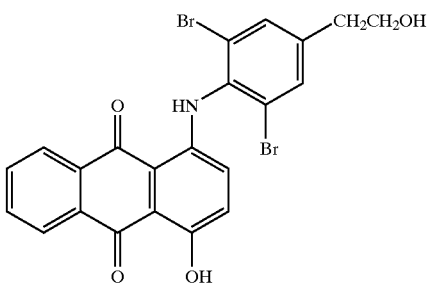

The spectral strength of the brominated alcohol-substituted colorant was determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. The spectral strength of the brominated alcohol-substituted colorant was measured as about 16,000 mL Absorbance Units per gram at absorption $\lambda_{max}$. This spectral strength indicated a purity of about 60 percent.

Part 5

In a glass reaction flask were combined 16 grams of the brominated alcohol-substituted colorant prepared in Part 4 of this Example, 31 grams of UNICID® 700 (a material containing carboxylic acid of the formula $R_2COOH$ wherein $R_2$ is a linear alkyl group having an average of about 50 carbon atoms, also containing other unfunctionalized wax materials in an amount of up to about 25 percent by weight; obtained from Baker Petrolite, Sugarland, Tex.), 152 grams of xylene (obtained from Tarr, Inc., Portland, Oreg.), and 0.6 grams of para-toluenesulfonic acid (obtained from Capital Resin Corp., Columbus, Ohio). The materials were mixed and heated to a reflux temperature of about 143° C. After about 7 hours, the reaction was complete The reaction mixture was then cooled to 40° C. and filtered. The filter cake was reslurried and filtered two more times in methanol to remove residual xylene. The filter cake was then dried in air at ambient temperature. This filter cake contained a colorant of the formula

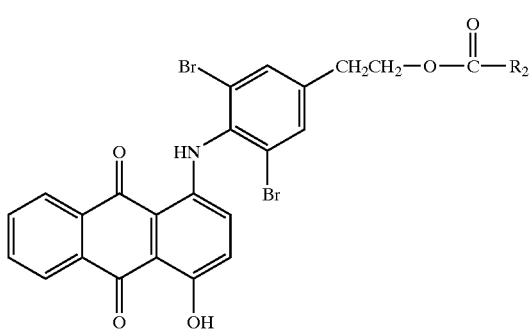

wherein $R_2$ is a linear alkyl group having an average of about 50 carbon atoms.

The spectral strength of the colorant was determined using a spectrophotographic procedure based on the measurement of the colorant in solution by dissolving the colorant in an equal mixture of toluene and tetrahydrofuran and measuring the absorbance using a. Perkin Elmer Lambda 2S UV/VIS spectrophotometer. The spectral strength of the colorant was measured as about 5,000 mL Absorbance Units per gram at absorption $\lambda_{max}$. This spectral strength indicated a purity of about 40 percent.

Ink compositions containing the colorants of Examples ID and IIID, and, for comparison purposes, commercially available n-butyl Solvent Red 172 (n-BuSR$_{172}$; UNIGRAPH Red 1900, obtained from United Color Manufacturing, Inc., Newtown, Pa.) and commercially available. Solvent Red 49 (SR49; a rhodamine colorant obtained from BASF, Germany) were prepared as follows.

Ink A: In a stainless steel beaker were combined 243.00 grams of polyethylene wax (PE 655, obtained from Baker Petrolite, Tulsa, Okla., of the formula $CH_3(CH_2)_{50}CH_3$), 122.15 grams of stearyl stearamide wax (KEMAMIDE® S-180, obtained from Crompton Corporation, Greenwich, Conn.), 108.00 grams of a tetra-amide resin obtained from the reaction of one equivalent of dimer diacid with two equivalents of ethylene diamine and UNICID® 700 (a carboxylic acid derivative of a long chain alcohol obtained from Baker Petrolite, Tulsa, Okla.), prepared as described in Example 1 of U.S. Pat. No. 6,174,937, the disclosure of which is totally incorporated herein by reference, 65.45 grams of a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 23.00 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, and 1.10 gram of NAUGUARD® 445 antioxidant (obtained from Uniroyal Chemical Co., Middlebury, Conn.). The materials were melted together at a temperature of 135° C. in an oven, and then blended by stirring in a temperature-controlled mantle at 135° C. for 0.2 hour. To this mixture was then added 22.98 grams of the tetrastearyl colorant prepared as described in Example ID, 17.66 grams of a secondary magenta colorant (prepared as described in Parts 1 through 5 of this Example), and 3.20 grams dodecyl benzene sulfuric acid (DDBSA, Bio-soft S-100, obtained from Stepan Company, Elwood, Ill.). After stirring for 2 additional hours, the magenta ink thus formed was filtered through a heated MOTT® apparatus (obtained from Mott Metallurgical) using Whatmon #3 filter paper under a pressure of 15 pounds per square inch. The filtered phase change ink was poured into molds and allowed to solidify to form ink sticks. The magenta phase change ink thus prepared exhibited a viscosity of 10.49 centipoise as measured by a Rheometrics cone-plate viscometer at about 140° C., melting points of 85° C. and 103° C. as measured by differential scanning calorimetry using a DuPont 2100 calorimeter, a glass transition temperature ($T_g$) of 19° C., and a spectral strength of 1,023 milliliters absorbance per gram at 552 nanometers, determined by using a spectrophotographic procedure based on the measurement of the colorant in solution by dissolving the solid ink in n-butanol and measuring the absorbance using a Perkin Elmer Lambda 2S UV/VIS spectrophotometer.

Ink B: Ink B was prepared in a similar manner to that used to prepare Ink A but using a different formulation for the ink composition as described in the table below. The properties of Ink B were obtained using the same methods as those used for Ink A. As shown in the table, the predominant difference between Ink A and Ink B is the relative concentrations of colorants and DDBSA in the ink. The viscosities of Ink A and Ink B are virtually the same.

Ink C: Ink C was prepared by the process described for Ink A except that the distearyl colorant from Example IIID was used in place of the tetrastearyl colorant from Example ID and no DDBSA was used. The properties of Ink C were obtained using the same methods as those used for Ink A.

Inks D and E: These inks were prepared by the process described for Ink A except that the distearyl colorant from Example IIID was used in place of the tetrastearyl colorant from Example ID and no DDBSA was used. The properties of Inks D and E were obtained using the same methods as those used for Ink A. Inks D and E use same colorant set as in Ink C but have higher relative concentrations of the distearyl colorant, as the results in high spectra strength indicate.

Ink F (Comparative): An ink was prepared by the process described for Ink A except that instead of the colorant from Example ID and the secondary magenta colorant prepared in Parts 1 through 5 of this Example, the commercially available SR 49 and n-butyl SR172 were used. The properties of Ink F were obtained using the same methods as those used for Ink A.

Ink G (Comparative): An ink was prepared by the process described for Ink A except that instead of the colorant from Example ID, the commercially available SR 49 was used. The properties of Ink G were obtained using the same methods as those used for Ink A.

Ink H: An ink was prepared by the process described for Ink A except that instead of the colorant from Example ID, the colorant prepared in, Example XVI was used, dinonyl-naphthalene disulfonic acid (50 wt. % in isobutanol, NACURE® 155, obtained from King Industries, Norwalk, Conn.) was used, in place of DDBSA, and no secondary colorant was used. The properties of Ink H were obtained using the same methods as those used for Ink A.

The following table summarizes the compositions of the various inks and the amounts of ingredients (weight percentage numbers given in the table) therein:

| Ingredient | Ink A | Ink B | Ink C | Ink D | Ink E | Ink F | Ink G | Ink H |
|---|---|---|---|---|---|---|---|---|
| POLYWAX | 40.06 | 40.16 | 44.62 | 43.81 | 42.99 | 41.83 | 45.67 | 38.68 |
| S-180 | 20.14 | 19.38 | 13.18 | 13.18 | 12.93 | 19.26 | 13.17 | 17.05 |
| Tetra-amide | 17.81 | 17.82 | 19.36 | 19.00 | 18.64 | 20.36 | 19.04 | 23.56 |
| Urethane Resin 1* | 10.79 | 12.47 | 10.42 | 10.42 | 10.22 | 10.13 | 10.68 | 10.45 |
| Urethane Resin 2** | 3.79 | 4.26 | 8.00 | 7.90 | 7.75 | 5.56 | 8.09 | 5.76 |
| Example ID colorant | 3.79 | 2.61 | — | — | — | — | — | — |
| Example IIID colorant | — | — | 2.30 | 3.57 | 5.33 | — | — | — |
| Example XVI colorant | — | — | — | — | — | — | — | 3.56 |
| SR49 | — | — | — | — | — | 0.55 | 0.46 | — |
| 2° magenta colorant | 2.91 | 2.03 | 1.93 | 1.93 | 1.93 | — | 1.91 | — |
| n-Butyl SR 172 | — | — | — | — | — | 1.01 | — | — |
| DDBSA | 0.53 | 1.10 | — | — | — | 1.11 | 0.80 | — |
| NACURE 155 | — | — | — | — | — | — | — | 0.78 |
| NAUGUARD 445 | 0.18 | 0.18 | 0.20 | 0.20 | 0.20 | 0.19 | 0.20 | 0.18 |
| Total | 100.0 | 100.0 | 100.0 | 100.0 | 100.0 | 100.0 | 100.0 | 100.0 |

*ABITOL E based urethane resin
**Glycerol alcohol based urethane resin

The magenta inks thus prepared were successfully printed on HAMMERMILL LASERPRINT® paper (obtained from International Paper, Memphis, Tenn.) with a XEROX® PHASER 860 printer, which uses a printing process wherein the ink is first jetted in an imagewise pattern onto an intermediate transfer member followed by transfer of the Imagewise pattern from the intermediate transfer member to a final recording substrate. The solid field images with a resolution of 450 dpi×600 dpi were generated from the printer, and their color space, data were obtained on an. ACS® Spectro Sensor® II Colorimeter (obtained from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample.

Another type of printed sample was generated on HAMMERMILL LASERPRINT® paper using a K Printing Proofer (manufactured by R K Print Coat. Instrument Ltd., Litlington, Royston, Heris, SG8 0OZ, U.K.). In this method, the tested inks were melted onto a printing plate set at 150° C. temperature. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain the color value measurements.

Printed samples of the magenta inks both from the XEROX PHASER® printer and from the K-Proofer were evaluated for color characteristics, which are reported in the table below. As is apparent, the CIE L*a*b* values for inks made with colorants according to the present invention represent a magenta shade printed ink. The table below lists the viscosity ($\eta$, centipoise) of the inks at 140° C., the spectral strength in n-butanol (SS, $mL^*g^{-1}\,cm^{-1}$) and absorbance maximum (Lambda max, nm) of the inks, and the CIE L*a*b color coordinates of the prints made either using the XEROX PHASER® 860 printer or the K-proofer:

| Ink | $\eta$ | SS | Lambda Max | L*/a*/b* of Prints from 860 Printer | L*/a*/b* of prints from K-Proofer |
|---|---|---|---|---|---|
| A | 10.49 | 10.23 | 552 | 48.7/76.9/−37.7 | — |
| B | 10.54 | 1328 | 552 | 50.1/69.1/−37.2 | 56.3/59.3/−32.5 |
| C | 10.62 | 1382 | 522 | — | 62.2/71.2/−29.9 |
| D | 10.30 | 2075 | 522 | — | 58.6./75.0/−27.8 |
| E | 10.59 | 2874 | 522 | — | 54.8/78.0/−25.2 |
| F | 10.53 | 1686 | 555 | — | — |
| G | 10.77 | 1279 | 555 | 54.0/76.8/−41.3 | 60.9/68.0/−42.7 |
| H | — | — | — | — | 65.3/70.5/−30.0 |

— indicates not measured

The color values in the above table indicate that the colorant of Example ID, the colorant of Example IIID, and the colorant of Example XVI can be used in hot melt inks with good magenta color as evidenced by the high a* and b* values of the prints. As evidenced in the table, the colors of the inks containing the tetrastearyl colorant (Ink A and B) of this invention are bright magenta and similar to the comparative inks made from commercially available SR 49 (Ink G). In contrast to commercial SR 49 colorant, which normally needs a relatively strong acid such as DDBSA to develop its color in ink base, the distearyl colorants of this invention in inks C through E show reasonably strong reddish magenta color without an acid developer. The inks' spectra strengths and a* values increase with their colorant concentration, as shown in Inks C through E. Good colorant solubility of the distearyl colorant in tested ink bases are demonstrated by the very high colorant loads and corresponding very high spectral strength in Ink C through E.

EXAMPLE XVIII

Thermal stability of the tetrastearyl colorant from Example ID was compared to comparative SR 49 colorant by monitoring their inks' spectral strength after heating. In this method, the inks were heated in glass jars continuously in an oven of 145° C. The ink's spectral strength in n-butanol (related to the amount of the soluble colorant in ink) was measured as a function of aging time. Any thermal decomposition of a test colorant would be observable as discoloration and could thereby detected as a change in the spectral strength.

The table below illustrates spectral strength relative to the initial values verse elapsed time for Ink A and comparative Ink F samples. The remaining spectral strength is used here as the measurement of remaining undegraded colorant in the ink. It is evident that the colorants in Ink A have superior thermal stability compared to those in comparative Ink F.

| Cooking time (days) | 1 | 2 | 7 | 11 | 15 |
|---|---|---|---|---|---|
| Ink A | 100.0 | 97.1 | 86.9 | 79.4 | 72.7 |
| Ink F | 100.0 | 94.1 | 80.0 | 71.1 | 63.7 |

Colorant degradation not only leads to a decrease in spectral strength (as shown in the above table) but can also generate undesirable color shift or fade as a result of the colorant decomposition reaction in the ink. Both of these phenomena can adversely affect the color quality of prints from the inks if the colorant is not thermally stable. From a practical application point of view, the overall color change of the ink (measured as ΔE change in color values) is also important when evaluating colorant thermal stability.

A thermal stability test was performed by heating the test inks in glass jars, then sampling and printing the inks on HAMMERMILL LASERPRINT® paper using a K-Proofer, and finally measuring the color changes of the prints of the sampled inks as a function of time. The color changes of the resultant prints were monitored by CIELAB values and expressed by Delta E relative to the initial CIELAB values. The color change of each sample was determined according to the methods described hereinabove for obtaining CIELAB values. Color changes were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). The results for Inks B, C, and G are shown in the tables below. As the data in the tables indicate, Inks B and C containing the colorants of Example ID and Example IIID demonstrated better color stability than comparative Ink G containing SR 49.

| Cooking time (days) | 0 | 1 | 3 | 5 | 7 | 9 |
|---|---|---|---|---|---|---|
| Ink C | 0.0 | 2.5 | 4.3 | 3.6 | 8.3 | 10.2 |
| Ink G | 0.0 | 4.2 | 8.5 | 10.0 | 11.5 | 11.7 |

ΔE values for Inks C and G when heated at 140° C.

| Cooking time (days) | 0 | 0.8 | 1.0 | 3.0 | 3.1 | 5.0 | 6.9 | 7.0 | 10.0 |
|---|---|---|---|---|---|---|---|---|---|
| Ink B | 0.0 | — | 1.8 | 3.6 | — | 5.0 | — | 5.3 | — |
| Ink G | 0.0 | 2.6 | — | — | 4.8 | — | 8.7 | — | 9.4 |

ΔE values for Inks B and G when heated at 136° C.;
— indicates not measured.

EXAMPLE XIX

The ink containing the colorant of Example, ID (Ink B) was tested for colorant diffusion. For comparison purposes, comparative Ink G containing the commercial colorant SR 49 was also tested; both inks contained the secondary colorant prepared in Parts 1 through 5 of Example XVII and DDBSA. This diffusion evaluation method entailed generating text prints of the magenta inks, applying SCOTCH® tape (obtained from 3M, St. Paul, Minn.) adhesive to a portion of the text, and examining the extent of colorant diffusion into the adhesive material over time. The text print samples were then studied to observe how heat amplified colorant diffusion over time. This test simulated the real situation when one applies SCOTCH® tape adhesive labels onto prints, generated with inks-containing the-colorants. Heating the prints served to mimic the conditions when prints are handled in worm climates or passed through high-speed-document handlers.

After heating at 45° C. for six days and then remaining at room temperature for six weeks, the printed text area using comparative Ink G with commercial colorant SR 49 displayed extensive colorant diffusion into the applied tape, resulting in blurry edges of the text characters. For Ink B containing the colorant of Example ID, the extent of diffusion was noticeable but of lesser extent, and the printed text situated beneath the adhesive tape was more legible. The results demonstrated that the colorant-of Example ID has fewer tendencies to diffuse compared to the commercial SR 49. Although not being limited to any particular theory, it is believed that the long alkyl groups in the colorant of Example ID help to prevent colorant diffusion in the ink base.

Other embodiments and modifications of the, present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a phase change ink carrier and a colorant compound of the formula

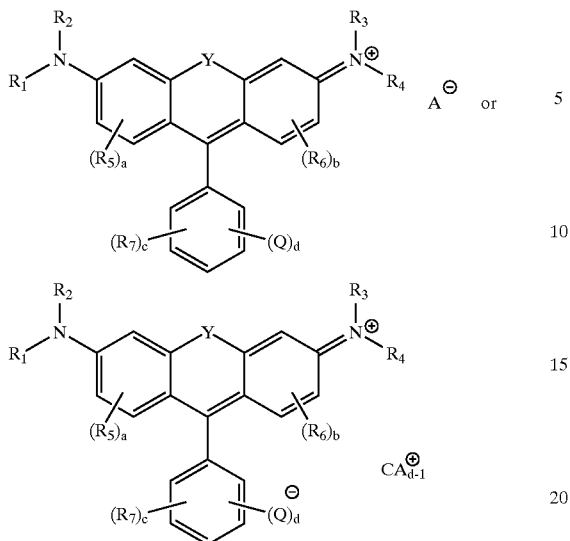

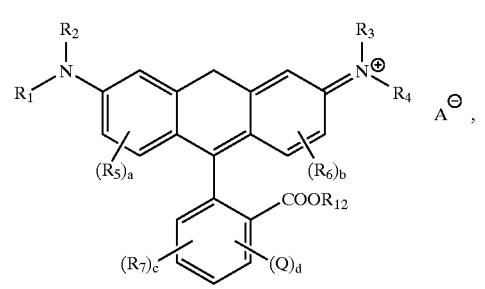

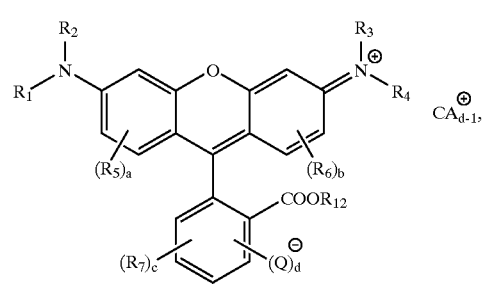

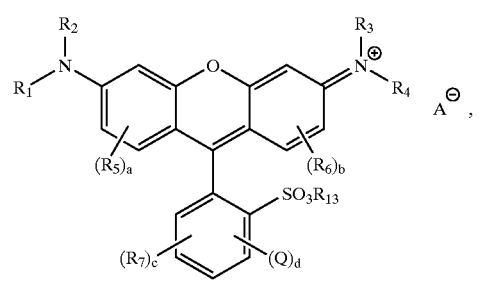

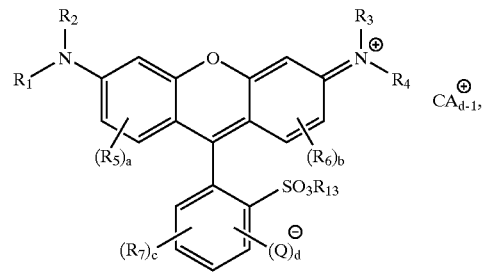

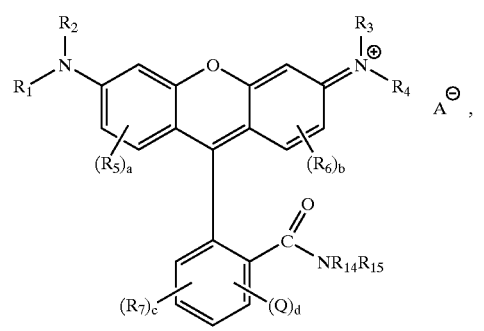

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, (ii) an aryl group, (iii) an arylalkyl group, (iv) on alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

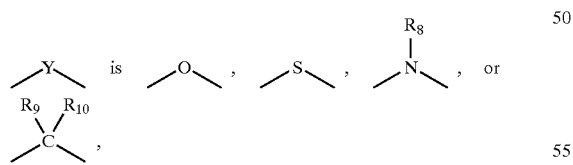

$R_8$, $R_9$, and $R_{10}$ each, independently of the others, is (i) a hydrogen atom, (ii) an alkyl group, (iii) an aryl group, (iv) an arylalkyl group, or (v) an alkylaryl group, provided that the number of carbon atoms in $R_1+R_2+R_3+R_4+R_5+R_6+R_7+R_8+R_9+R_{10}$ is at least about 16, Q is a COOH group or a $SO_3H$ group, $Q^-$ is a $COO^-$ group or a $SO_3^-$ group, d is an integer which is 1, 2, 3, 4, or 5, A is an anion, and CA is either a hydrogen atom or a cation associated with all but one of the $Q^-$ groups, provided that when the colorant compound is of the formula -continued

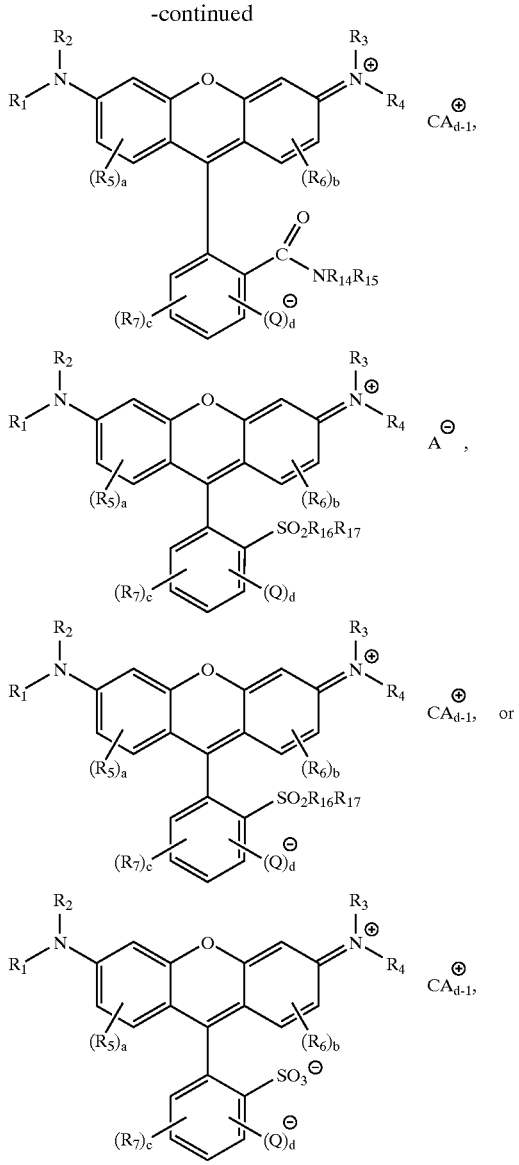

wherein $R_{12}$, $R_{13}$, $R_{14}$, $R_{15}$, $R_{16}$, and $R_{17}$ each independently of the other, is (i) an alkyl group, (ii) an aryl group, (iii) an arylalkyl group, or (iv) an alkylaryl group, (I) either (a) c is an integer which is 0, 1, 2, or 3, or (b) d is an integer which is 1, 2, 3, or 4, and (II) either (a) three of $R_1$, $R_2$, $R_3$, and $R_4$ are hydrogen atoms; (b) only one of $R_1$, $R_2$, $R_3$, and $R_4$ is a hydrogen atom; (c) $R_1$ and $R_2$ are both hydrogen atoms; (d) $R_3$ and $R_4$ are both hydrogen atoms; or (e) $R_1$ and $R_3$ are both hydrogen atoms and $R_2$ and $R_4$ are each, independently of the other, either alkyl groups or arylalkyl groups.

2. A phase change ink composition according to claim 1 wherein the phase change ink carrier comprises a monoamide, a tetra-amide, or a mixture thereof.

3. A phase change ink composition according to claim 1 wherein the phase change ink carrier comprises (a) stearyl stearamide, (b) a dimer acid based tetra-amide that is the reaction product of dimer acid, ethylene diamine, and stearic acid, or (c) mixtures thereof.

4. A phase change ink composition according to claim 1 wherein the phase change ink carrier comprises (a) stearyl stearamide, (b) a dimer acid based tetra-amide that is the reaction product of dimer acid, ethylene diamine, and a carboxylic acid having at least about 36 carbon atoms, or (c) mixtures thereof.

5. A phase change ink composition according to claim 4 wherein the carboxylic acid has at least about 40 carbon atoms, and wherein the carboxylic acid has no more than about 200 carbon atoms.

6. A phase change ink composition according to claim 1 wherein the phase change ink carrier comprises an isocyanate-derived material.

7. A phase change ink composition according to claim 1 wherein the phase change ink carrier comprises a urethane isocyanate-derived material, a urea isocyanate-derived material, a urethane/urea isocyanate-derived material, or mixtures thereof.

8. A phase change ink composition according to claim 1 wherein the phase change ink carrier comprises a mixture of one or more amides and one or more isocyanate-derived materials.

9. A phase change ink composition according to claim 1 wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

10. A phase change ink composition according to claim 1 wherein the phase change ink carrier is present in the ink in an amount of at least about 0.1 percent by weight of the ink and wherein the phase change ink carrier is present in the ink in an amount of no more than about 99 percent by weight of the ink.

11. A phase change ink composition according to claim 1 wherein the phase change ink carrier is present in the ink in an amount of at least about 50 percent by weight of the ink and wherein the phase change ink carrier is present in the ink in an amount of no more than about 98 percent by weight of the ink.

12. A phase change ink composition according to claim 1 wherein the phase change ink carrier is present in the ink in an amount of at least about 90 percent by weight of the ink and wherein the phase change ink carrier is present in the ink in an amount of no more than about 95 percent by weight of the ink.

13. A phase change ink composition according to claim 1 wherein the ink further contains an antioxidant.

14. A phase change ink composition according to claim 13 wherein the antioxidant is present in the ink in an amount of at least about 0.01 percent by weight of the ink, and wherein the antioxidant is present in the ink in an amount of no more than about 20 percent by weight of the ink.

15. A phase change ink composition according to claim 1 wherein the ink further contains a viscosity modifier.

16. A phase change ink composition according to claim 15 wherein the viscosity modifier is an aliphatic ketone.

17. A phase change ink composition according to claim 15 wherein the viscosity modifier is present in the ink in an amount of at least about 0.1 percent by weight of the ink and wherein the viscosity modifier is present in the ink in an amount of no more than about 99 percent by weight of the ink.

18. A phase change ink composition according to claim 1 wherein the ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

19. A phase change ink composition according to claim 1 wherein the ink carrier comprises (a) a polyethylene wax in an amount of at least about 25 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

20. A phase change ink composition according to claim 1 wherein the colorant is present in the ink in an amount of at least about 0.1 percent by weight of the ink.

21. A phase change ink composition according to claim 1 wherein the colorant is present in the ink in an amount of at least about 0.5 percent by weight of the ink.

22. A phase change ink composition according to claim 1 wherein the colorant is present in the ink in an amount of at least about 1 percent by weight of the ink.

23. A phase change ink composition according to claim 1 wherein the colorant is present in the ink in an amount of no more than about 20 percent by weight of the ink.

24. A phase change ink composition according to claim 1 wherein the colorant is present in the ink in an amount of no more than about 13 percent by weight of the ink.

25. A phase change ink composition according to claim 1 wherein the colorant is present in the ink in an amount of no more than about 6 percent by weight of the ink.

26. A phase change ink composition according to claim 1 wherein the ink has a melting point of no lower than about 50° C. and wherein the ink has a melting point of no higher than about 160° C.

27. A phase change ink composition according to claim 1 wherein the ink has a melting point of no lower than about 70° C. and wherein the ink has a melting point of no higher than about 140° C.

28. A phase change ink composition according to claim 1 wherein the ink has a melting point of no lower than about 80° C. and wherein the ink has a melting point of no higher than about 100° C.

29. A phase change ink composition according to claim 1 wherein the ink has a melt viscosity at a temperature of about 140° C. of no more than about 30 centipoise.

30. A phase change ink composition according to claim 1 wherein the ink has a melt viscosity at a temperature of about 140° C. of no more than about 20 centipoise.

31. A phase change ink composition according to claim 1 wherein the ink has a melt viscosity of at a temperature of about 140° C. of no more than about 15 centipoise.

32. A phase change ink composition according to claim 1 wherein the ink has a melt viscosity at a temperature of about 140° C. of no less than about 2 centipoise.

33. A phase change ink composition according to claim 1 wherein the ink has a melt viscosity at a temperature of about 140° C. of no less than about 5 centipoise.

34. A phase change ink composition according to claim 1 wherein the ink has a melt viscosity at a temperature of about 140° C. of no less than about 7 centipoise.

35. A phase change ink composition according to claim 1 further containing an anthraquinone colorant.

36. A phase change ink composition according to claim 35 wherein the anthraquinone colorant is Solvent Red 172.

37. A phase change ink composition according to claim 35 wherein the anthraquinone colorant is of the formula

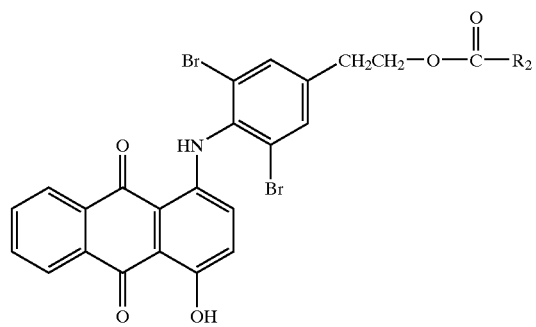

wherein $R_2$ is a linear alkyl group having an average of about 50 carbon atoms.

38. A phase change ink composition according to claim 1 further containing an acid having a $K_a$ value greater than that of the $K_a$ of the Q and/or $Q^-$ groups on the colorant.

39. A phase change ink composition according to claim 38 wherein the acid is para-toluene-sulfonic acid, dodecylbenzenesulfonic acid, hydrochloric acid, trifluoroacetic acid, methylsulfonic acid, trifluoromethyl sulfonic acid, hydrobromic acid, or a mixture thereof.

40. A phase change ink composition according to claim 1 wherein a, b, and c are each zero.

41. A phase change ink composition according to claim 1 wherein d is 1.

42. A phase change ink composition according to claim 1 wherein d is 2.

43. A phase change ink composition according to claim 1 wherein d is 1, Q is a COOH group, and $Q^-$ is a $COO^-$ group.

44. A phase change ink composition according to claim 1 wherein d is 1, Q is a $SO_3H$ group, and $Q^-$ is a $SO_3^-$ group.

45. A phase change ink composition according to claim 1 wherein

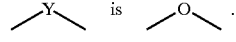

46. A phase change ink composition according to claim 1 wherein

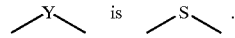

47. A phase change ink composition according to claim 1 wherein

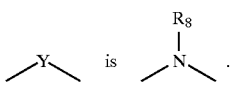

48. A phase change ink composition according to claim 1 wherein

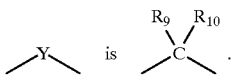

49. A phase change ink composition according to claim 1 wherein A is an organic dianion of the formula $A_1-R_{11}-A_2$ wherein $A_1$ and $A_2$ each, independently of the other, are anions and wherein $R_{11}$ is (i) an alkylene group, (ii) an arylene group, (iii) an arylalkylene group, or (iv) an alkylarylene group.

50. A phase change ink composition according to claim 49 wherein $A_1$ and $A_2$ each, independently of the other, are selected from the group consisting of $SO_3^-$ and $COO^-$.

51. A phase change ink composition according to claim 49 wherein $A_1$ and $A_2$ are each sulfonate anions.

52. A phase change ink composition according to claim 49 wherein $R_{11}$ is an unsubstituted naphthalene disulfonate, a substituted naphthalene disulfonate, an unsubstituted benzene disulfonate, or a substituted benzene disulfonate.

53. A phase change ink composition according to claim 49 wherein the organic dianion is of the formula

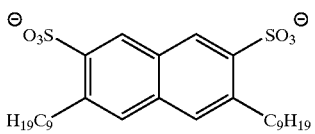

54. A phase change ink composition according to claim 1 wherein at least one of $R_1$, $R_2$, $R_3$, and $R_4$ is an alkyl group.

55. A phase change ink composition according to claim 54 wherein the alkyl group is a linear alkyl group.

56. A phase change ink composition according to claim 54 wherein the alkyl group is a branched alkyl group.

57. A phase change ink composition according to claim 54 wherein the alkyl group is a saturated alkyl group.

58. A phase change ink composition according to claim 54 wherein the alkyl group is an unsaturated alkyl group.

59. A phase change ink composition according to claim 54 wherein the alkyl group is a cyclic alkyl group.

60. A phase change ink composition according to claim 54 wherein the alkyl group is a substituted alkyl group.

61. A phase change ink composition according to claim 54 wherein the alkyl group is an unsubstituted alkyl group.

62. A phase change ink composition according to claim 54 wherein the alkyl group has at least about 18 carbon atoms.

63. A phase change ink composition according to claim 54 wherein at least one hetero atom selected from oxygen, nitrogen, sulfur, silicon, or phosphorus is present in the alkyl group.

64. A phase change ink composition according to claim 54 wherein no hetero atoms are present in the alkyl group.

65. A phase change ink composition according to claim 1 wherein at least one of $R_1$, $R_2$, $R_3$, and $R_4$ is an aryl group.

66. A phase change ink composition according to claim 65 wherein the aryl group is a substituted aryl group.

67. A phase change ink composition according to claim 65 wherein the aryl group is an unsubstituted aryl group.

68. A phase change ink composition according to claim 65 wherein at least one hetero atom selected from oxygen, nitrogen, sulfur, silicon, or phosphorus is present in the aryl group.

69. A phase change ink composition according to claim 65 wherein no hetero atoms are present in the aryl group.

70. A phase change ink composition according to claim 1 wherein at least one of $R_1$, $R_2$, $R_3$, and $R_4$ is an arylalkyl group.

71. A phase change ink composition according to claim 70 wherein the arylalkyl group is a substituted arylalkyl group.

72. A phase change ink composition according to claim 70 wherein the arylalkyl group is an unsubstituted arylalkyl group.

73. A phase change ink composition according to claim 70 wherein at least one hetero atom selected from oxygen, nitrogen, sulfur, silicon, or phosphorus is present in the arylalkyl group.

74. A phase change ink composition according to claim 70 wherein no hetero atoms are present in the arylalkyl group.

75. A phase change ink composition according to claim 1 wherein at least one of $R_1$, $R_2$, $R_3$, and $R_4$ is an alkylaryl group.

76. A phase change ink composition according to claim 75 wherein the alkylaryl group is a substituted alkylaryl group.

77. A phase change ink composition according to claim 75 wherein the alkylaryl group is an unsubstituted alkylaryl group.

78. A phase change ink composition according to claim 75 wherein at least one heteroatom selected from oxygen, nitrogen, sulfur, silicon, or phosphorus is present in the alkylaryl group.

79. A phase change ink composition according to claim 75 wherein no hetero atoms are present in the alkylaryl group.

80. A phase change ink composition according to claim 1 wherein $R_1$ and $R_2$ are joined together to form a ring.

81. A phase change ink composition according to claim 1 wherein $R_1$ and $R_2$ are joined together to form a ring and wherein $R_3$ and $R_4$ are joined together to form a ring.

82. A phase change ink composition according to claim 1 wherein at least one of $R_1$, $R_2$, $R_3$, and $R_4$ is joined to a phenyl ring in the central structure.

83. A phase change ink composition according to claim 1 wherein the number of carbon atoms in $R_1+R_2+R_3+R_4+R_5+R_6+R_7+R_8+R_9+R_{10}$ is at least about 32.

84. A phase change ink composition according to claim 1 wherein the number of carbon atoms in $R_1+R_2+R_3+R_4+R_5+R_6+R_7+R_8+R_9+R_{10}$ is at least about 48.

85. A phase change ink composition according to claim 1 wherein the number of carbon atoms in $R_1+R_2+R_3+R_4+R_5+R_6+R_7+R_8+R_9+R_{10}$ is at least about 72.

86. A phase change ink composition according to claim 1 wherein the colorant is of the formula

87. A phase change ink composition according to claim 1 wherein the colorant is of the formula

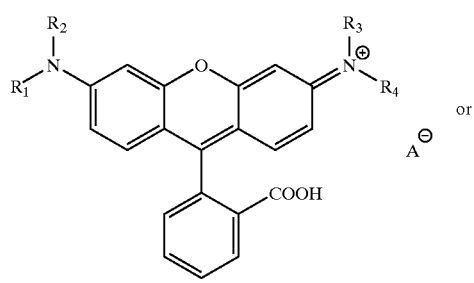

or

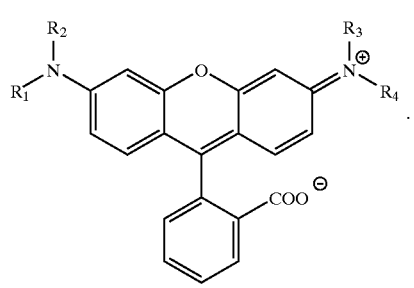

88. A phase change ink composition according to claim 87 wherein A is dodecylbenzene sulfonate, p-toluene sulfonate, chloride, trifluoroacetate, methyl sulfonate, trifluoromethyl sulfonate, bromide, or mixtures thereof.

89. A phase change ink composition comprising a phase change ink carrier and a colorant compound of the formula

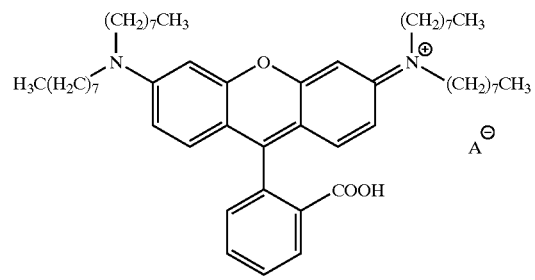

or

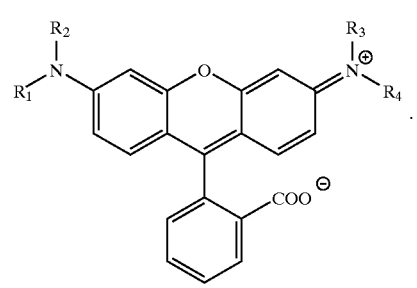

wherein A is an anion.

90. A phase change ink composition comprising a phase change ink carrier and a colorant compound of the formula

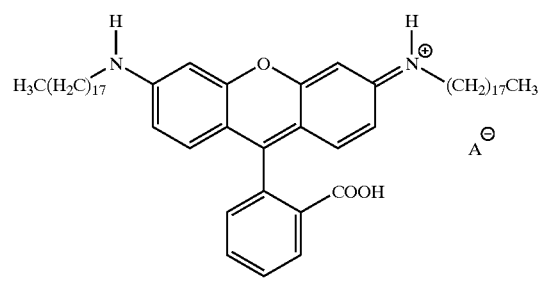

or

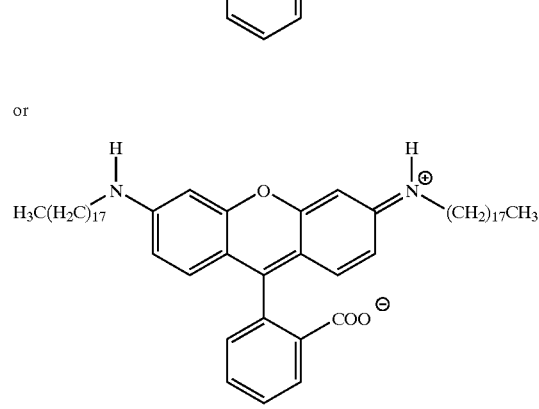

wherein A is an anion.

91. A phase change ink composition according to claim 1 wherein the colorant is of the formula

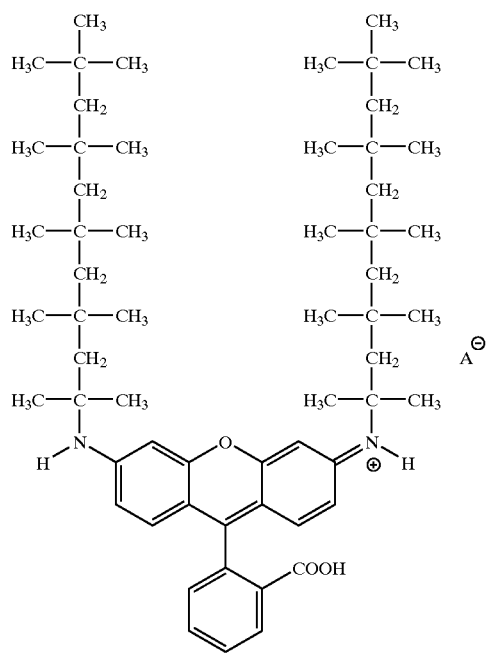
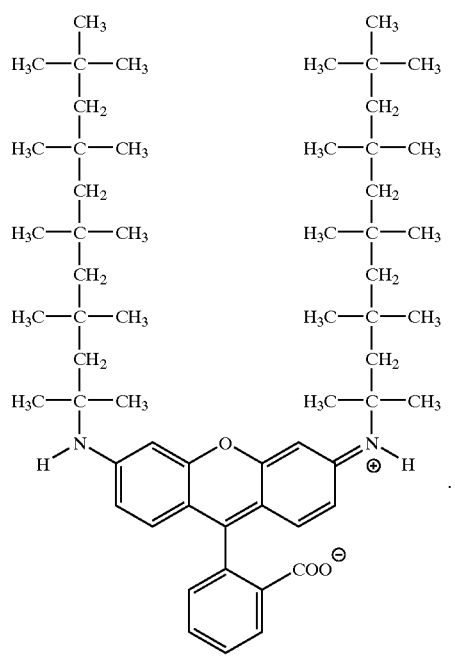
92. A phase change ink composition according to claim 1 wherein the colorant is of the formula
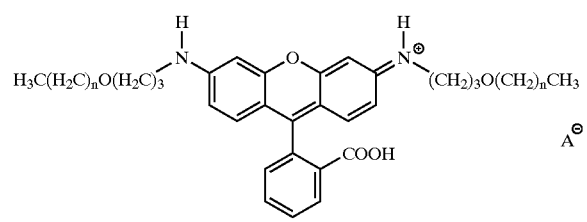
or
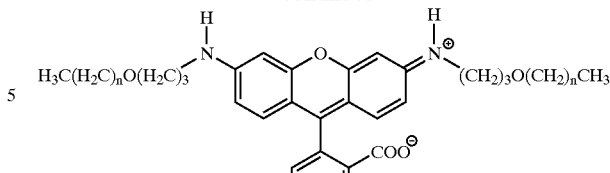
wherein n is at least about 11.
93. A phase change ink composition according to claim 1 wherein the colorant is of the formula
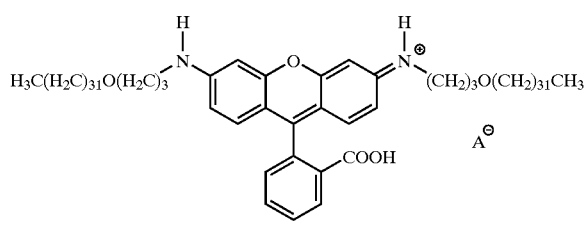
or
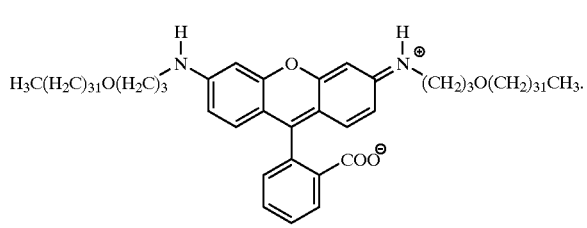
94. A phase change ink composition according to claim 1 wherein the colorant is of the formula
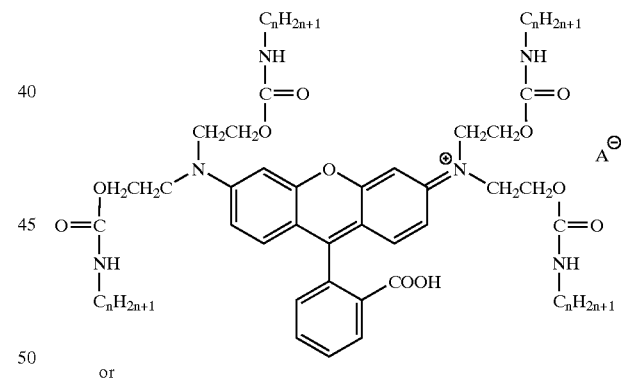
wherein n is at least about 12.

95. A phase change ink composition according to claim 1 wherein the colorant is of the formula

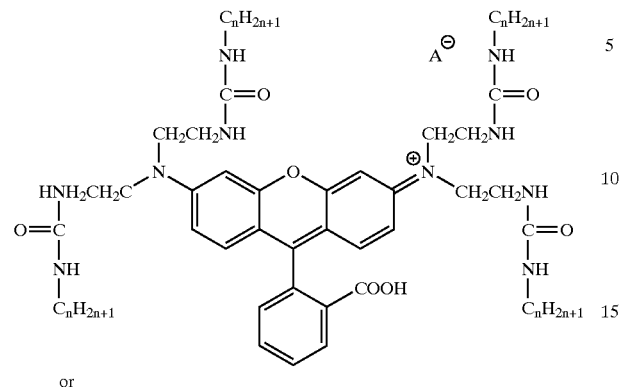

or

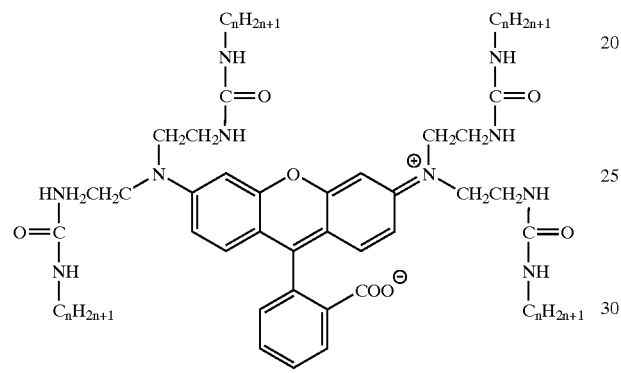

wherein n is at least about 12.

96. A phase change ink composition according to claim 1 wherein the colorant is of the formula

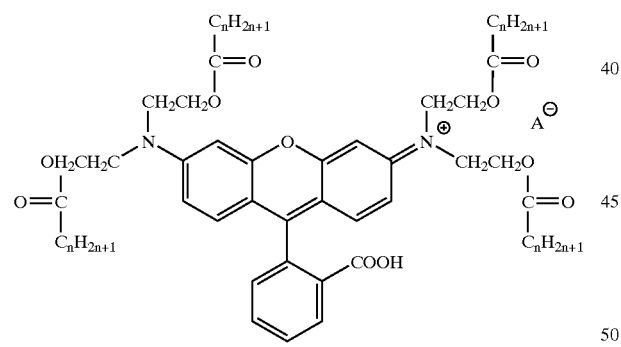

or

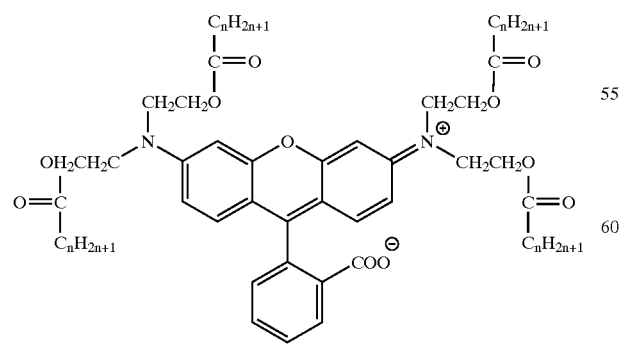

wherein n is at least about 12.

97. A phase change ink composition according to claim 1 wherein the colorant is of the formula

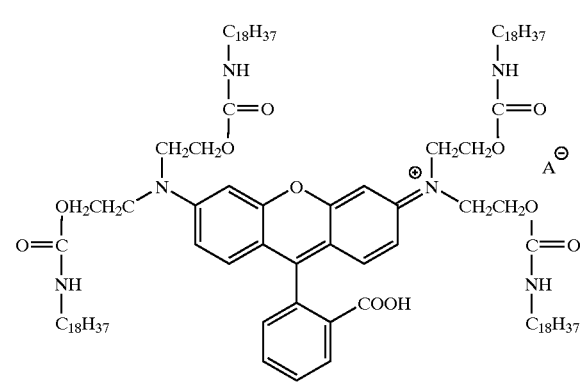

or

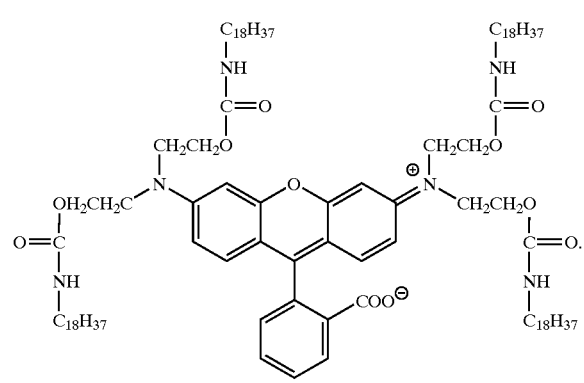

98. A phase change ink composition according to claim 1 wherein the colorant is of the formula

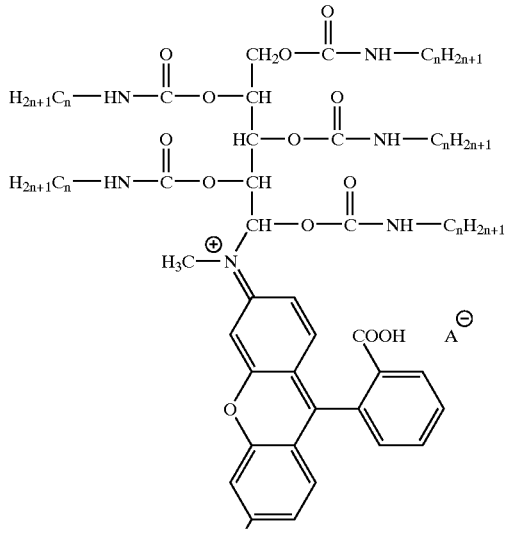

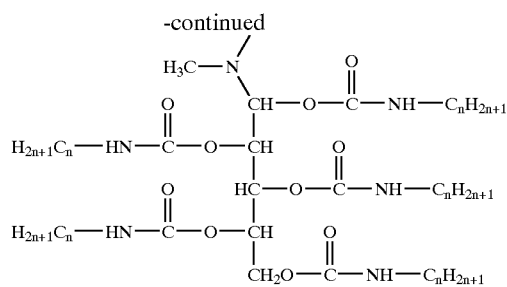
or
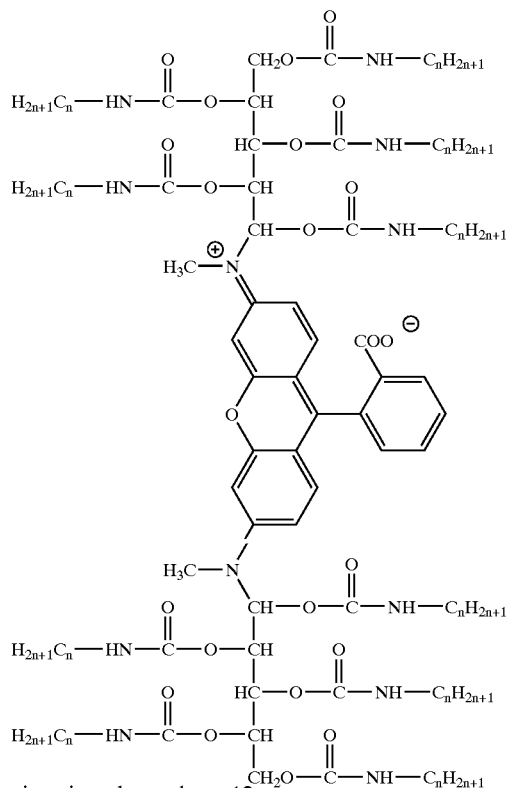
wherein n is at least about 12.
99. A phase change ink composition according to claim 1 wherein the colorant is of the formula
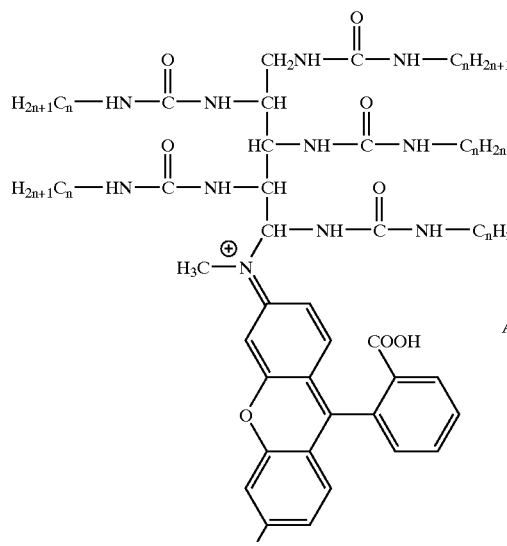
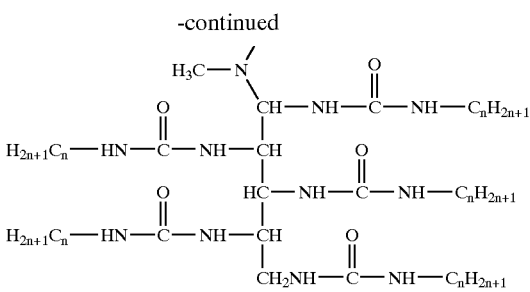
or
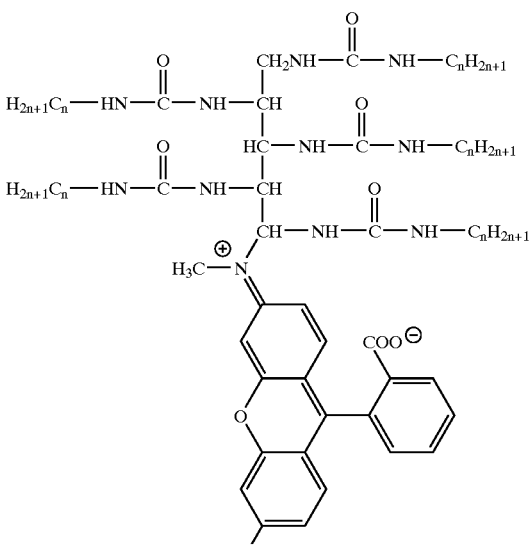
wherein n is of least about 12.
100. A phase change ink composition according to claim 1 wherein the colorant is of the formula 123
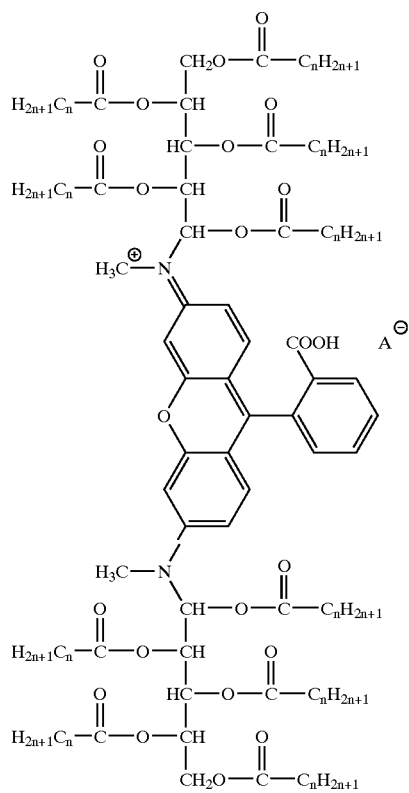
or
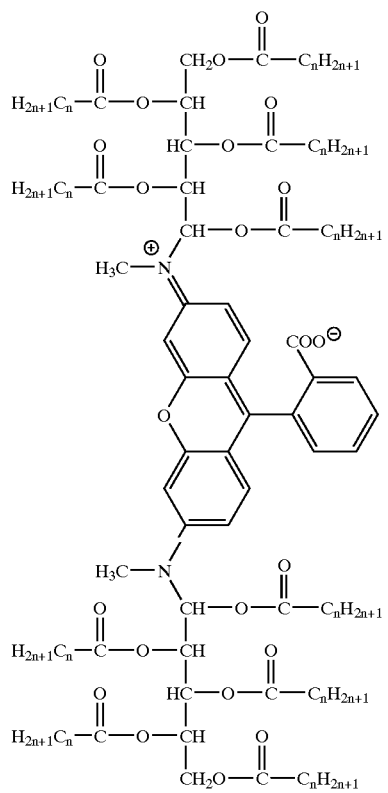
wherein n is at least about 12.
101. A phase change ink composition according to claim 1 wherein the colorant is of the formula
124
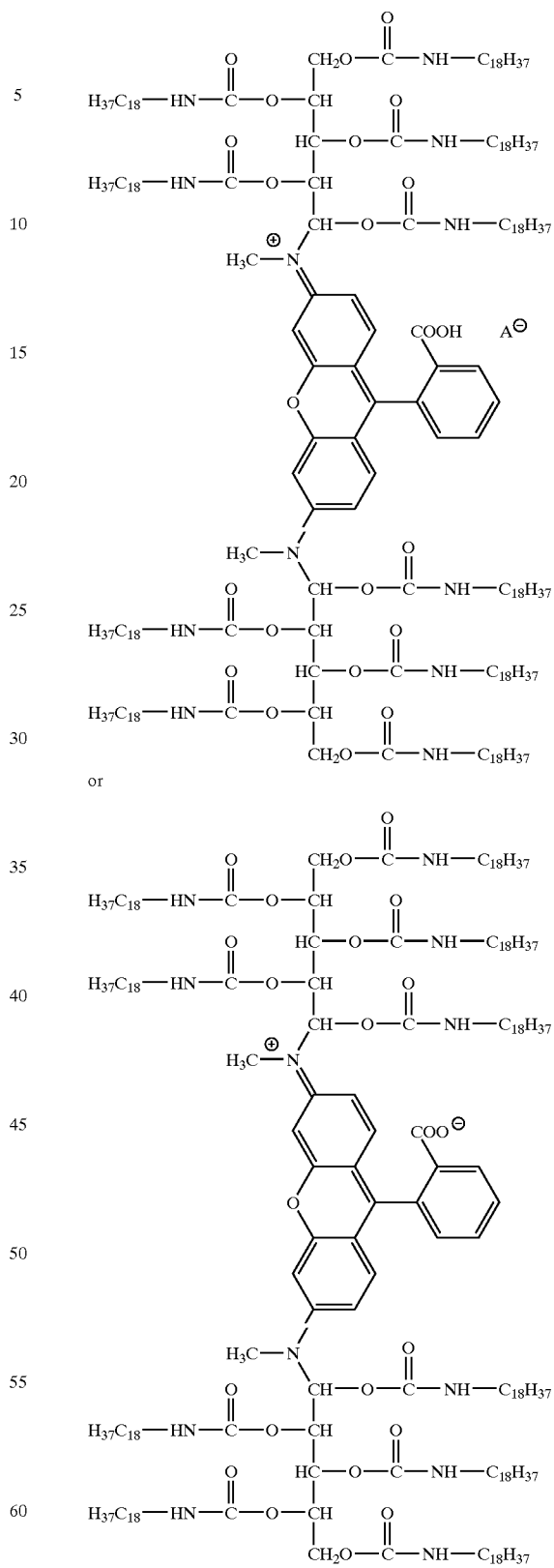
102. A phase change ink composition according to claim 1 wherein the colorant is of the formula

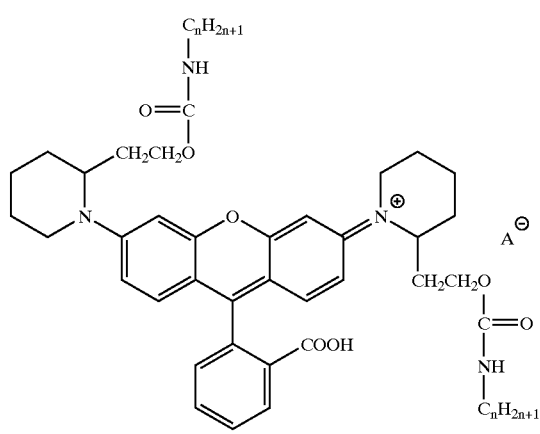
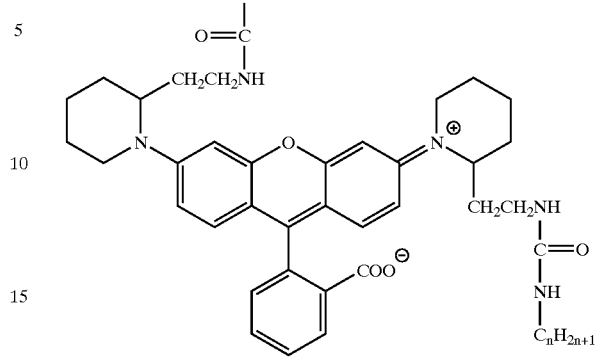
wherein n is at least about 12.
104. A phase change ink composition according to claim 1 wherein the colorant is of the formula
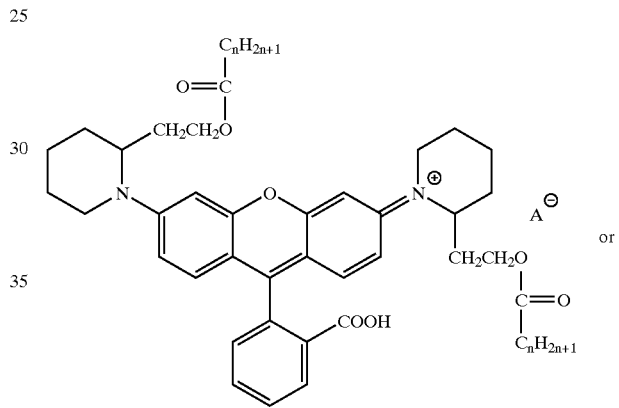
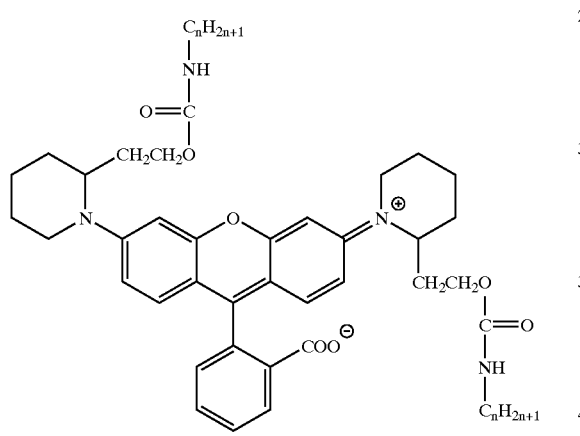
wherein n is at least about 12.
103. A phase change ink composition according to claim 1 wherein the colorant is of the formula
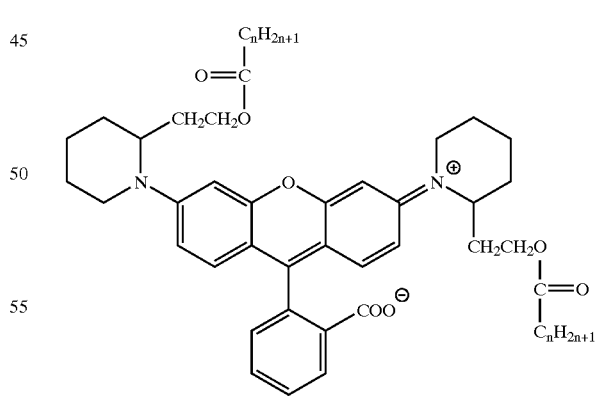
wherein n is at least about 12.
105. A phase change ink composition according to claim 1 wherein the colorant is of the formula
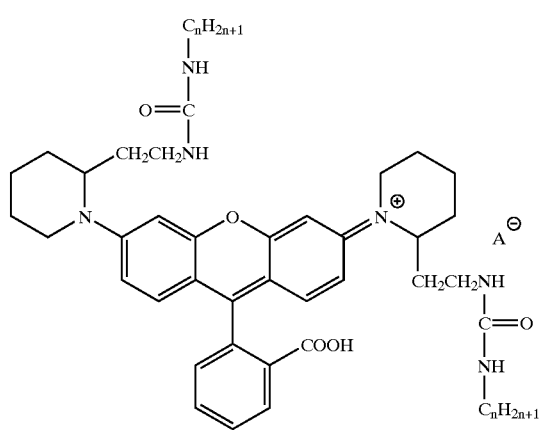

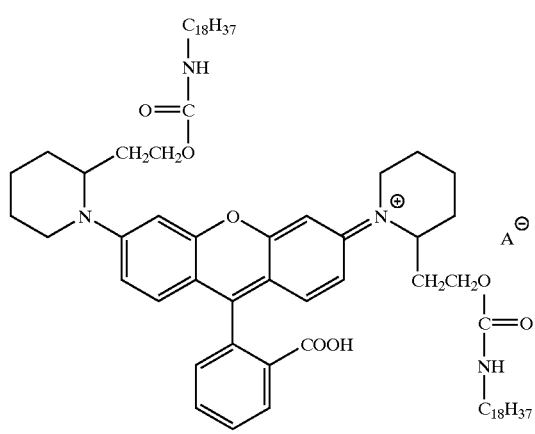
106. A phase change ink composition according to claim 1 wherein the colorant is of the formula
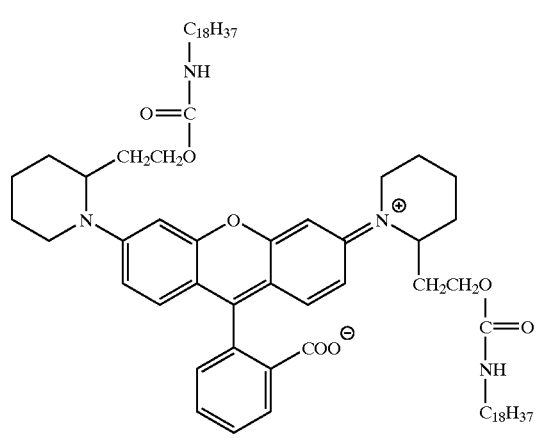
or
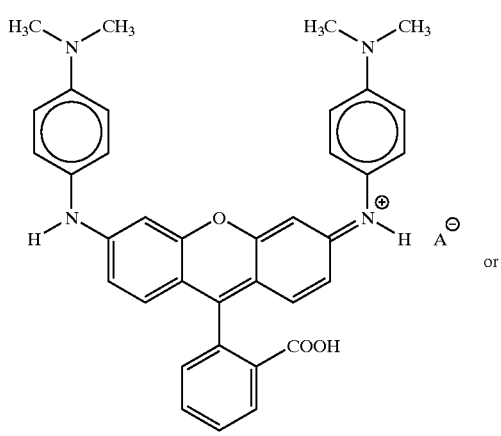
107. A phase change ink composition according to claim 1 wherein the colorant is of the formula
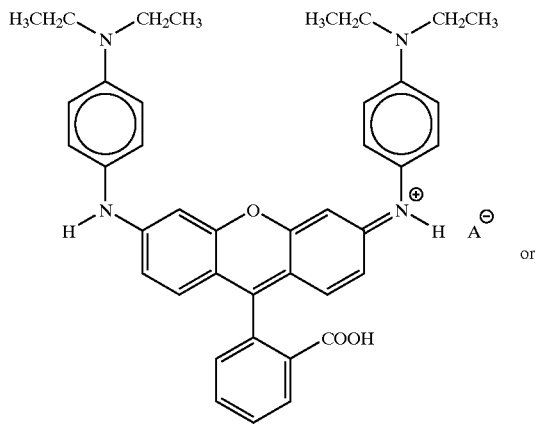
or
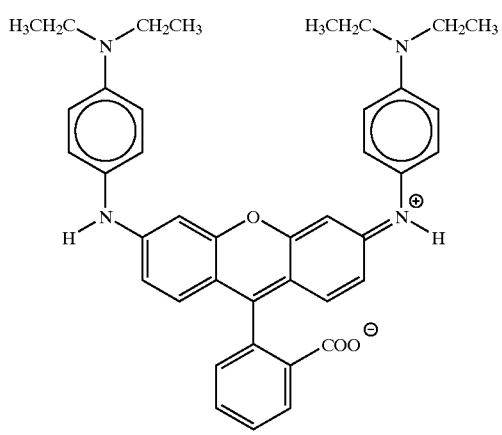
108. A phase change ink composition according to claim 1 wherein the colorant is of the formula

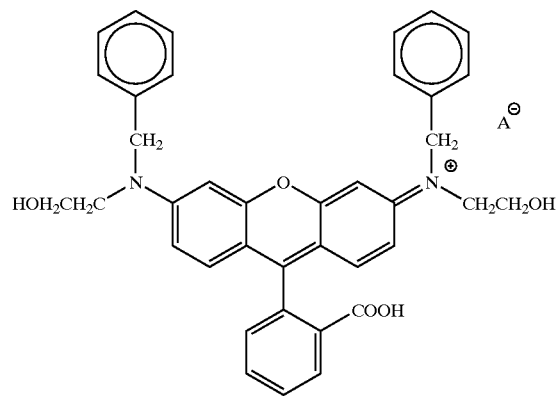
or
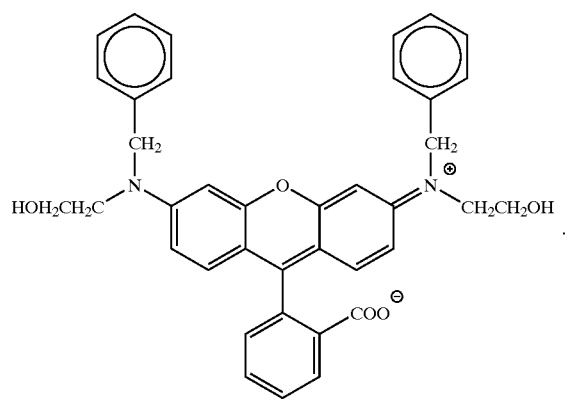
109. A phase change ink composition according to claim 1 wherein the colorant is of the formula
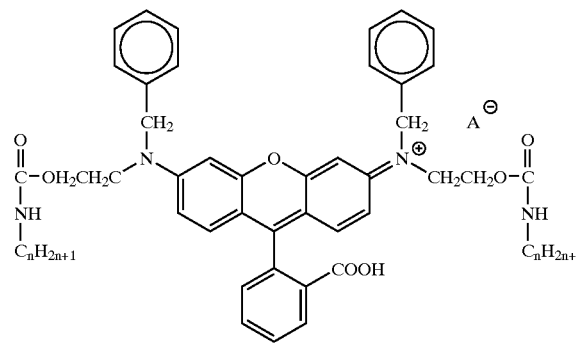
or
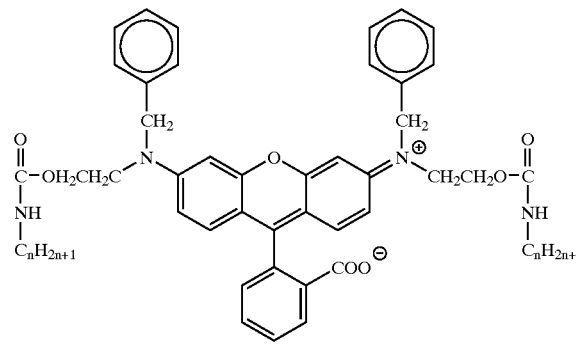
wherein n is at least about 12.
110. A phase change ink composition according to claim 1 wherein the colorant is of the formula
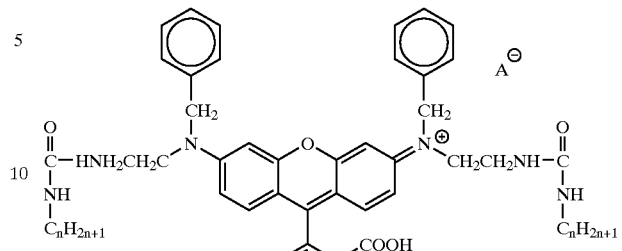
or
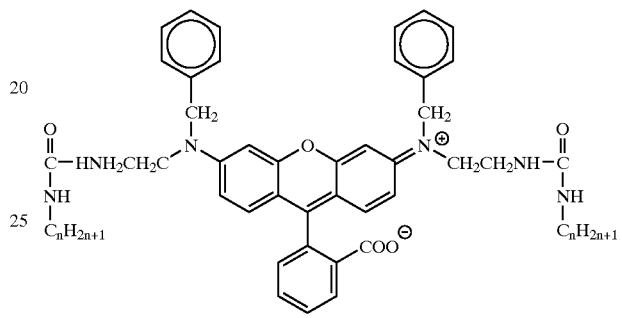
wherein n is at least about 12.
111. A phase change ink composition according to claim 1 wherein the colorant is of the formula
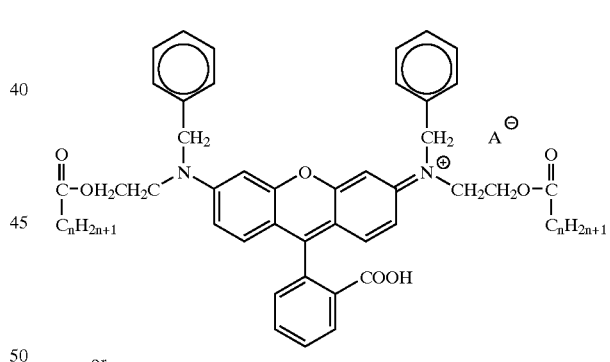
or
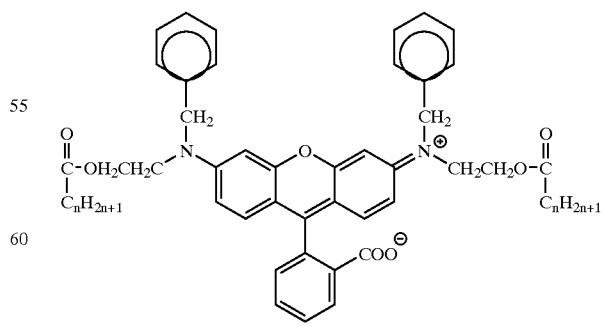
wherein n is at least about 12.

112. A phase change ink composition according to claim 1 wherein the colorant is of the formula
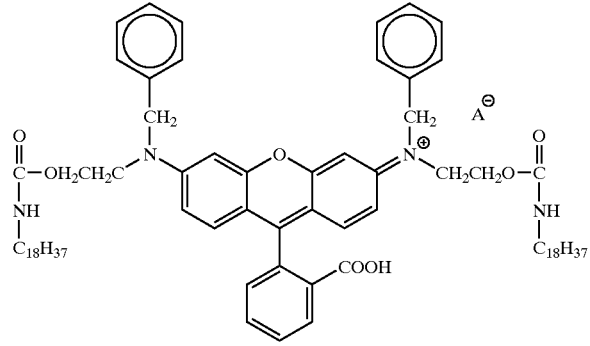
or
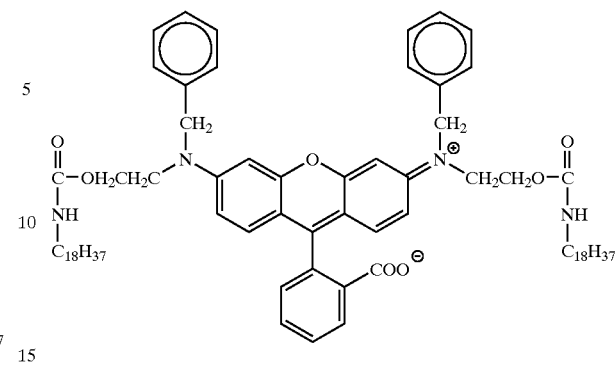
113. A phase change ink composition according to claim 1 wherein the colorant is of the formula
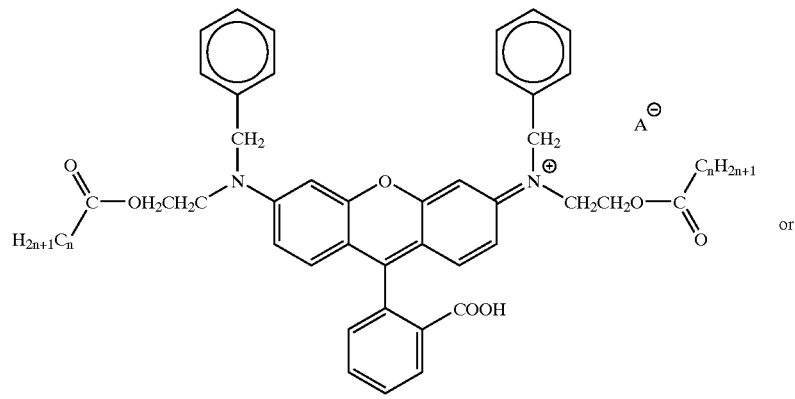
or
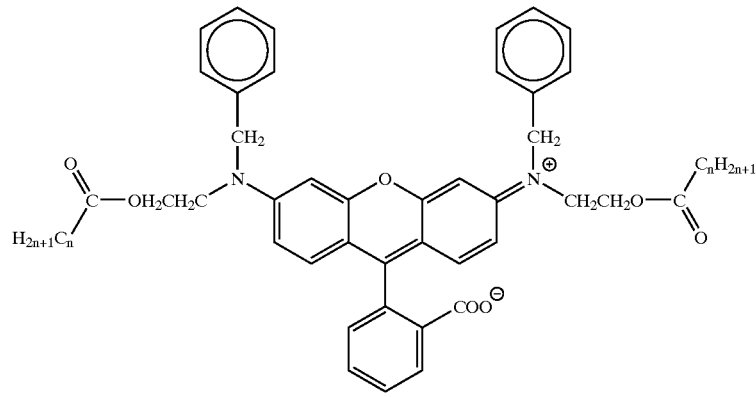

wherein n is at least about 12.
114. A phase change ink composition according to claim 1 wherein the colorant is of the formula
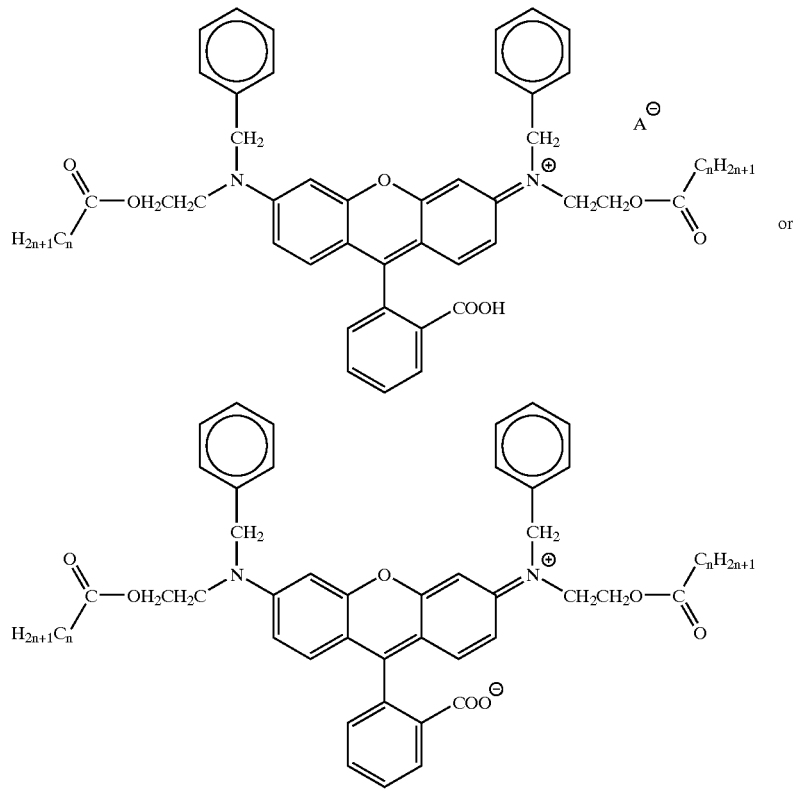
wherein n has an average value of about 50.
115. A phase change ink composition according to claim 1 wherein the colorant is of the formula
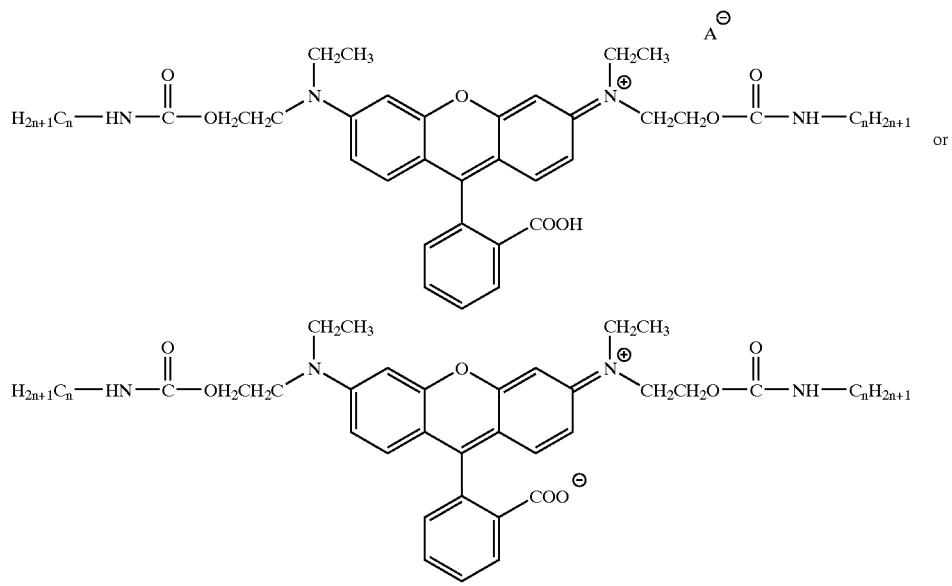
wherein n is at least about 12.

116. A phase change ink composition according to claim 1 wherein the colorant is of the formula
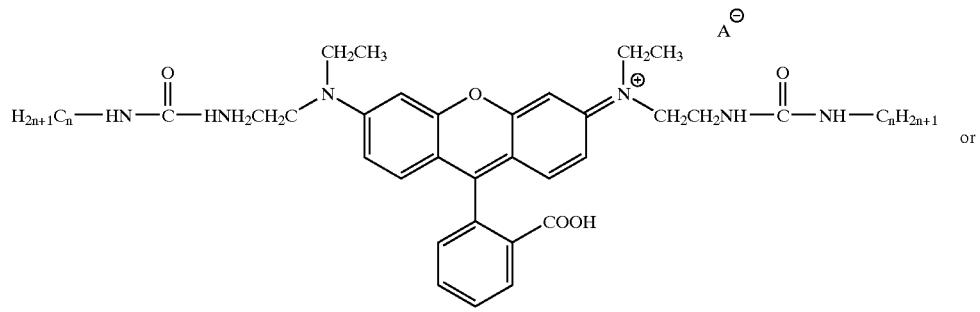
or
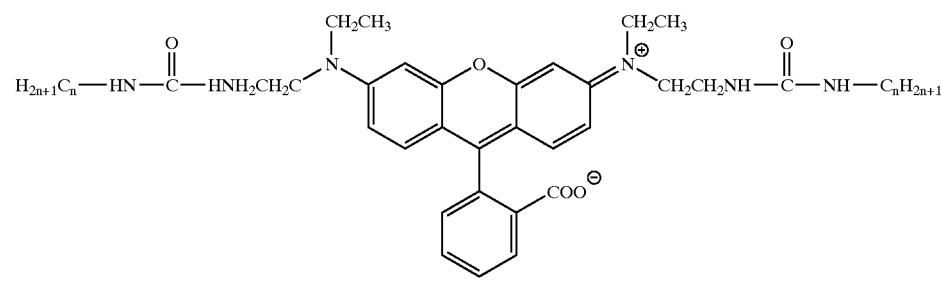
wherein n is at least about 12.
117. A phase change ink composition according to claim 1 wherein the colorant is of the formula
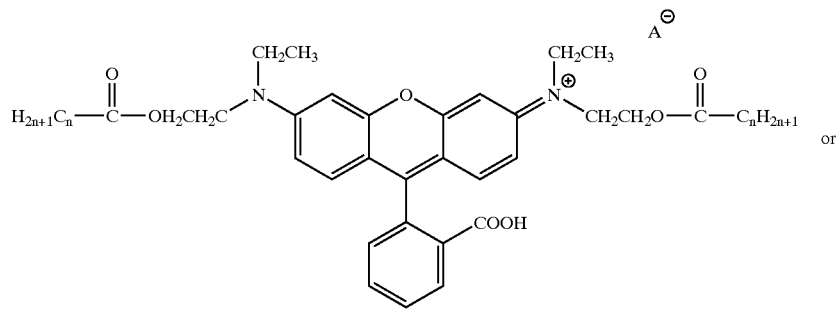
or
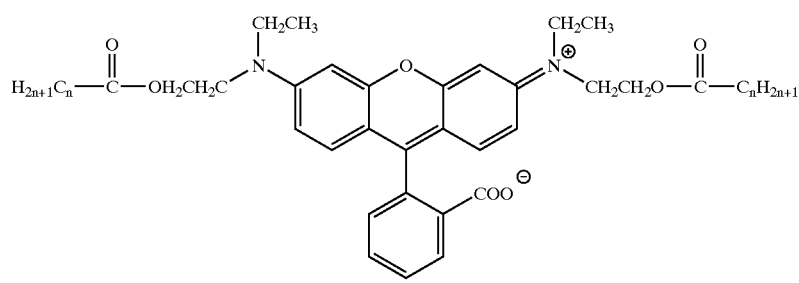
wherein n is at least about 12.

118. A phase change ink composition according to claim 1 wherein the colorant is of the formula
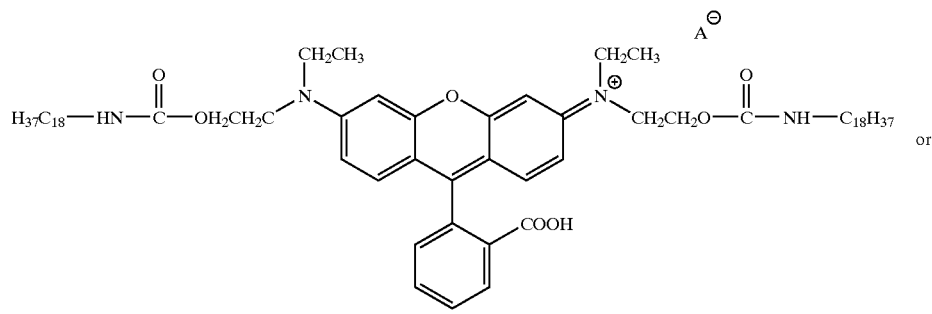 or
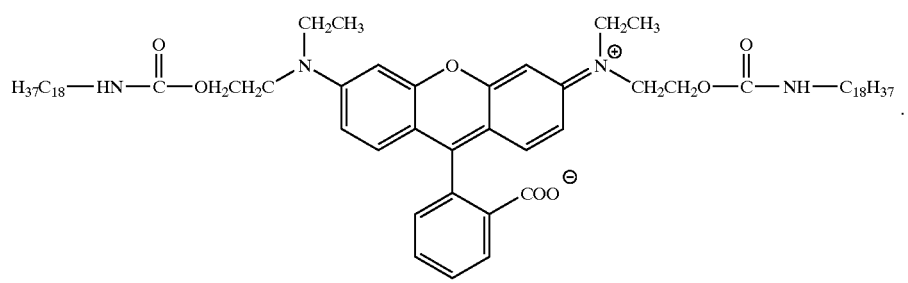.
119. A phase change ink composition according to claim 1 wherein the colorant is of the formula
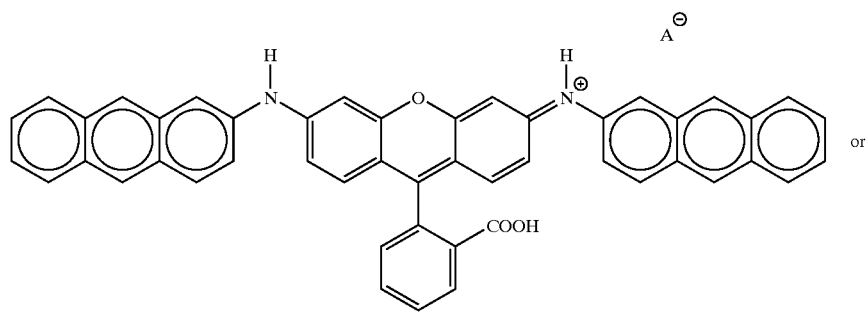 or
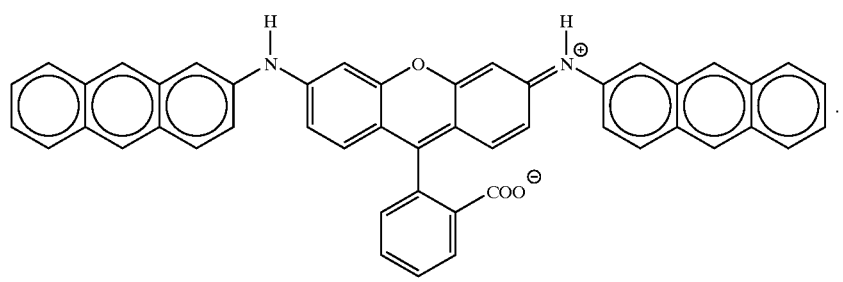.
120. A phase change ink composition according to claim 1 wherein the colorant is of the formula

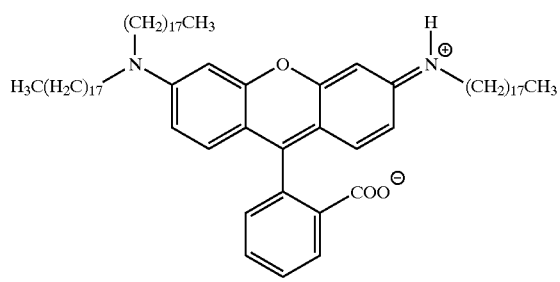

or

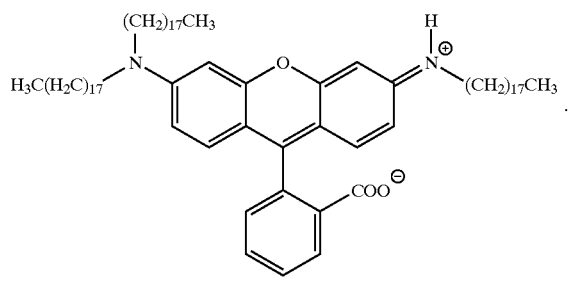

121. A phase change ink composition comprising a phase change ink carrier and a colorant compound of the formula

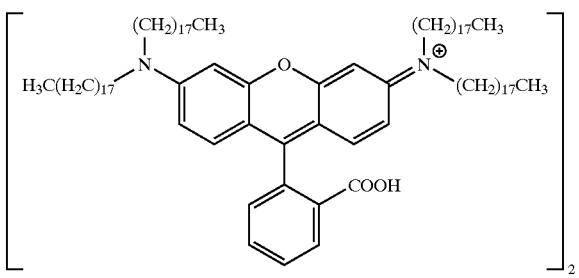

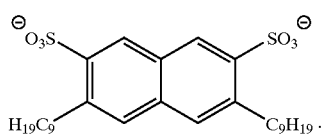

122. A process which comprises (1) incorporating into an ink jet printing apparatus a phase change ink composition comprising a phase change ink carrier and a colorant compound of the formula

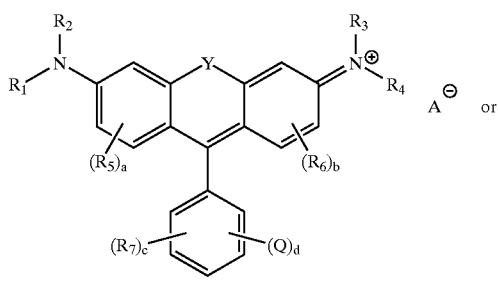

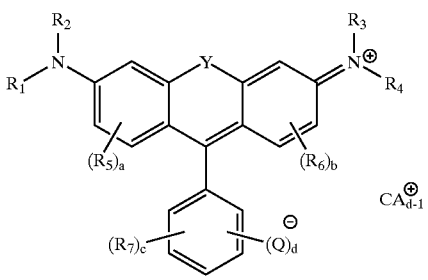

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) on isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

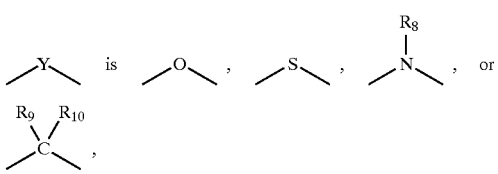

$R_8$, $R_9$, and $R_{10}$ each, independently of the others, is (i) a hydrogen atom, (ii) an alkyl group, (iii) an aryl group, (iv) an arylalkyl group, or (v) an alkylaryl group, provided that the number of carbon atoms in $R_1+R_2+R_3+R_4+R_5+R_6+R_7+R_8+R_9+R_{10}$ is at least about 16, Q is a COOH group or a $SO_3H$ group $Q^-$ is a $COO^-$ group or a $SO_3^-$ group, d is an integer which is 1, 2, 3, 4, or 5, A is an anion, and CA is either a hydrogen atom or a cation associated with all but one of the $Q^-$ groups, provided that when the colorant compound is of the formula

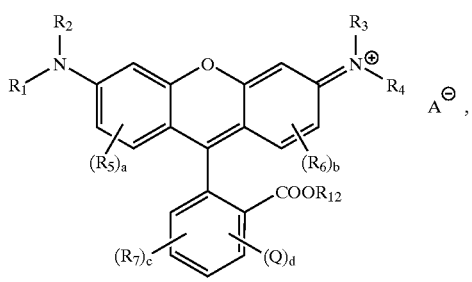

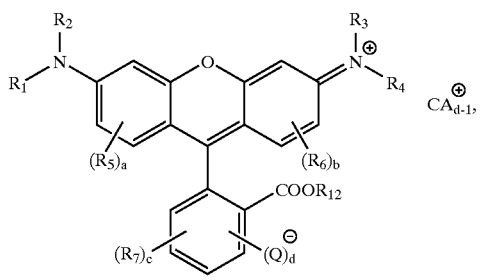

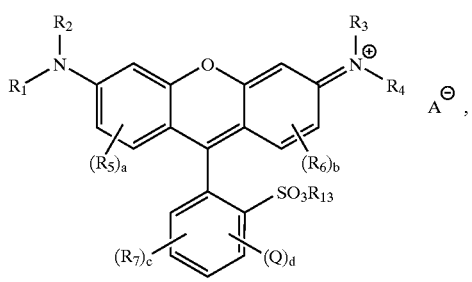

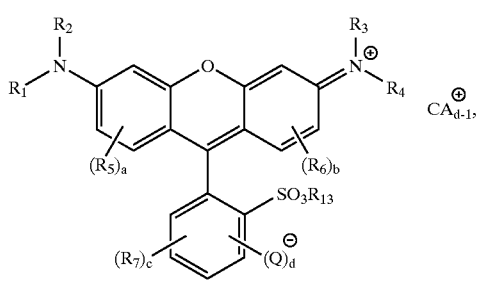

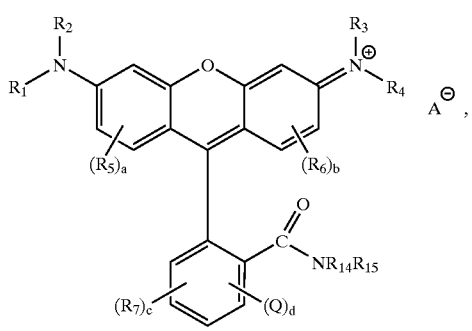

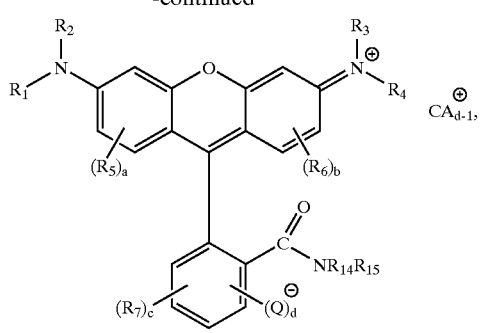

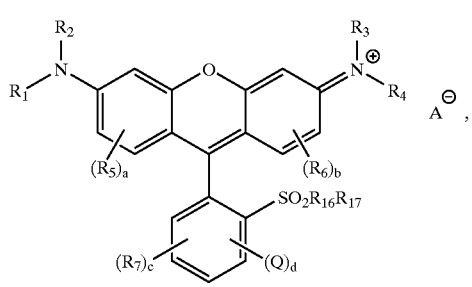

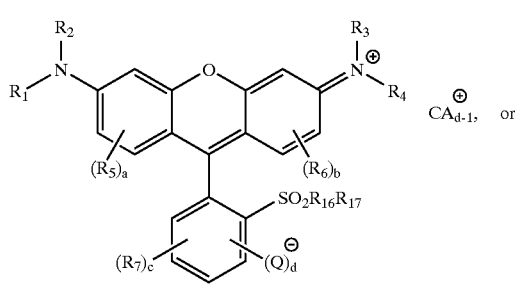

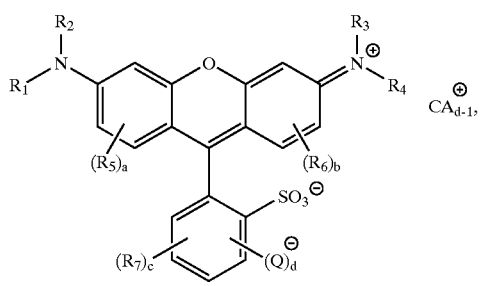

wherein $R_{12}$, $R_{13}$, $R_{14}$, $R_{15}$, $R_{16}$, and $R_{17}$ each, independently of the other, is (i) an alkyl group, (ii) on aryl group, (iii) an arylalkyl group, or (iv) an alkylaryl group, (I) either (a) c is an integer which is 0, 1, 2, or 3, or (b) d is an integer which is 1, 2, 3, or 4, and (II) either (a) three of $R_1$, $R_2$, $R_3$, and $R_4$ are hydrogen atoms; (b) only one of $R_1$, $R_2$, $R_3$, and $R_4$ is a hydrogen atom; (c) $R_1$ and $R_2$ are both hydrogen atoms, d) $R_3$ and $R_4$ are both hydrogen atoms; or (e) $R_1$ and $R_3$ are both hydrogen atoms and $R_2$ and $R_4$ are each, independently of the other, either alkyl groups or arylalkyl groups; (2) melting the ink; and (3) causing droplets of the melted ink to be objected in an imagewise pattern onto a substrate.

123. A process according to claim 122 wherein the printing apparatus employs a piezoelectric printing process wherein droplets of the ink are caused to be ejected in imagewise pattern by oscillations of piezoelectric vibrating elements.

124. A process according to claim 122 wherein the substrate is a final recording sheet and droplets of the melted ink are ejected in an imagewise pattern directly onto the final recording sheet.

125. A process according to claim 122 wherein the substrate is an intermediate transfer member and droplets of the melted ink are ejected in an imagewise pattern onto the intermediate transfer member followed by transfer of the imagewise pattern from the intermediate transfer member to a final recording sheet.

126. A process according to claim 125 wherein the intermediate transfer member is heated to a temperature above that of the final recording sheet and below that of the melted ink in the printing apparatus.

* * * * *